United States Patent [19]
Singhose et al.

[11] Patent Number: 5,638,267
[45] Date of Patent: Jun. 10, 1997

[54] METHOD AND APPARATUS FOR MINIMIZING UNWANTED DYNAMICS IN A PHYSICAL SYSTEM

[75] Inventors: William E. Singhose, Pleasantville; Neil C. Singer, Armonk; Stephen J. Derezinski, III, Pleasantville; Bert W. Rappole, Jr., New York, all of N.Y.; Kenneth Pasch, Kennebunkport, Me.

[73] Assignee: Convolve, Inc., New York, N.Y.

[21] Appl. No.: 259,880

[22] Filed: Jun. 15, 1994

[51] Int. Cl.$^6$ .................................................. G05B 13/02
[52] U.S. Cl. ........................................ 364/148; 364/176
[58] Field of Search .......................... 364/148, 152, 364/153, 176, 177, 164, 165, 183, 149–151, 157, 572, 574, 724.01, 724.12, 728.01, 728.02, 553, 561, 724.19; 318/561

[56] References Cited

U.S. PATENT DOCUMENTS

| | | | |
|---|---|---|---|
| 3,643,073 | 2/1972 | Sawamura | 318/635 X |
| 4,769,766 | 9/1988 | Tung | 364/157 X |
| 4,916,635 | 4/1990 | Singer et al. | 364/153 X |
| 5,339,016 | 8/1994 | Thoen | 318/610 |
| 5,371,451 | 12/1994 | Toyosawa et al. | 364/165 X |
| 5,396,414 | 3/1995 | Alcone | 364/148 |
| 5,400,247 | 3/1995 | He | 364/148 |

*Primary Examiner*—Joseph Ruggiero
*Attorney, Agent, or Firm*—Choate, Hall & Stewart

[57] ABSTRACT

Method and apparatus for minimizing unwanted dynamics in a physical system response. Constraints on the input and on the unwanted dynamics are established, and an impulse sequence which satisfies the constraints is determined. The impulse sequence is convolved with an arbitrary command input to produce a shaped input which is used to drive physical system, thereby minimizing unwanted dynamics. The constraints on the input and on the unwanted dynamics may be selected to achieve shaped inputs and residual unwanted dynamics of various characteristics.

130 Claims, 60 Drawing Sheets

SYSTEM INPUT

IMPULSE SEQUENCE

SHAPED INPUT

IMPULSE SEQUENCE

VECTOR DIAGRAM

RESPONSE TO EACH IMPULSE

RESULTANT RESPONSE

SYSTEM RESPONSE TO EACH IMPULSE

TOTAL SYSTEM RESPONSE

VECTOR DIAGRAM

VECTOR DIAGRAM

INPUT SHAPER

--- NEGATIVE ZV SHAPER
—— NEGATIVE ZVD SHAPER
—·— NEGATIVE EI SHAPER

SYSTEM INPUT

IMPULSE SEQUENCE

———— UNSHAPED SLOW
——◆—— 15 IMPULSE SHAPED, FAST $D_i$ ARE TIME DELAYS
$K_i$ ARE GAIN FACTORS

METHOD AND APPARATUS FOR MINIMIZING UNWANTED DYNAMICS IN A PHYSICAL SYSTEM

The Government has rights in this invention pursuant to Grant Number NAS5-32034 awarded by the National Aeronautics and Space Administration and Contract Number 9101441 awarded by the National Science Foundation.

BACKGROUND OF THE INVENTION

This invention relates to a method for shaping the input to a dynamic system in order to minimize unwanted dynamics in that system.

Many physical systems must operate dynamically in order to accomplish their intended functions. However, in the course of their motions, the systems may acquire unwanted dynamics and vibrations which may be detrimental to their operation. For example, excessive vibrations in a dynamic system may result in larger than normal stresses and a premature failure of that system. Alternatively, if the system is designed to operate with a smooth, non-oscillatory motion, then vibrations may cause unwanted oscillations which actually prevent the system from achieving its intended purpose, or, at the very least, cause the system to operate at a significantly slower speed and lower performance level than originally intended. In addition, the unwanted dynamics may also degrade the performance of the system, either directly or indirectly, since the system is not exactly following its intended motion. As a result of these consequences, it is often desired to minimize the unwanted dynamics and vibrations in a physical system.

There are a number of approaches for achieving this end. One approach relies on altering the physical system in order to reduce any unwanted dynamics. For example, a robotic arm may be stiffened in order to reduce the amplitude of any residual vibrations, or the arm may be dampened so that residual vibrations quickly die out, or its mass be changed so that the resonant frequency of the arm is moved to a more favorable frequency. However, it is not always possible to alter the physical system. For example, the system may be so precisely designed as to be intolerant of the desired changes or it may just be physically impossible to alter the system, as is the case with a system which is inaccessible. Even if the system may be altered as desired, the alteration may come with a price—a more massive system, a larger actuator required to move the system or a more complex system, to name a few. Another approach relies on using a controller to actively reduce any unwanted dynamics. However, this approach also has its drawbacks. For example, most controllers rely on some sort of feedback from the unwanted dynamic and also on a good model of the system to be controlled, either of which may not always be available. In addition, controllers may be unacceptably complex, either in terms of the additional physical elements required to implement the controller or in terms of the time required for the controller to implement its control algorithm. In particular, fast real-time systems may be too fast for controllers to be an option.

A third approach, which is the approach considered by this invention, relies on altering the input to the system in order to reduce the unwanted dynamics. This approach does not rely on physical alterations to the system, good models of the system to be controlled, or complex real-time calculations. In related work, Singer, et. al. [Singer, Neil C.; Seering, Warren P. "Preshaping Command Inputs to Reduce System Vibration". ASME Journal of Dynamic Systems, Measurement, and Control. (March 1990) and Singer, et. al. U.S. Pat. No. 4,916,635, Apr. 10, 1990] showed that residual vibration can be significantly reduced by employing an Input Shaping™ method that uses a simple system model and requires very little computation. The model consists only of estimates of the system's natural frequency and damping ratio. Constraints on the system inputs result in zero residual vibration if the system model is exact. When modeling errors exist, the shaped inputs keep the residual vibration of the system at a low level that is acceptable for many applications. Extending the method to systems with more than one modeled resonant frequency is straightforward [Singer, Neil C. Residual Vibration Reduction in Computer Controlled Machines. Ph.D. Thesis, Massachusetts Institute of Technology. (February 1989)].

The shaping method works in real time by convolving a desired input with a sequence of impulses to produce the shaped input function that reduces residual vibration. The impulse sequence used in the convolution is called an input shaper. Selection of the number and type of impulses, the impulse amplitudes and their locations in time determine the amplitude and characteristics of the residual vibration. U.S. Pat. No. 4,916,635 discloses the basic concept of using input shapers, while the current invention discloses a variety of input shapers designed to achieve specific goals. Since the invention considers many different input shapers used for various purposes, the description of the preferred embodiment is subdivided into sections, with each section devoted to a specific class of input shapers.

SUMMARY OF THE INVENTION

The method according to the invention for generating an input to a dynamic system to minimize unwanted dynamics in the system response includes establishing expressions quantifying the unwanted dynamics. First constraints which bound the available input to the dynamic system and second constraints which bound the unwanted dynamics are established, and a solution which is used to generate the input and allows maximum variation in the physical system characteristics while still satisfying the first and second constraints is found. The physical system is controlled based on the input to the physical system, whereby unwanted dynamics are minimized.

In a second aspect of the invention, the method for generating an input to a dynamic system to minimize unwanted dynamics in the system response includes establishing expressions quantifying the unwanted dynamics. First constraints which bound the available input to the dynamic system and second constraints which bound the unwanted dynamics are established, and a solution which is used to generate the input and minimizes the length of the solution while still satisfying the first and second constraints is found. The physical system is controlled based on the input to the physical system, whereby unwanted dynamics are minimized. In a related aspect of the invention, the first and second constraints are supplemented by a third constraint bounding variations in physical system characteristics, and a solution which is used to generate the input and minimizes the length of the solution while still satisfying the first, second and third constraints is found.

In a third aspect of the invention, the method for generating an input to a dynamic system to minimize unwanted dynamics in the system response includes establishing expressions quantifying the unwanted dynamics. First constraints which bound the available input to the dynamic system and second constraints on variation in system response with variations in the physical system characteristics are established, and a solution which is used to generate the input and minimizes the length of the solution while still satisfying the first and second constraints is found. The physical system is controlled based on the input to the physical system, whereby unwanted dynamics are minimized.

In preferred embodiments of any of the previously mentioned aspects of the invention, the unwanted dynamics are endpoint vibrations of the physical system, the physical system is characterized by one or more vibrational modes each of which has a natural frequency and damping coefficient, and the solution is a sequence of impulses. The sequence may be defined implicitly, explicitly, or approximately by a set of equations which is chosen according to the constraints being considered and the desired characteristics of the sought solution. The sequence of impulses is convolved with an unshaped input and the result of the convolution is used as input to the dynamic system, whereby the unwanted dynamics are minimized.

In another aspect of the invention, the method for generating an input to a dynamic system to minimize unwanted dynamics in a physical system response includes establishing constraints on a sequence of impulses which minimize the unwanted dynamics. A first sequence of impulses which satisfy these constraints is determined, and a second sequence of impulses, which are discretized in location, are then determined. The number of impulses and locations of the impulses for the second sequence is determined based on the first sequence, and the amplitudes of the impulses of the second sequence are determined to satisfy the constraints. The second sequence of impulses is used to generate the input and the physical system is controlled based on the input to the physical system, whereby unwanted dynamics are minimized.

In another aspect of the invention, the method for generating an input to a dynamic physical system to reduce the deviation between the shape of a trajectory traversed by a point in the physical system and a pre-selected shape includes establishing constraints on the available inputs to the dynamic system to define a group of possible inputs and determining an impulse sequence which eliminates unwanted dynamics in the physical system. The impulse sequence is convolved with each input in the group of possible inputs to determine a group of shaped inputs and the shaped input which minimizes the deviation between the shape of the actual trajectory and the pre-selected shape is determined. The physical system is controlled based on the shaped input which minimizes the deviation between the shape of the actual trajectory and the pre-selected shape, whereby the deviation is minimized.

In another aspect of the invention, a method for generating an input to a dynamic system to minimize unwanted dynamics in the physical system response comprises establishing expressions quantifying the unwanted dynamics. First constraints on the available inputs to the dynamic system are established in order to define a group of possible inputs, each input in the group of possible inputs is expressed as the combination of one or more primitive input trains, and the primitive input train which minimizes the unwanted dynamics is determined. The physical system is controlled using the input in the group of possible inputs which corresponds to the primitive input train which minimizes the unwanted dynamics, whereby unwanted dynamics are minimized. In a preferred embodiment, the primitive input trains are sequences of impulses, and the group of possible inputs are commonly used inputs, such as those which generate trapezoidal, s-curve, or parabolic velocity profiles.

In a final aspect of the invention, the method for shaping an arbitrary command input to a dynamic physical system to reduce unwanted dynamics in the physical system includes determining a first parameterization for the arbitrary command input and determining an impulse sequence which eliminates unwanted dynamics in the physical system. The convolution of the impulse sequence with the arbitrary command input is then expressed using a second parameterization, which is based on the first parameterization, and the input to the physical system is controlled based on the second parameterization, whereby unwanted dynamics in the physical system are minimized.

BRIEF DESCRIPTION OF THE DRAWING

FIG. 5b graphs residual vibration versus normalized modeling error for the three-impulse sequence of FIG. 5a;

FIG. 6b graphs residual vibration versus normalized modeling error for the three-impulse sequence of FIG. 6a;

DESCRIPTION OF THE PREFERRED EMBODIMENT

Extra-Insensitive and Specified Insensitivity Input Shapers

Introduction

Figure 1A:
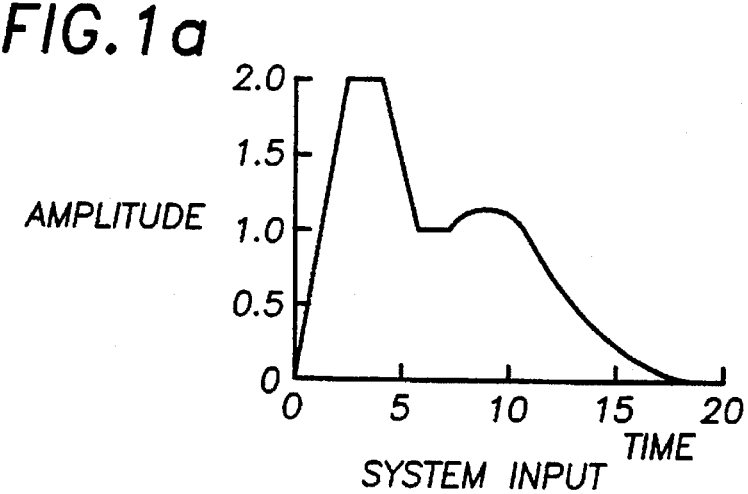
FIGS. 1a, 1b and 1c illustrate the convolution of an unshaped system input with a sequence of impulses to produce a shaped system input.

An early pre-cursor of Input Shaping™ was the use of posicast control by O. J. M. Smith [Smith, O. J. M. Feedback Control Systems. McGraw-Hill Book Company, Inc., New York (1958)]. This technique breaks a step input into two smaller steps, one of which is delayed in time. The result is a reduced settling time for the system. Wiederrich and Roth [Wiederrich, J. L.; Roth B., "Dynamic Synthesis of Cams Using Finite Trigonometric Series". Journal of Engineering for Industry (February 1975)] shaped cam profiles to control the harmonic content of the imposed vibration. Their methods reduced steady-state vibration and assured the accuracy of their simple model.

Optimal control approaches have been used to generate input profiles for commanding vibratory systems. Junkins, Turner, Chun, and Juang have made considerable progress toward practical solutions of the optimal control formulation for flexible systems [Junkins, John L.; Turner, James D. "Optimal Spacecraft Rotational Maneuvers". Elsevier Science Publishers, New York. (1986), Chun, Hon M.; Turner, James D.; Juang, Jer-Nan. "Disturbance-Accommodating Tracking Maneuvers of Flexible Spacecraft". Journal of the Astronautical Sciences 33, 2. (April–June, 1985)]. Gupta [Gupta, Narendra K. "Frequency-Shaped Cost Functionals: Extension of Linear-Quadratic". Journal of Guidance and Control 3, 6 (November–December, 1980)], and Junkins and Turner [Junkins, John L.; Turner, James D. "Optimal Spacecraft Rotational Maneuvers". Elsevier Science Publishers, New York. (1986)] included frequency shaping terms in their optimal formulation.

Farrenkopf [Farrenkopf, R. L. "Optimal Open-Loop Maneuver Profiles for Flexible Spacecraft". Journal of Guidance and Control 2, 6. (November–December, 1979)] developed velocity shaping techniques for flexible spacecraft. Swigert [Swigert, C. J. "Shaped Torque Techniques". Journal of Guidance and Control 3, 5 (September–October, 1980)] demonstrated that torque shaping can be implemented on systems which modally decompose into second-order harmonic oscillators.

Singer and Seering [Singer, Neil C.; Seering, Warren P. "Preshaping Command Inputs to Reduce System Vibration". ASME Journal of Dynamic Systems, Measurement, and Control. (March 1990)] showed that residual vibration can be significantly reduced by employing an Input Shaping™ method that uses a simple system model and requires very little computation. The model consists only of estimates of the system's natural frequency and damping ratio. Constraints on the system inputs result in zero residual vibration if the system model is exact. When modeling errors exist, the shaped inputs keep the residual vibration of the system at a low level that is acceptable for many applications. There is a straightforward manner to extend this method to systems with more than one modeled resonant frequency [Singer, Neil C. Residual Vibration Reduction in Computer Controlled Machines. Ph.D. Thesis, Massachusetts Institute of Technology. (February, 1989)].

The shaping method works in real time by convolving a desired input with a sequence of impulses to produce the shaped input function that reduces residual vibration. The impulse sequence used in the convolution is called an input shaper. For example, if it is desired to move a system from one point to another, (a step change in position) then the convolution of the step function with a sequence of impulses results in a shaped input which is a series of steps, or a staircase. Similarly, if a constant ramp input is commanded, the shaped input will be a ramp whose slope changes value as a function of time. Instead of giving the system the step or ramp input, the system is given the shaped input. Selection of the impulse amplitudes and locations in time determine the amplitude of residual vibration.

Figure 1B:
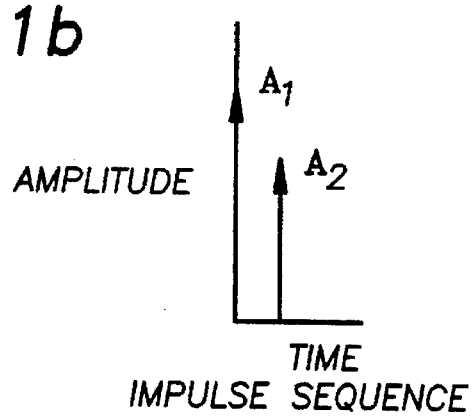
Figure 1C:
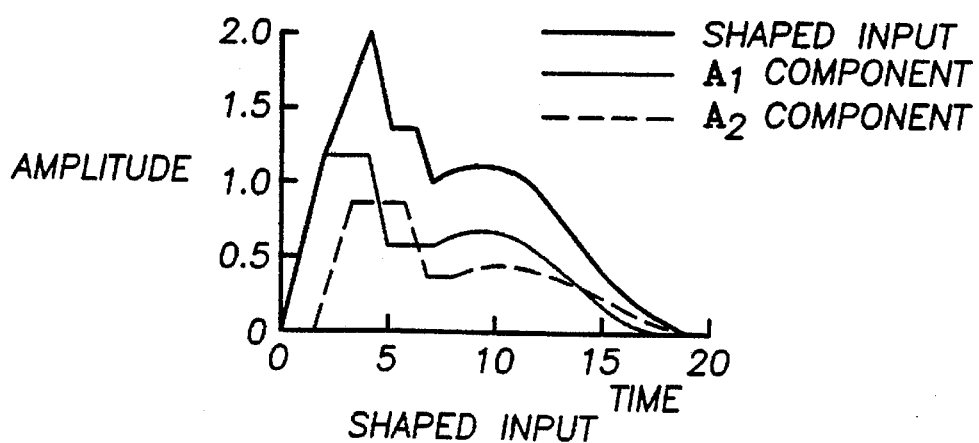

The commanded input is not limited to steps and ramps. Rather, any command function can be shaped with an impulse sequence. FIG. 1a depicts a general input which is convolved with the impulse sequence of FIG. 1b. The resulting shaped input is shown as the solid line in FIG. 1c; while the dotted and dashed lines are the two components arising from each of the two impulses of FIG. 1b. Sequences containing three impulses have been shown to yield particularly effective system inputs (when convolved with system commands) both in terms of vibration suppression and response time. The shaping method is effective in reducing vibration in both open and closed loop systems.

This section extends the basic Input Shaping™ technique of Singer and Seering and concentrates on generating different impulse sequences to be used in the convolution that produces the vibration-reducing inputs. Unlike the time domain analysis presented in references [Singer, Neil C. Residual Vibration Reduction in Computer Controlled Machines. Ph.D. Thesis, Massachusetts Institute of Technology. (February 1989), Singer, Neil C.; Seering, Warren P. "Preshaping Command Inputs to Reduce System Vibration". ASME Journal of Dynamic Systems, Measurement, and Control. (March 1990)], this work uses vector diagrams, which are graphical representations of impulse sequences, to generate and evaluate the vibration-reducing characteristics of impulse sequences. By relaxing the constraints used by Singer and Seering, a variety of sequences can be generated that give better performance than those reported previously.

Vector Diagrams

To understand the results presented in this section, one must be familiar with the vector diagram representation of vibration and its use in creating shaped inputs. An explanation of vector diagram methods was presented in [Singhose, William E. "Shaping Inputs to Reduce Residual Vibration: a Vector Diagram Approach". MIT Artificial Intelligence Lab Memo No. 1223. (March, 1990)] and will be summarized here.

Figure 2A:
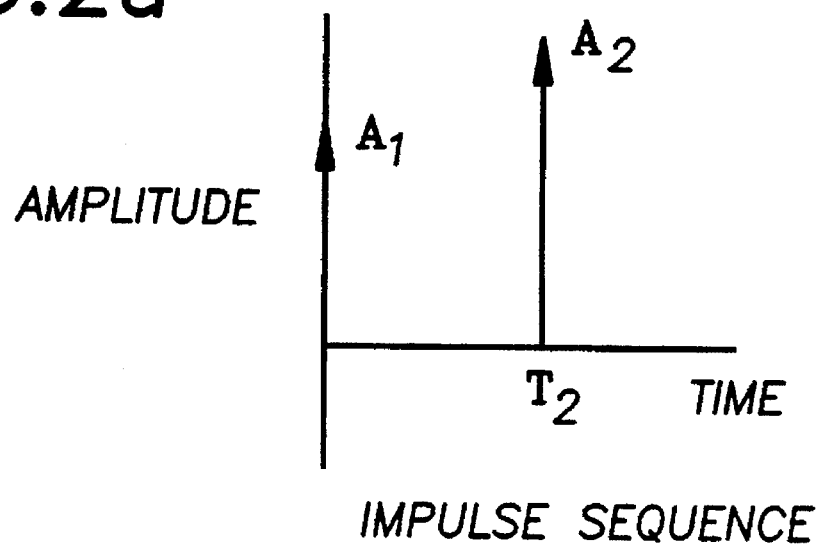
FIGS. 2a and 2b illustrate the correspondance between an impulse sequence and its vector diagram.
Figure 2B:
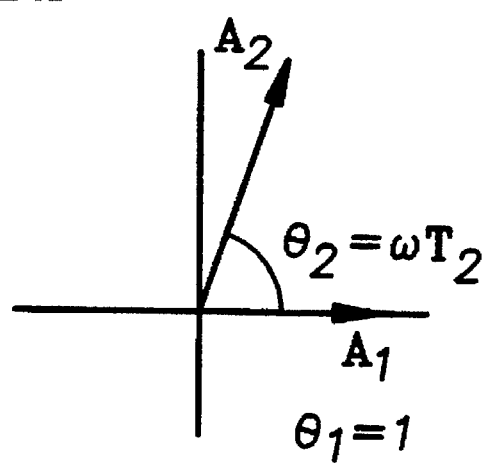

A vector diagram is a graphical representation of an impulse sequence in polar coordinates (r-θ space). A vector diagram is created by setting r equal to the amplitude of an impulse and by setting θ=ωT, where ω (rad/sec) is a chosen frequency and T is the time location of the impulse. FIG. 2a shows a typical impulse sequence and FIG. 2b shows the corresponding vector diagram.

Vector diagrams become useful tools for producing vibration-reducing impulse sequences when ω is set equal to the best estimate of a natural frequency, ωsys, of a system and the time of the first impulse is set to zero (T1=0). When a vector diagram is created in this manner, the amplitude of the resultant, $A_R$, is proportional to the amplitude of residual vibration of a system driven by a step convolved with the impulse sequence. The angle of the resultant is the phase of the vibration relative to the system response to an impulse at time zero.

Figure 3A:
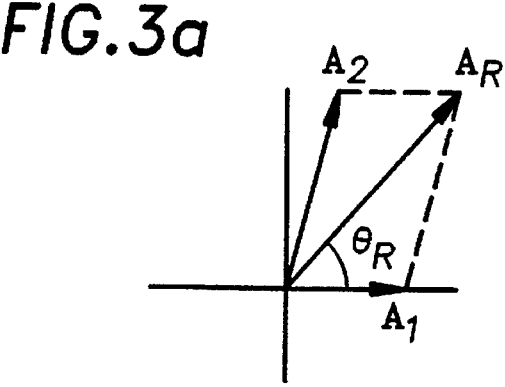
FIGS. 3a, 3b and 3c illustrate the correspondance between a vector diagram and its time domain representation of vibration.
Figure 3B:
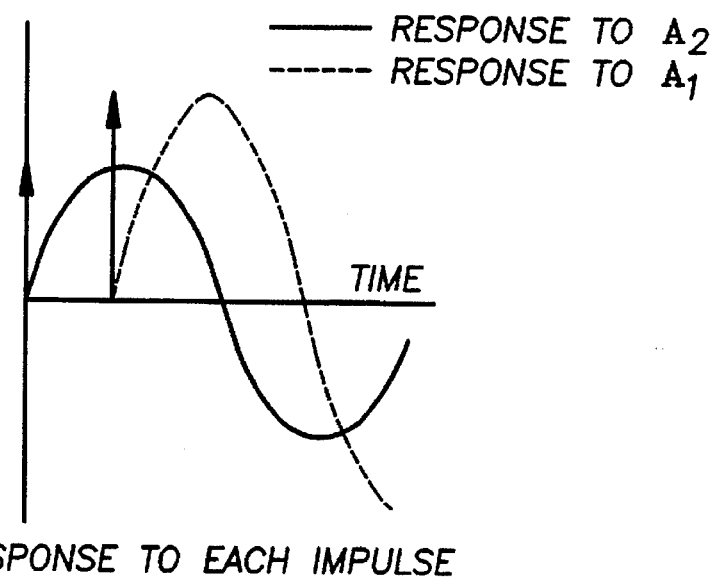
Figure 3C:
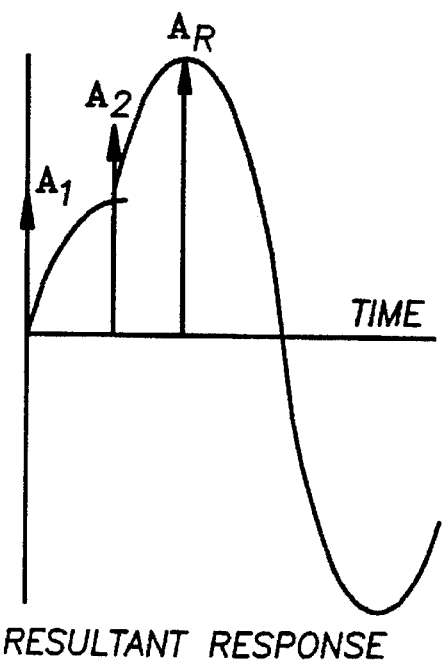

Because arbitrary inputs can be built as sums of steps, the amplitude of $A_R$ is a measure of system response to arbitrary inputs. This result enables us to determine residual vibration geometrically; the residual vibration is calculated by geometrically summing the vectors on the vector diagram. FIG. 3a shows the vector diagram representation for the resultant vibration of a second order undamped system. FIG. 3b shows the time domain representation of each component of the vibration, and FIG. 3c shows the time domain representation of the resultant. On a vector diagram, vibration appears as a vector, whereas, in the time domain, vibration appears as a sinusoid.

We can use the vector diagram to generate impulse sequences that yield vibration-free system response. To do this, we place n arbitrary vectors on a vector diagram and then cancel the resultant of the first n vectors with an n+1st vector. When the n+1 vectors are converted into an impulse sequence, and the sequence is convolved with a desired system input, the resulting shaped input will cause no residual vibration when applied to a system with natural frequency ω. Additionally, if the sum of impulse amplitudes is normalized to one, the system will stop at the commanded setpoint.

The magnitude, $A_{n+1}$, and angle, $\theta_{n+1}$, of the canceling vector are given by:

$$|A_{n+1}| = \sqrt{|R_x|^2 + |R_y|^2} \quad \theta_{n+1} = \pi + \tan^{-1}\left\{\frac{R_y}{R_x}\right\} \tag{1}$$

where $R_x$ and $R_y$ are the horizontal and vertical components of the resultant. These components are given by $$R_x = \sum_{i=1}^{n} A_i \cos\theta_i \quad R_y = \sum_{i=1}^{n} A_i \sin\theta_i \tag{2}$$

where $A_i$ and $\theta_i$ are the magnitude and angles of the n vectors to be cancelled.

The Effects Of Damping

When the system has viscous damping, the vector diagram representation of vibration must be modified in two ways. First, we must use the damped natural frequency for plotting the vector diagram. This corresponds to using:

$$\theta = \sqrt{1-\zeta^2}\,\omega T \tag{3}$$

where $\zeta$ is the damping coefficient.

Figure 4A:
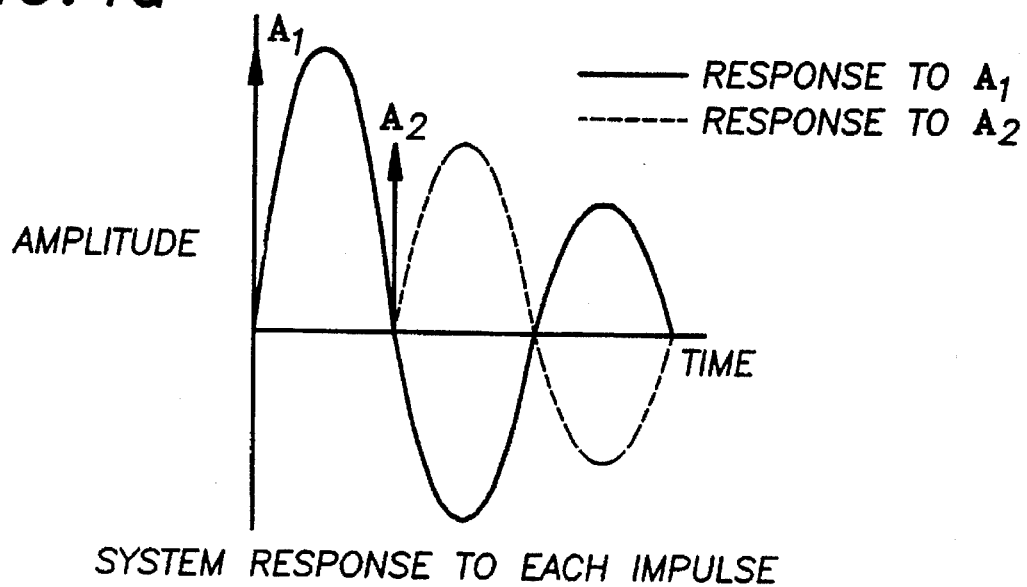
FIGS. 4a and 4b illustrate the scaling effect of a damping coefficient.
Figure 4B:
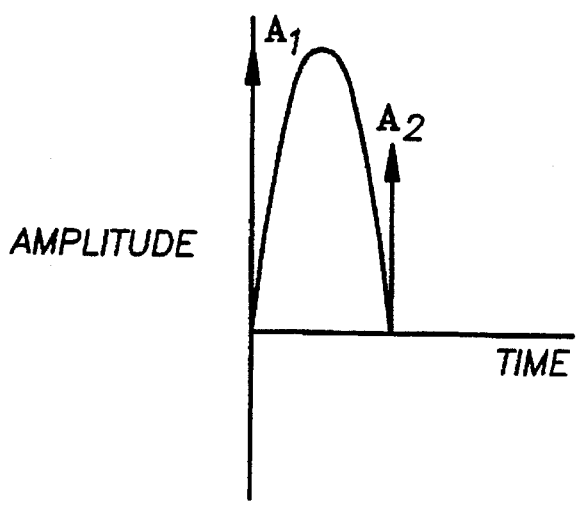

Second, the amplitudes of the vectors must be scaled to account for damping. As time progresses, the amplitude of response decays; therefore, the amplitude of the canceling vector decreases. For example, if we give a system an impulse with amplitude $A_1$, at time zero, the single impulse, $A_2$, that will cancel the system's vibration is located $\pi$ radians (180°) out of phase with the first impulse, but it has a smaller amplitude as shown in FIGS. 4a and 4b. If a system has a damping ratio of $\zeta$, then the amplitude of the second impulse is:

$$A_2 = A_1 e^{-\zeta\omega T} = A_1 e^{-\zeta'\theta} \tag{4}$$

where $\theta$ is given by Eq. 3 and $$\zeta' = \zeta/(1-\zeta^2)^{1/2} \tag{5}$$

We define the effective amplitude, $|A_{eff}|$, of an impulse, A, occurring at time T to be the amplitude of an impulse occurring at time zero whose vibratory response would decay to the amplitude of response caused by A at time T. Written in equation form, the effective amplitude of a vector is:

$$|A_{eff}| = \frac{|A|}{e^{-\zeta'\theta}} \tag{6}$$

When we cancel n vectors with an n+1st vector on a vector diagram to create a vibration-eliminating impulse sequence, we must use Eq. 3 to determine the angles of the vectors and assign each of the n vectors an effective amplitude according to Eq. 6 before using Eqs. 1 to solve for the n+1st vector. When we include the effects of damping, the equations describing the n+1st canceling vector are:

$$|A_{n+1}| = \tag{7}$$

-continued $$(e^{-\zeta'\theta_{n+1}})\sqrt{|R_x|^2 + |R_y|^2} \quad \theta_{n+1} = \pi + \tan^{-1}\left\{\frac{R_y}{R_x}\right\}$$

where $R_x$ and $R_y$ are given by:

$$R_x = \sum_{i=1}^{n} A_{i\,eff}\cos\theta_i \quad R_y = \sum_{i=1}^{n} A_{i\,eff}\sin\theta_i \tag{8}$$

Sensitivity to Errors in Natural Frequency

Figure 5A:
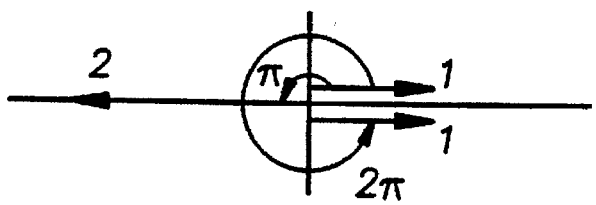
FIG. 5a illustrates a vector diagram for a three-impulse sequence.
Figure 5B:
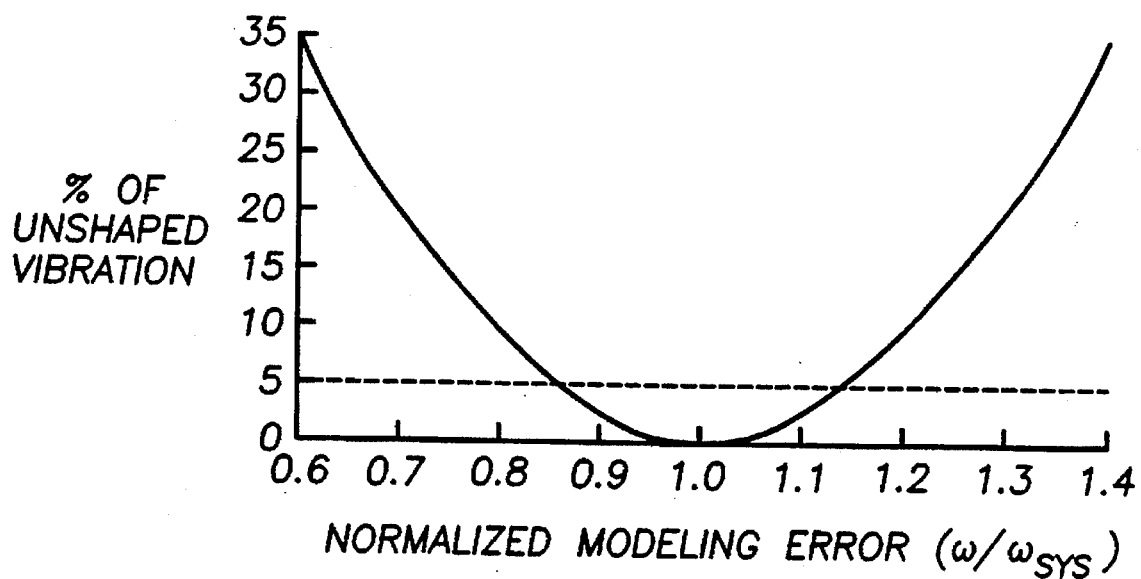

It is possible to create an infinite number of vibration-reducing input functions with the vector diagram tool. The "best" would seem to be the one that works most effectively on real systems. Because there will always be some error in the estimate of natural frequency for any system, the sensitivity of the shaped input to modeling errors is important. When the system model is not exact, some residual vibration will occur when the system is moved with the shaped inputs. A plot of the vibration versus error in estimated natural frequency for a three-impulse sequence developed by Singer and Seering is shown in FIG. 5b and the corresponding vector diagram is shown in FIG. 5a. This impulse sequence produces a system response that is fairly insensitive to errors or changes in the system parameters. That is, there is relatively little vibration in the system even when the resonant frequency estimate is off by 15% as shown.

Effects of Modeling Errors on the Vector Diagram

The sensitivity curve shown in FIG. 5b can be obtained directly from a vector diagram if we analyze how a modeling error changes the diagram. When the natural frequency of a system differs from the assumed natural frequency, the error can be represented on a vector diagram by shifting each vector through an angle $\phi$. If $\omega_{sys}$ is the actual natural frequency of the system and $\omega$ is the modeling frequency, then the error in frequency is $\omega - \omega_{sys}$. The angle through which the vectors are shifted, $\phi$, is related to the frequency error by the equation:

$$\phi = (\omega - \omega_{sys})T \tag{9}$$

The error in modeling causes a non-zero resultant to be formed on the vector diagram if the vectors were determined by Eqs. 1. The resultant that is formed represents the vibration that is induced by the error in frequency.

Given that modeling errors cause a resultant, $R_{err}$, on a vector diagram, we can compare the sensitivity of different input functions to modeling errors by plotting the amplitude of $R_{err}$ versus the error in frequency. If we plot a sensitivity curve like the one shown in FIG. 5b, we can determine how much vibration will result from a given error in estimated frequency. To make a sensitivity curve, we must develop an expression for the amplitude of the resultant as a function of the error in frequency ($\omega - \omega_{sys}$). This has been done previously[Singhose, William E. "A Vector Diagram Approach to Shaping Inputs for Vibration Reduction". MIT Artificial Intelligence Lab Memo No. 1223. (March, 1990)], and the relation is:

$$|R_{err}| = \sqrt{|R_{xerr}|^2 + |R_{yerr}|^2} \tag{10}$$

where:

$$R_{xerr} = \sum_{i=1}^{n} A_{i\,eff}\cos(\theta_i - \phi_i) \quad R_{yerr} = \sum_{i=1}^{n} A_{i\,eff}\sin(\theta_i - \phi_i) \tag{11}$$

$$A_{i,eff} = \frac{A_i}{e^{-\zeta(\theta_i - \phi_i)}} \quad (12)$$

$$\phi_i = \frac{\omega - \omega_{sys}}{\omega} \theta_i \quad (13)$$

Defining Insensitivity

We define the insensitivity of a sequence to be the width of the sensitivity curve at a given level of residual vibration. If the acceptable level of vibration is 5% of the vibration resulting from an unshaped input, then we draw a horizontal line across the sensitivity curve at 5% as shown by the dashed line in FIG. 5b, and the distance between the points of intersection is the insensitivity. Quantitatively, the insensitivity is defined as $I = \Delta\omega/\omega_{sys}$, where $\Delta\omega$ is the distance between the two points of intersection. For example, the insensitivity of the impulse sequence represented by the vector diagram of FIG. 5a is 0.286, because the impulse sequence associated with the sensitivity curve of FIG. 5b causes less than 5% of the unshaped vibration from $(\omega/\omega_{sys})$lo=0.857 to $(\omega/\omega_{sys})$hi=1143.

Increasing Insensitivity by Relaxing Constraints

Figure 6A:
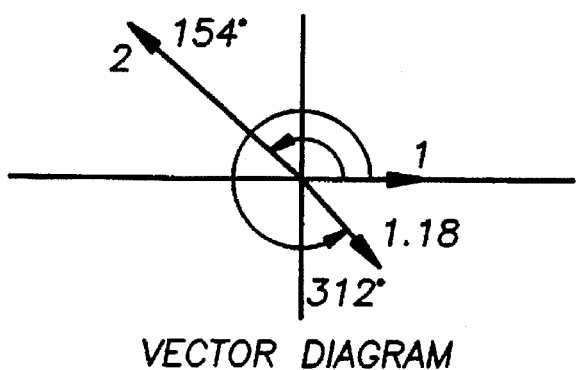
FIG. 6a illustrates a vector diagram for an assymetric three-impulse sequence.
Figure 6B:
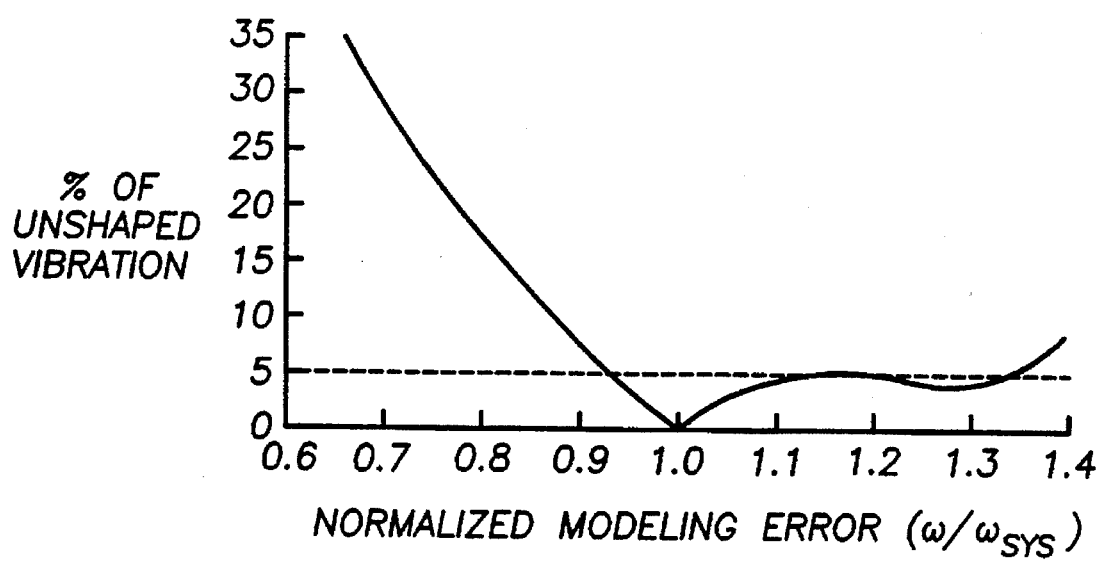

The sensitivity curve in FIG. 5b can be widened by displacing the vectors from the horizontal axis, that is by not placing the second vector at $\pi$ or the third vector at $2\pi$. When the vectors are located off the horizontal axis, the sensitivity curve is skewed; it is not symmetrical about $\omega/\omega_{sys}=1$. For example, we can modify the vector diagram in FIG. 5a by placing the second vector at an angle of 154 degrees, keeping the amplitude fixed at 2, and still satisfying Eqs. 1, as shown in FIG. 6a. The sensitivity curve for this sequence is shown in FIG. 6b. The insensitivity for this input function is 0.408 (0.93 to 1.338), a 43% improvement over that of FIG. 5b. An interesting feature to note is that the sensitivity curve is skewed to the right, i.e., it is more insensitive to errors that are higher in frequency than the modeling frequency. This may be a desirable property of an input function if the system being moved increases its natural frequency during some part of its operation. However, an approximation of a system's resonant frequency is usually as likely to be too high as too low, so it seems desirable to maintain symmetrical insensitivity in most cases.

To increase insensitivity and still maintain a symmetrical sensitivity curve, we can relax Singer's constraint of zero vibration when the system model is exact. Any system model will have some amount of approximation, so giving up this strict constraint is reasonable. Insensitivity is increased significantly if we reformulate the constraints in the following way. Pick an allowable level of residual vibration, V. Then, calculate amplitudes for the impulses at $\theta=0$, $\pi$, and $2\pi$ such that the residual vibration equals V when $\omega/\omega_{sys}=1$. Furthermore, require the sensitivity curve to drop to zero on either side of $\omega/\omega_{sys}=1$.

From the above conditions, we can derive the three-impulse sequence that yields the maximum insensitivity for a given vibration limit. The sensitivity curve will be constrained to be symmetrical about the modeling frequency, this means the angle of the third vector, $\theta_3$, is always twice the angle of the second vector, $\theta_2$. In equation form:

$$\theta_3 = 2\theta_2 \quad (14)$$

When the resultant at the modeling frequency is set equal to the vibration limit, V, we have:

$$|A_1| - |A_2| + |A_3| = V(|A_1| + |A_2| + |A_3|) \quad (15)$$

The value of $|A_2|$ is subtracted from the left side of Eq. 15 because the vector $A_2$ points in the opposite direction of $A_1$ and $A_3$ on the vector diagram. We have arbitrarily set $|A_1|$ equal to one, so Eq. 15 reduces to:

$$|A_2| = \frac{(1-V)(1+|A_3|)}{(1+V)} \quad (16)$$

Because we are forcing the sensitivity curve to drop to zero on either side of $\omega/\omega_{sys}=1$, the resultant on the vector diagram must equal zero for the values of $\theta+\alpha$ and $\theta-\beta$, where $\alpha$ and $\beta$ are some unknown deviations from the angle corresponding to $\omega/\omega_{sys}=1$. In equation form this constraint is:

$$0 = 1 + |A_2|\cos(\theta_2+\alpha) + |A_3|\cos(\theta_3+2\alpha) \quad (17)$$

$$0 = |A_2|\sin(\theta_2+\alpha) + |A_3|\sin(\theta_3+2\alpha) \quad (18)$$

$$0 = 1 + |A_2|\cos(\theta_2-\beta) + |A_3|\cos(\theta_3-2\beta) \quad (19)$$

$$0 = |A_2|\sin(\theta_2-\beta) + |A_3|\sin(\theta_3-2\beta) \quad (20)$$

Eqs. 14 and 16–20 are six equations with seven unknowns, ($A_2$, $A_3$, $\theta_2$, $\theta_3$, $\alpha$, $\beta$ and V). Neglecting damping and solving the equations in terms of V, we obtain the following values for the extra-insensitive sequence we were seeking:

$$|A_1| = \frac{1+V}{4} \quad (21)$$

$$\theta_1 = 0$$

$$|A_2| = \frac{1-V}{2}$$

$$\theta_2 = \pi$$

$$|A_3| = \frac{1+V}{4}$$

$$\theta_3 = 2\pi$$

Figure 7:
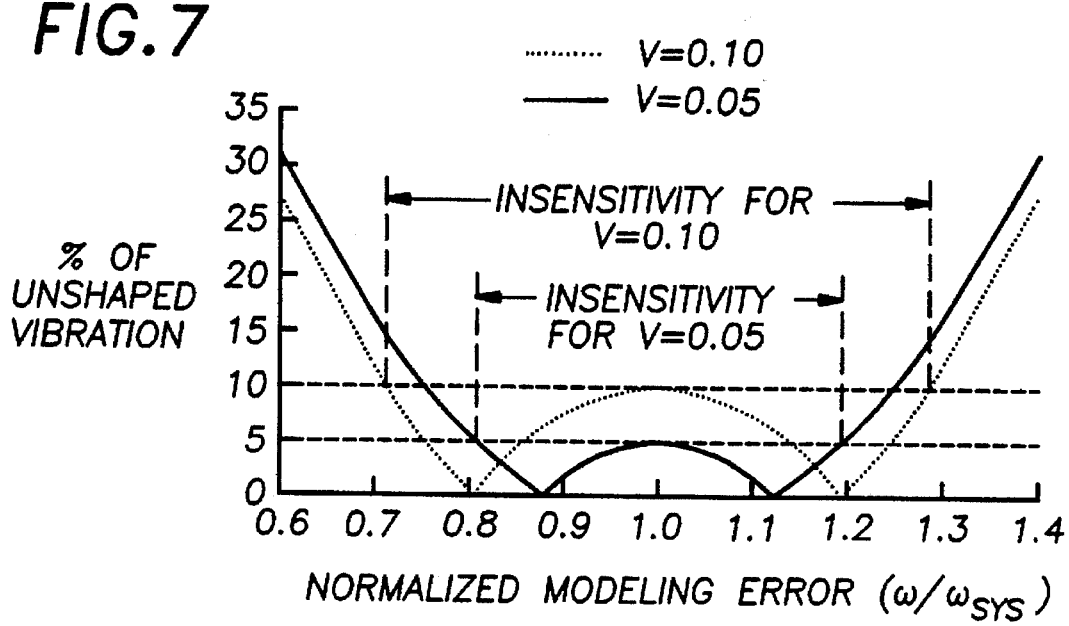
FIG. 7 graphs residual vibration versus normalized modeling error for two different three-impulse sequences, and illustrates the allowable normalized modeling error for two different values of insensitivity.

If we examine the sensitivity curves for the above sequence, we discover that when the vibration limit is increased, insensitivity improves significantly. The insensitivity is 0.399 when V=0.05, a 39% improvement over Singer's three-impulse sequence of FIG. 5a. The insensitivity further increases from 0.399 to 0.561 when V is increased from 0.05 to 0.10, as shown in FIG. 7.

When the system has viscous damping, the constraint equations cannot be solved in closed form. Fortunately, the equations containing damping terms that are analogous to Eqs. 14–20 can be solved numerically to obtain the impulse sequence as a function of two variables, $\zeta$ and V. Numerical solutions were calculated for $0 \leq \zeta \leq 0.3$ and $0 \leq V \leq 0.15$. A surface was fit to the data and the following description of the extra-insensitive sequence in the time domain was obtained:

$$A1 = 0.2497 + 0.2496V + 0.8001\zeta + 1.233V\zeta + 0.4960\zeta^2 + 3.173V\zeta^2$$

$$A2 = 1-(A1+A3)$$

$$A3 = 0.2515 + 0.2147V - 0.8325\zeta + 1.415V\zeta + 0.8518\zeta^2 - 4.901V\zeta^2$$

$$T1 = 0 \quad (22)$$

$$T2 = (0.5000 + 0.4616V\zeta + 4.262V\zeta^2 + 1.756V\zeta^3 + 8.578V^2\zeta - 108.6V^2\zeta^2 + 337.0V^2\zeta^3)T_d$$

$$T3 = T_d$$

where, $T_d$ is the period of damped vibration:

$$T_d = \frac{2\pi}{\omega\sqrt{1-\zeta^2}} \tag{23}$$

If we examine the sensitivity curves for the above sequence, we discover that damping increases the insensitivity to modeling errors. For example, the undamped sequence based on V=5% has an insensitivity of 0.399 while the sequence corresponding to V=5% and $\zeta$=0.1 has an insensitivity of 0.470, an 18% improvement. When the damped sequence is used, the frequencies at which the sensitivity goes to zero are more distant from the modeling frequency and the sensitivity curves are skewed toward the higher frequencies.

Experimental Results

Tests were performed on the assembly robot described in reference [Vaaler, Erik; Seering, Warren P., "Design of a Cartesian Robot". Presented at the winter annual meeting of the ASME (1986)]. A steel beam with a mass at one end was attached to a turntable on the robot base. The table was driven by a DC motor under PD control and its position was measured by an optical encoder.

Figure 8:
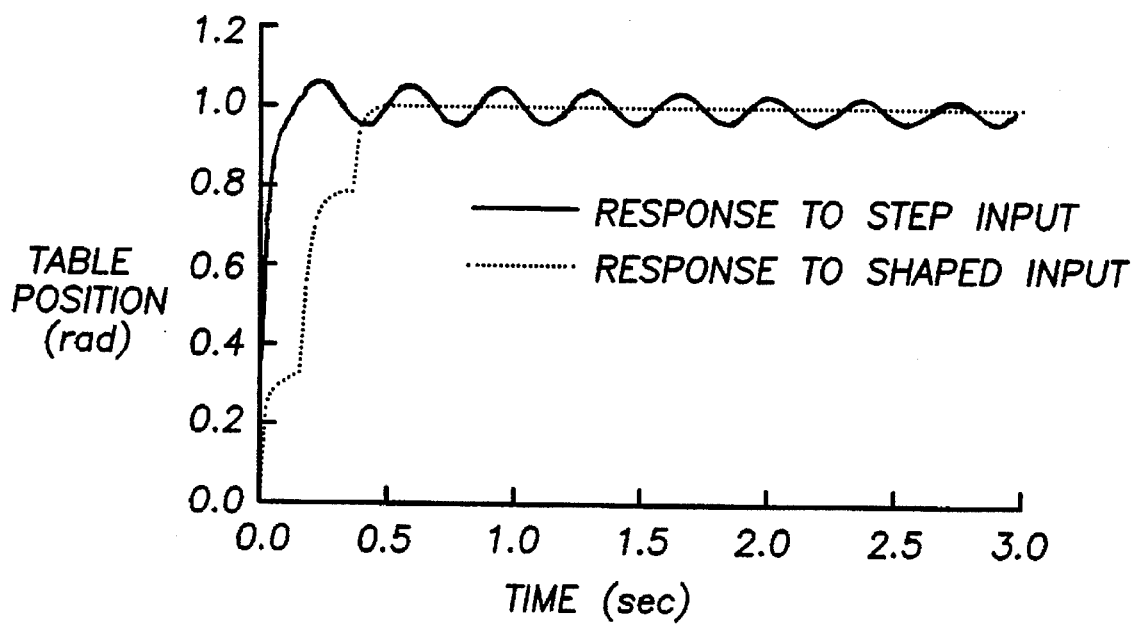
FIG. 8 is a graph of table position versus time for shaped and unshaped inputs.

When the table was given a step input in position, large oscillations were induced in the beam-mass system. The solid line of FIG. 8 shows a typical system response to a step input. The system parameters were determined by examining the data from a step response. The natural frequency was estimated to be 2.8 Hertz and the damping ratio was approximated as 0. The step input was then shaped by the impulse sequence given by Eqs. 21 with the vibration limit set to 5%. The dotted curve in FIG. 8 shows the system response to the shaped input.

Sensitivity curves for the impulse sequence were experimentally determined by purposely introducing errors in the system model. The experimentally determined natural frequency was chosen as the "exact" frequency ($\omega_{sys}$=2.8 Hz). Impulse sequences were then derived for frequencies ranging from $0.7\omega_{sys}$ to $1.4\omega_{sys}$ (1.96 Hz–3.92 Hz). Each impulse sequence was used to shape a step command and the shaped input was applied to the system. The amplitude of the resulting vibration was recorded. This amplitude was then divided by the baseline value to get the percentage of the unshaped vibration caused by the shaped input. By plotting the percentage of the unshaped vibration versus the normalized modeling error ($\omega/\omega_{sys}$), sensitivity curves were obtained.

Figure 9:
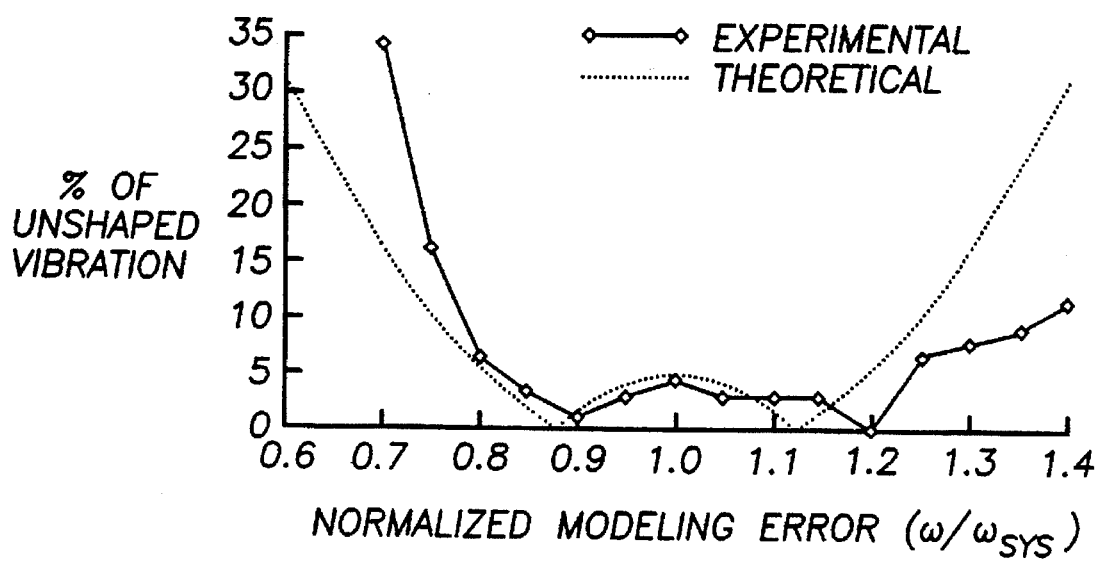
FIG. 9 is a graph of the experimental and theoretical residual vibration versus normalized modeling error for the case of V=0.05.
Figure 10:
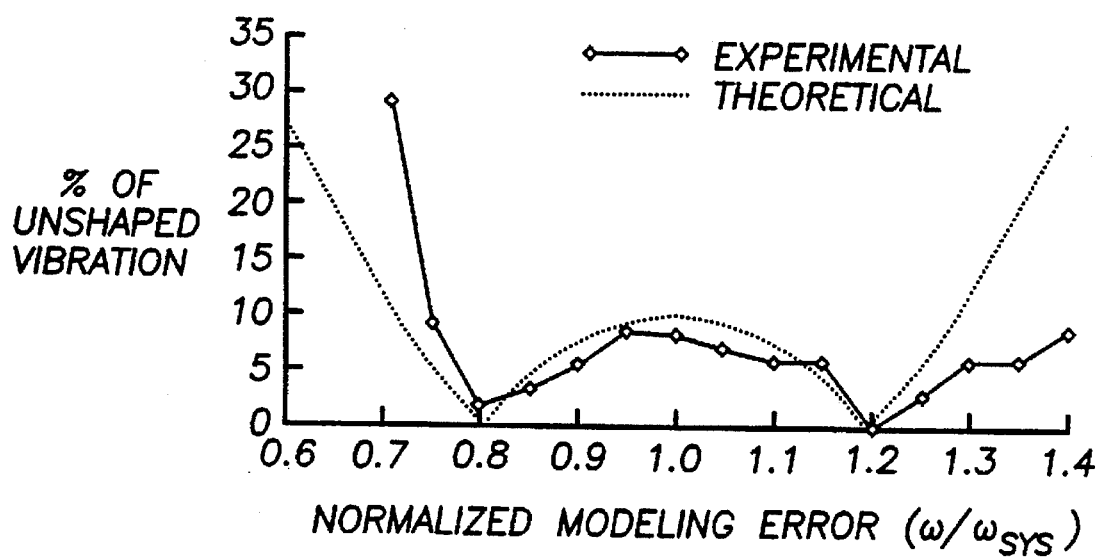
FIG. 10 is a graph of the experimental and theoretical residual vibration versus normalized modeling error for the case of V=0.10.

FIG. 9 shows the experimentally determined sensitivity data when the vibration limit was set to 5%. The data follows the same general shape as the theoretically determined sensitivity curve of FIG. 7. The curve has a non-zero value when the system model is correct and it slopes down toward zero on either side of the modeling frequency. The experimentally determined insensitivity for V=0.05 was approximately 0.42, which slightly exceeds the theoretical insensitivity of 0.399. FIG. 10 shows the experimental sensitivity curve for V=0.1. The insensitivity increased to approximately 0.67, once again better than the theoretical insensitivity for V=0.1 of 0.561. The experimental results were somewhat better than the theory predicted because the system model was undamped, while the actual hardware did have some small amount of damping. As was previously remarked, damping increases insensitivity to modeling errors.

Four-Impulse Extra-Insensitive Shapers

Instead of limiting the sequence to three impulses, we can obtain more insensitivity with a four-impulse sequence that has a length of 1.5 periods of vibration. To maximize the insensitivity for a shaper of this length, we solve the following equations for a damped system:

$$\Sigma A_i = 1 \tag{24}$$

$$0 = e^{-\zeta\omega t_4}\{(\Sigma A_i e^{\zeta\omega t_i}\cos(\omega\sqrt{1-\zeta^2}\ t_i))^2 + \tag{25}$$

$$(\Sigma A_i e^{\zeta\omega t_i}\sin(\omega\sqrt{1-\zeta^2}\ t_i))^2\}^{1/2}$$

$$V = e^{-\zeta\omega_{lo}t_4}\{(\Sigma A_i e^{\zeta\omega_{lo}t_i}\cos(\omega_{lo}\sqrt{1-\zeta^2}\ t_i))^2 +$$

$$(\Sigma A_i e^{\zeta\omega_{lo}t_i}\sin(\omega_{lo}\sqrt{1-\zeta^2}\ t_i))^2\}^{1/2}$$

$$V = e^{-\zeta\omega_{hi}t_4}\{(\Sigma A_i e^{\zeta\omega_{hi}t_i}\cos(\omega_{hi}\sqrt{1-\zeta^2}\ t_i))^2 + \tag{26}$$

$$(\Sigma A_i e^{\zeta\omega_{hi}t_i}\sin(\omega_{hi}\sqrt{1-\zeta^2}\ t_i))^2\}^{1/2}$$

$$0 = \frac{d}{d\omega_{lo}}(e^{-\zeta\omega_{lo}t_4}\{(\Sigma A_i e^{\zeta\omega_{lo}t_i}\cos(\omega_{lo}\sqrt{1-\zeta^2}\ t_i))^2 +$$

$$(\Sigma A_i e^{\zeta\omega_{lo}t_i}\sin(\omega_{lo}\sqrt{1-\zeta^2}\ t_i))^2\}^{1/2})$$

$$0 = \frac{d}{d\omega_{hi}}(e^{-\zeta\omega_{hi}t_4}\{(\Sigma A_i e^{\zeta\omega_{hi}t_i}\cos(\omega_{hi}\sqrt{1-\zeta^2}\ t_i))^2 + \tag{27}$$

$$(\Sigma A_i e^{\zeta\omega_{hi}t_i}\sin(\omega_{hi}\sqrt{1-\zeta^2}\ t_i))^2\}^{1/2})$$

$$0 = e^{-\zeta\omega_{l2}t_4}\{(\Sigma A_i e^{\zeta\omega_{l2}t_i}\cos(\omega_{l2}\sqrt{1-\zeta^2}\ t_i))^2 +$$

$$(\Sigma A_i e^{\zeta\omega_{l2}t_i}\sin(\omega_{l2}\sqrt{1-\zeta^2}\ t_i))^2\}^{1/2}$$

$$0 = e^{-\zeta\omega_{h2}t_4}\{(\Sigma A_i e^{\zeta\omega_{h2}t_i}\cos(\omega_{h2}\sqrt{1-\zeta^2}\ t_i))^2 + \tag{28}$$

$$(\Sigma A_i e^{\zeta\omega_{h2}t_i}\sin(\omega_{h2}\sqrt{1-\zeta^2}\ t_i))^2\}^{1/2}$$

where, $\omega_{hi}$ and $\omega_{h2}$ are unknown (variables) frequencies that are higher than $\omega$. $\omega_{lo}$ and $\omega_{l2}$ are unknown frequencies lower than $\omega$, $\omega_{h2}$ is higher than $\omega_{hi}$, and $\omega_{l2}$ is lower than $\omega_{lo}$. Note that each of the eqs. in 27–28 produce two more equations in the optimization process, one for the sin part and one for the cos part.

The solution to Eqs. 24–28 when $\zeta$=0 is:

$$A_1 = \frac{3x^2 + 2x + 3V^2}{16x} \tag{29}$$

$$T_1 = 0$$

$$A_2 = 0.5 - \frac{3x^2 + 2x + 3V^2}{16x}$$

$$T_2 = 0.5T$$

$$A_3 = 0.5 - \frac{3x^2 + 2x + 3V^2}{16x}$$

$$T_3 = T$$

$$A_4 = \frac{3x^2 + 2x + 3V^2}{16x}$$

$$T_4 = 1.5T$$

where T is the period of vibration and:

$$x = \{V^2[(1-V^2)^{1/2}+1]\}^{1/3} \tag{30}$$

Figure 11:
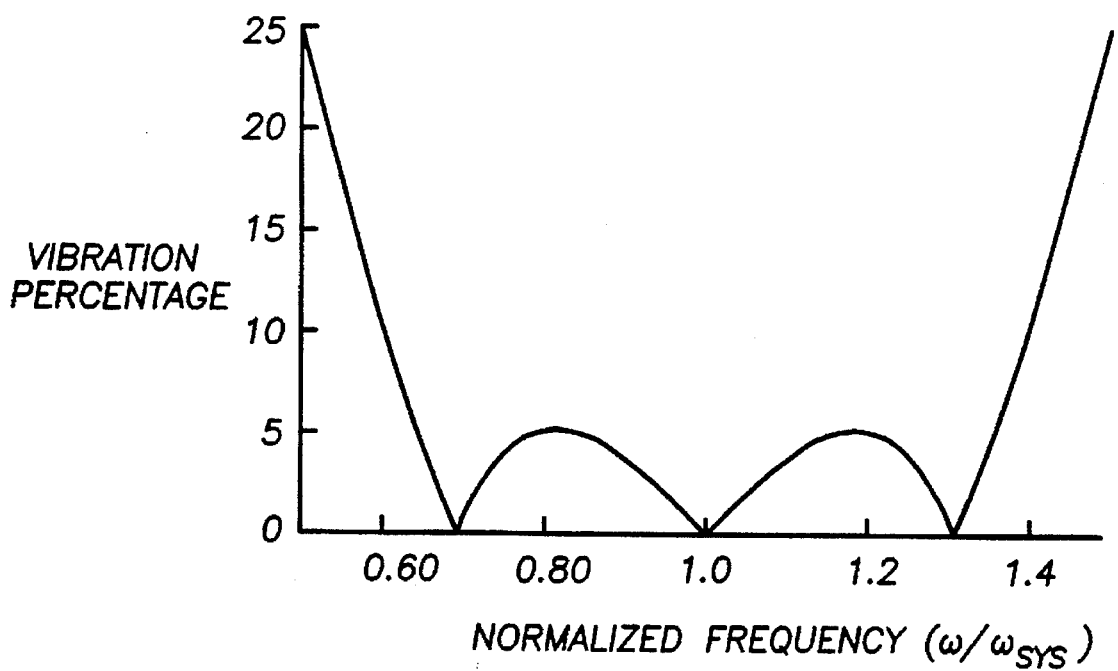
FIG. 11 graphs residual vibrations versus normalized frequency for a four-impulse sequence.

A sensitivity curve for the four-impulse extra-insensitive sequence is shown in FIG. 11. When damping is added to the problem formulation, the equations for the four-impulse extra-insensitive shaper cannot be solved in closed form. However, the equations can be solved numerically to obtain the impulse sequence as a function of two variables, $\zeta$ and V. Numerical solutions were calculated for $0 \leq \zeta \leq 0.2$ and $V=0.05$. A curve was fit to the data and the following description of the four-impulse extra-insensitive shaper for $V=0.05$ was obtained as:

$A_1 = 0.1608 + 0.7475\zeta + 1.948\zeta^2 - 0.4882\zeta^3$ $A_2 = 1 - (A_1 + A_3 + A_4)$ $A_3 = 0.3394 - 0.5466\zeta - 1.1354\zeta^2 + 2.6167\zeta^3$ $A_4 = 0.1589 - 0.5255\zeta + 0.4152\zeta^2 + 1.0164\zeta^3$ (31)

$T_1 = 0$ $T_2 = (0.5000 + 0.1426\zeta - 0.6243\zeta^2 + 6.590\zeta^3)T_d$ $T_3 = (1.0 + 0.17226\zeta - 1.725\zeta^2 + 10.058\zeta^3)T_d$ $T_4 = T_d$ Extra-Insensitive Shapers with an Arbitrary Number of Humps in the Sensitivity Curve The EI formulation can be extended to obtain any number of humps in the sensitivity curve. The three-impulse EI shaper had one hump and the four-impulse shaper had two humps. The constraint formulation for the Q-hump EI shaper can be summarized as follows:

For Q even,

1) Set the vibration equal to 0 at the modeling frequency.
2) Set the vibration equal to V and the derivative equal to 0 at Q/2 frequencies higher than the modeling frequencies and Q/2 frequencies lower than the modeling frequency.
3) Set the vibration equal to 0 at Q/2 frequencies higher than the modeling frequencies and Q/2 frequencies lower than the modeling frequency.
4) The frequencies in steps 2 and 3 must alternate as we go away from the modeling frequency, with a frequency from step 2 occurring first.

For Q odd,

1) Set the vibration equal to V and the derivative equal to 0 at the modeling frequency.
2) Set the vibration equal to 0 at (Q+1)/2 frequencies higher than the modeling frequencies and (Q+1)/2 frequencies lower than the modeling frequency.
3) Set the vibration equal to V and the derivative equal to 0 at (Q-1)/2 frequencies higher than the modeling frequencies and (Q-1)/2 frequencies lower than the modeling frequency.
4) The frequencies in steps 2 and 3 must alternate as we go away from the modeling frequency, with a frequency from step 2 occurring first.

Specified Insensitivity Shapers

The previously described shapers were derived by specifying the shaper time length and then maximizing the insensitivity. As an alternative approach to shaper design, the desired insensitivity to modeling errors can be specified and then the shaper can be solved for by minimizing the length. The difficulty with this process is that the set of equations to be solved depends on the desired insensitivity. This can be seen by examining the undamped three and four-impulse extra-insensitive shapers presented above. (These shapers can be considered specified insensitivity shapers whose desired insensitivities are 0.399 and 0.726, respectively.) The equations for the three-impulse EI, Eqs. 14, 16–20, are noticeably different than the equations for the four-impulse EI shaper, Eqs. 24–28.

The equations describing an SI shaper can be determined from the desired insensitivity and the system damping. The first step in formulating the set of constraint equations is to determine how many humps there will be in the sensitivity curve. For instance, the three-impulse EI shaper has 1 hump in its sensitivity curve, while the four-impulse EI shaper has two humps, as shown in FIGS. 7 and 11. Given the desired insensitivity, I, the number of humps can be determined for $V=0.05$ from the following decision tree:

if $I < 0.2218 + 0.3143\zeta + 0.1819\zeta^2 + 0.4934\zeta^3$, then the number of humps=0;

if $I < 0.5916 + 0.7647\zeta + 0.60\zeta^2 + 0.3708\zeta^3$ (32)

then the number of humps=1;

if $I < 0.8737 + 1.0616\zeta - 0.2847\zeta^2 + 3.2461\zeta^3$ then the number of humps=2, SI Shapers with more than two humps in their sensitivity curve can be determined, but they are rarely needed, so there development will be left out of this presentation.

Once the number of sensitivity curve humps has been determined, we must then determine how many impulses will be necessary to achieve the desired insensitivity. The number of impulses for $V=0.05$ can be determined from the following decision tree:

if $I < 0.06363 + 0.01044\zeta + 0.07064\zeta^2 + 0.40815\zeta^3$, then the number of impulses=2;

if $I < 0.3991 + 0.6313\zeta + 0.3559\zeta^2 + 2.3052\zeta^3$ and $I > 0.06363 + 0.01044\zeta + 0.07064\zeta^2 + 0.40815\zeta^3$, (33)

then the number of impulses=3;

if $I > 0.3991 + 0.6313\zeta + 0.3559\zeta^2 + 2.3052\zeta^3$ then the number of impulses=4.

Once the number of sensitivity curve humps and the number of impulses have been determined, the equations to be solved are known. We have followed this process and determined the SI shaper for a wide range of I, $\zeta$, and V. For example, the SI shaper for $V=0.05$, number of humps=0, and number of impulses=2, is described by:

$A_1 = 0.5 + 0.7623\zeta - 0.0320\zeta^2 - 0.2550\zeta^3$ (34)

Figure 12:
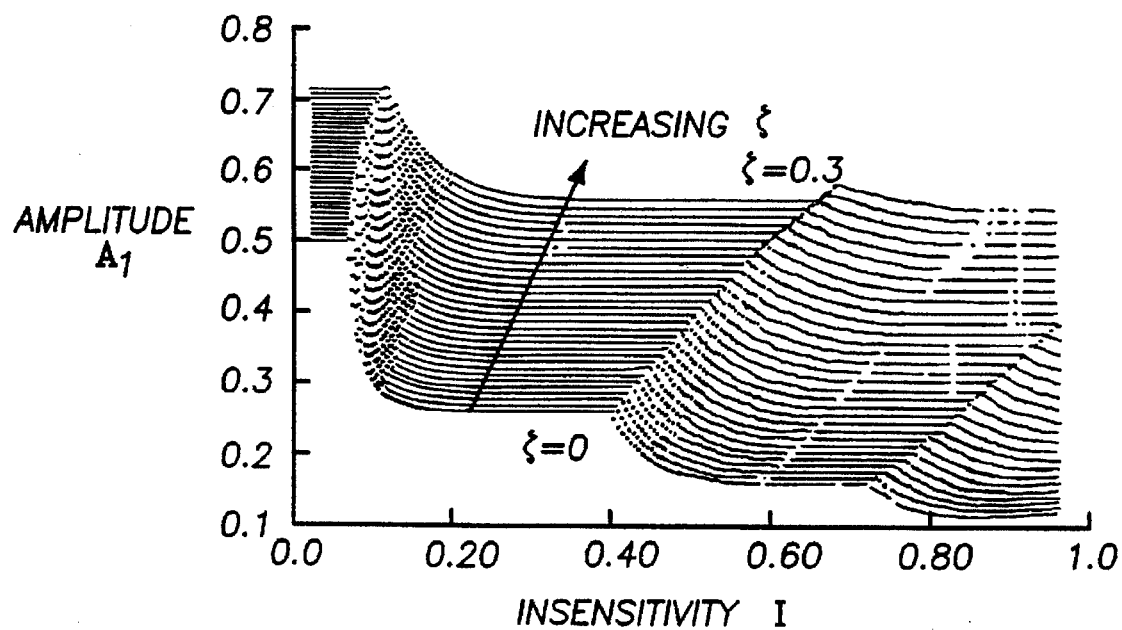
FIG. 12 graphs the amplitude of the first impulse of a multi-impulse sequence as a function of insensitivity and damping coefficient.
Figure 13:
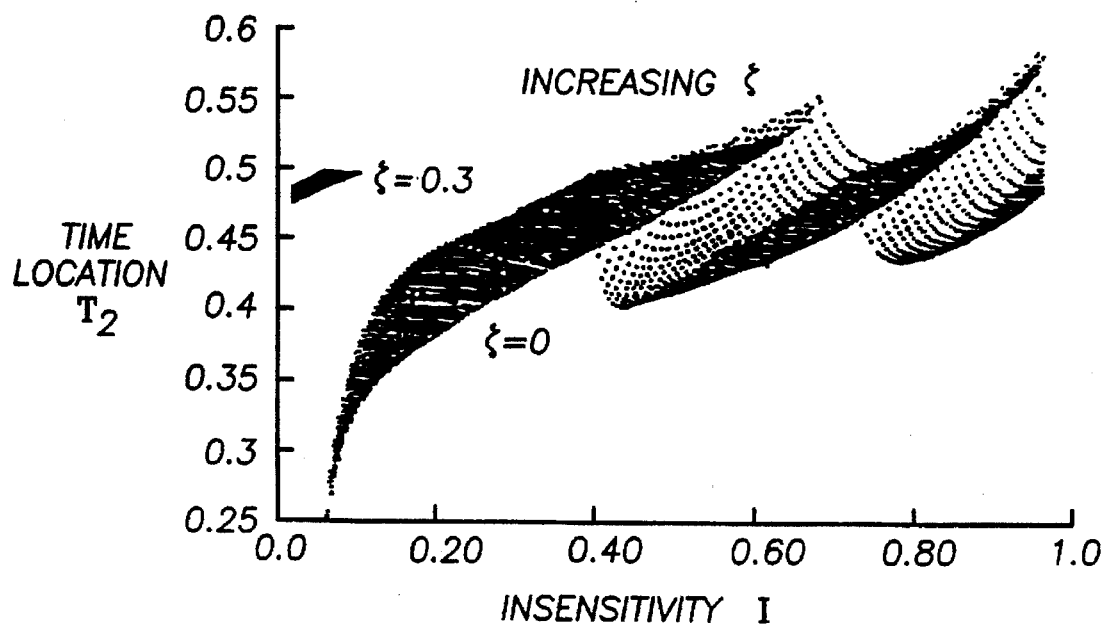
FIG. 13 graphs the location of the second impulse of a multi-impulse sequence as a function of insensitivity and damping coefficient.

$A_2 = 1 - A_1$ $T_1 = 0$ $T_2 = \begin{bmatrix} 0.4839 + 0.2522I + (-0.0253 - 0.0066I)\zeta + \\ (-0.02519 + 0.03407I)\zeta^2 + \\ (-0.09932 - 0.0665I)\zeta^3 \end{bmatrix} T_d$ The amplitudes and time locations of the impulses composing the SI shaper are complex functions of V, I, and $\zeta$, as demonstrated by the need for decision trees. To graphically demonstrate the complexity, $A_1$ is plotted as a function of I and $\zeta$ in FIG. 12 for the case of $V=0.05$. FIG. 13 shows the corresponding curves for $T_2$.

Negative Input Shapers

Introduction

Traditionally, the constraint equations used to determine input shapers have required positive values for the impulse amplitudes. However, move time can be significantly reduced by allowing the shaper to contain negative impulses. [Rappole, B. W.; Singer, N. C.; Seering, W. P. "Input Shaping™ with Negative Sequences for Reducing Vibrations in Flexible Structures," *Proceedings of 1993 Automatic Controls Conference*, San Francisco, Calif.]. considers the subject of time-optimal negative input shapers. Unfortunately, the method for obtaining time-optimal negative shapers presented in [Rappole, B. W.; Singer, N. C.; Seering, W. P. "Input Shaping™ with Negative Sequences for Reducing Vibrations in Flexible Structures," *Proceedings of 1993 Automatic Controls Conference*, San Francisco, Calif.] required the numerical solution of a set of simultaneous transcendental equations. This invention presents a look-up method that allows the design of negative input shapers without solving a set of complicated equations.

The constraint equations used to design an input shaper can vary greatly depending on the application, but they always include limitations on the amplitude of vibration at problematic frequencies. The constraint on vibration amplitude can be expressed as the ratio of residual vibration amplitude with shaping to that without shaping. This percentage vibration ratio is given by:

$$\% \text{Vibration} = e^{-\zeta \omega t_n} \{ (\Sigma A_i e^{\zeta \omega t_i} \cos(\omega \sqrt{1-\zeta^2}\ t_i))^2 + (\Sigma A_i e^{\zeta \omega t_i} \sin(\omega \sqrt{1-\zeta^2}\ t_i))^2 \}^{1/2} \quad (1)$$

where $A_i$ and $t_i$ are the amplitudes and time locations of the impulses, $t_n$ is the time of the last impulse, $\omega$ is the vibration frequency, and $\zeta$ is the damping ratio.

In addition to limiting vibration amplitude, most shaping methods require some amount of insensitivity to modeling errors. A shaper's insensitivity is displayed by a sensitivity curve: a plot of vibration versus frequency, (Eq. 1 plotted as a function of $\omega$). A sensitivity curve reveals how much residual vibration will exist when there is an error in the estimation of the vibration frequency.

Most of the single-mode input shapers discussed in the literature have a length equal to one period of the vibration. This section describes three types of negative input shapers, each much shorter than one period. They satisfy the following three types of constraints:

ZV (Zero Vibration at a specific frequency) [Singer, N.; Seering, W. "Preshaping Command Inputs to Reduce System Vibration," *ASME Journal of Dynamic Systems, Measurement, and Control*, Vol. 112, No. 1, pp. 76–82, March, 1990, Smith, O. J. M. *Feedback Control Systems*. pgs. 331–347, McGraw-Hill Book Company, Inc., New York, 1958].

ZVD (Zero Vibration and zero Derivative of Eq. (1) at the modeling frequency) [Singer, N.; Seering, W. "Preshaping Command Inputs to Reduce System Vibration," *ASME Journal of Dynamic Systems, Measurement, and Control*, Vol. 112, No. 1, pp. 76–82, March, 1990].

EI (Extra-Insensitive—a small level of vibration at the modeling frequency is allowed and the insensitivity is maximized)[Singhose, W.; Seering, W.; Singer, N. "Residual Vibration Reduction Using Vector Diagrams to Generate Shaped Inputs," *ASME Journal of Mechanical Design*, Jun. 1994.].

For most of the constraints, a closed-form solution cannot be derived. However, we obtained numerical solutions using GAMS [Brooke, Kendrick, and Meeraus, GAMS: *A User's Guide*, Redwood City, Calif., The Scientific Press, 1988], a linear and non-linear programming package. We will present tables that allow the public to design a negative input shaper without resorting to linear or non-linear programming. A later section presents methods for dealing with the high-mode excitation that may occur when negative input shapers are used.

Over-Currenting with Negative Shapers

Unlike shapers containing only positive impulses, negative shapers can lead to shaped command profiles which exceed the magnitude of the unshaped command for small periods of time. These small periods of over-currenting are not a problem for most applications because amplifiers and motors have peak current capabilities much larger than allowable steady state levels.

We can control the amount of over-currenting by limiting the partial sums of the impulse sequence to below a peak level, P. For example, a negative shaper with impulse amplitudes of $A_1$, $A_2$, and $A_3$ can be limited by the constraints:

$$A_1 \leq |P|,\ A_1+A_2 \leq |P|,\ A_1+A_2+A_3 \leq |P| \quad (2)$$

Figure 14A:
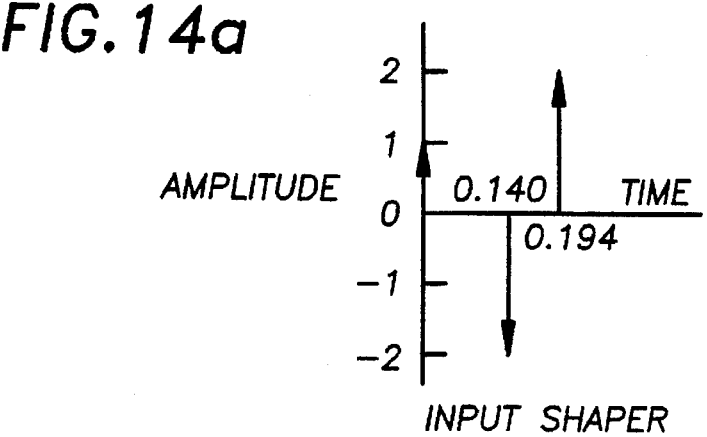
FIGS. 14a, 14b and 14c illustrate over-currenting caused by impulse sequences containing negative impulses.
Figure 14B:
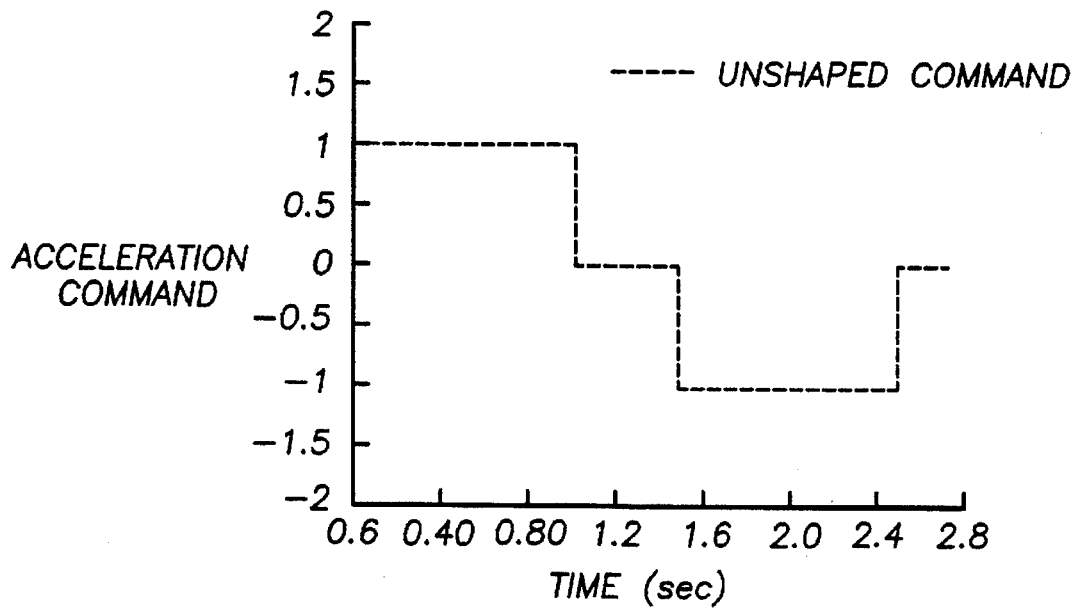
Figure 14C:
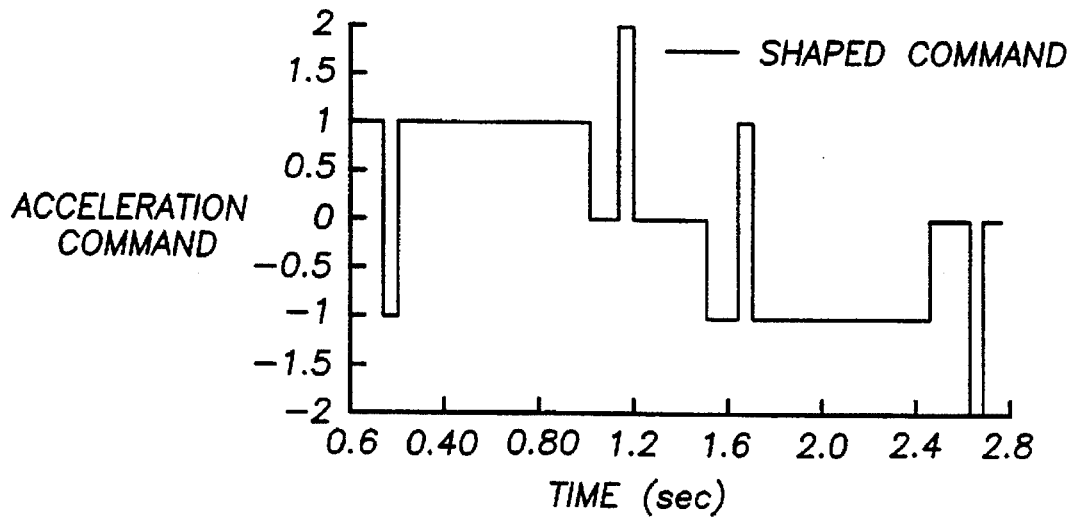

When the constraints of Eq. (2) are enforced, almost the entire shaped command will be within ±PMax, where Max is the maximum unshaped command level. There will, however, still be brief periods when the shaped input exceeds PMax, as illustrated in FIGS. 14a, 14b and 14c. FIG. 14a graphs the unshaped input, FIG. 14b depicts a typical negative shaper designed with P=1, that is, the amplitudes are $A_i$=[1, −2, 1], and FIG. 14c graphs the resulting shaped input. The unshaped command is the acceleration associated with a trapezoidal velocity profile.

The amount of time the shaped command requires over-currenting is a function of the acceleration limit, velocity limit, move distance, system frequency, and input shaper. Numerous shaped commands were generated while varying the above parameters. For all reasonable moves with P=1, only 1–3% of the shaped input required over-currenting. For P>1, the amount of over-currenting increases with P.

A controls engineer who wants to design a negative input shaper cannot go wrong by choosing P=1. Almost any system can handle the brief periods of over-currenting. As we will see, a negative shaper designed with P=1 will move a system considerably faster than an all positive shaper. If even faster response time is required, P can be increased, but the duty cycle of the amplifiers and motors must be considered.

Physical systems can tolerate peak currents for only small durations. The amount of time that the system can withstand peak currents is usually determined by thermal considerations. This specification is usually referred to as "duty cycle". For example, a system might have a continuous current of 10 amps but tolerate a 50% duty cycle at 20 amps. Negative input shapers can be designed by raising the value of P until the duty cycle limit is reached.

Negative ZV (Zero Vibration) Shapers

The above constraints on the partial sum of the impulses in a shaper must be combined with constraints on the residual vibration. ZV constraints only require zero residual vibration at the frequencies of interest. Because there is no insensitivity to modeling errors, ZV shapers will not work well for most applications. We present them here because they are the shortest and, therefore, the highest performance shapers when the system frequencies are known very accurately.

When the ZV constraints are satisfied with a minimized shaper length, the solution converges to a three-impulse shaper with amplitudes of: [P, −2P, P+1] for all values of damping ratio, $\zeta$, and peak partial sum, P. The impulse amplitudes are easily described, however, the time locations of the impulses are rather complex functions of $\zeta$ and P. The impulse time locations also depend on the period of vibration, T, but the dependence is trivial. The time locations scale linearly with T.

When $\zeta=0$, the problem simplifies, and we can derive an analytic solution for the negative ZV shaper. From the shaper length minimization constraint, we know:

$$A_1 = P$$

$$A_2 = -2P \quad (3)$$

$$A_3 = P+1$$

When we enforce the zero vibration constraint by setting Eq. (1) equal to zero, we get two constraint equations because the sin and cos terms are squared and must, therefore, both be zero. The resulting equations are:

$$-2P\sin(\omega t_2) + (P+1)\sin(\omega t_3) = 0 \quad (4)$$

$$P - 2P\cos(\omega t_2) + (P+1)\cos(\omega t_3) = 0 \quad (5)$$

$t_1$ does not appear in the constraint equations because it must be zero to achieve the minimal shaper length. Equations 3 and 4 can be solved for both $t_2$ and $t_3$. The solutions are:

$$t_2 = \frac{T}{2\pi} \cos^{-1}\left(\frac{4P^2 - 2P - 1}{4P^2}\right) \quad (6)$$

$$t_3 = \frac{T}{2\pi} \cos^{-1}\left(\frac{2P^2 - 2P - 1}{2P(P+1)}\right)$$

Equations 3 and 6 describe the negative ZV shaper for undamped systems. The length of the negative shaper is 0.29 T when P=1, as compared with 0.5 T for the positive ZV shaper. Eq. (6) reveals the length of the negative ZV shaper decreases as P increases. When P is increased from 1 to 3, the shaper is shortened 0.116 T, which is considerably greater than the decrease of 0.037 T that occurs when P is further increased from 3 to 5. There is a decreasing return in time savings when P is increased further. Additionally, too high a value for P will lead to saturation of the actuators, as mentioned previously.

A negative shaper will perform slightly worse than a positive shaper in the presence of modeling errors, even though they are both derived with the same performance constraints. To quantify this effect, we define a numerical value for a shaper's sensitivity to modeling errors. Insensitivity is the width of the sensitivity curve at a given level of vibration. Vibration levels of 5% and 10% are commonly used to calculate insensitivity.

Figure 15:
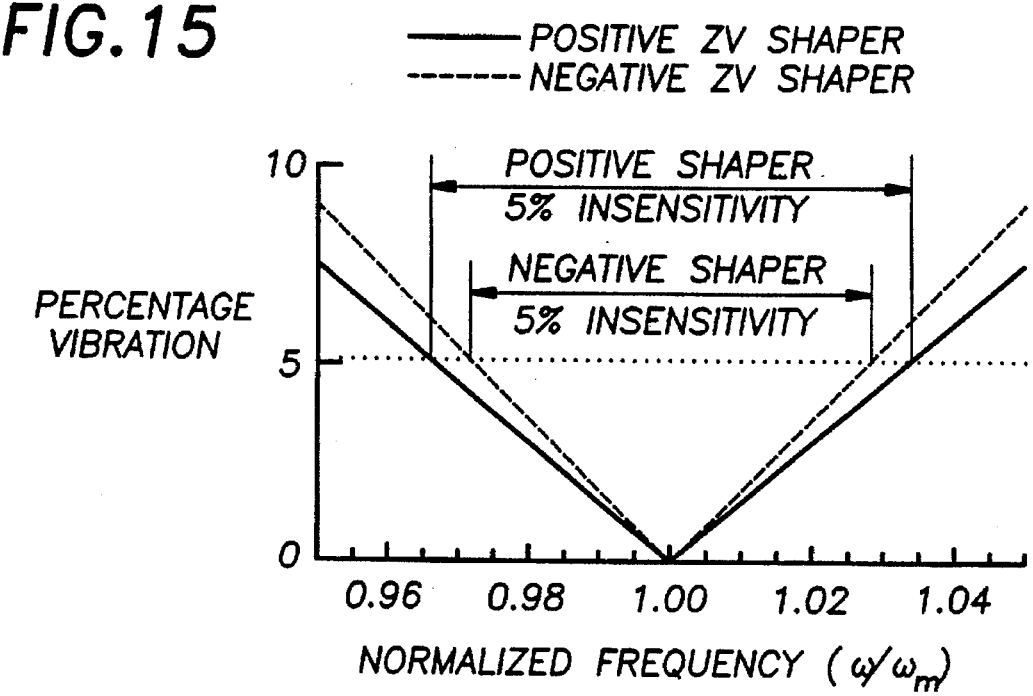
FIGS. 15, 16 and 17 graph the residual vibration versus normalized frequency for different impulse sequences.

For example, the positive ZV shaper has a 5% insensitivity of 0.065; that is, the percentage vibration is less than 5% from $0.9675\omega$ to $1.0325\omega$, (1.0325−0.9675=0.065). The corresponding negative sequence has a 5% insensitivity of 0.055. This result is portrayed in FIG. 15. The normalized frequency axis in FIG. 15 is $\omega/\omega_m$, where the actual frequency of vibration is $\omega$, and $\omega_m$ is the modeling frequency.

Figure 16:
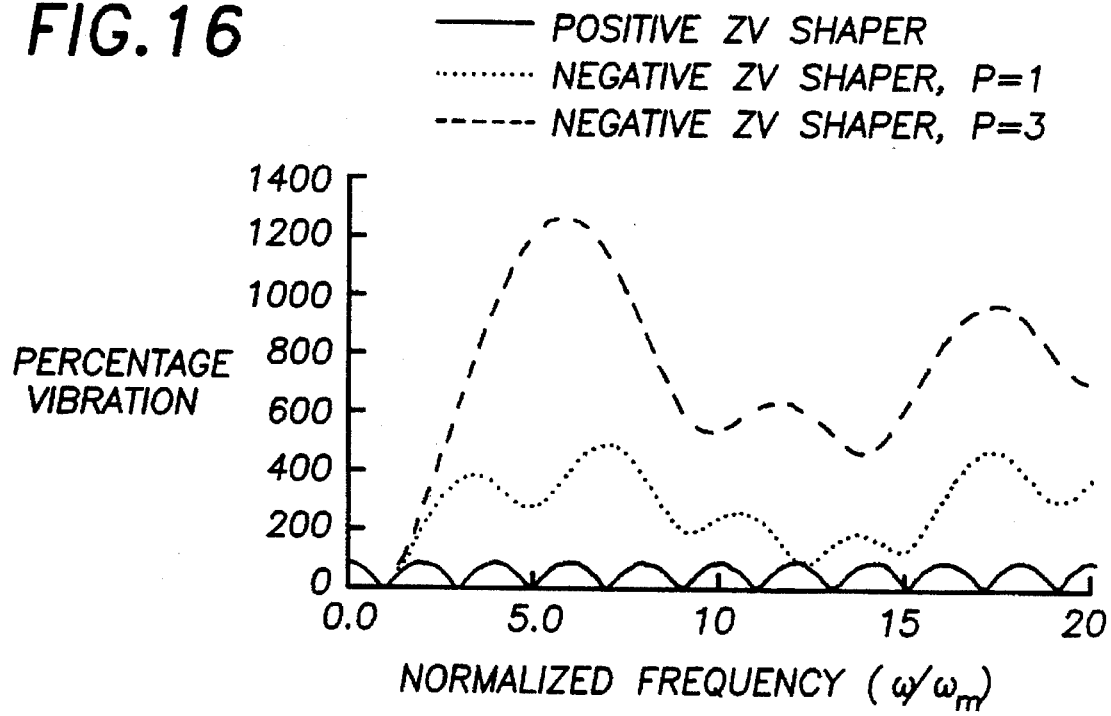

The time savings gained by using negative shapers comes with the risk of high-mode excitation. To assess this risk, we plot the shaper's sensitivity curve over a range of high frequencies. At frequencies where the sensitivity curve is above 100%, high-mode excitation can occur if the system has a second resonance. FIG. 16 compares the sensitivity curves for the positive ZV shaper and the negative ZV shapers for P=1 & 3. The positive shaper never exceeds 100%, but the negative shapers exceed this value over a large range of high frequencies.

For damped systems an analytic solution of the impulse times has not been found. However, curve fits to solutions obtained with GAMS were generated for P=1,2, & 3. The curve fits to $t_2$ and $t_3$ are shown in Table 1 along with an exact expression for $t_3$ that can be used instead of the curve fits once $t_2$ has been determined.

TABLE 1

| | Time Locations of Negative ZV Shaper | |
|---|---|---|
| P = 1 | P = 2 | P = 3 |
| $t_2 = (0.20963 + 0.22433\zeta)Td$ | $t_2 = (0.12929 + 0.09393\zeta - 0.06204\zeta^2)Td$ | $t_2 = (0.10089 + 0.05976\zeta - 0.05376\zeta^2)Td$ |
| $t_3 = (0.29027 + 0.08865\zeta + 0.02646\zeta^2)Td$ | $t_3 = (0.20975 + 0.02418\zeta - 0.07474\zeta^2)Td$ | $t_3 = (0.17420 + 0.01145\zeta - 0.07317\zeta^2)Td$ |

| Alternative to curve fits for all values of P: | $t_3 = \dfrac{\sqrt{1-\zeta^2}}{4\pi\zeta} \ln\left\{ \dfrac{P^2}{(P+1)^2} [1 + 4e^{2\zeta\omega t_2} \cdot 4e^{\zeta\omega t_2}\cos(\omega d t_2)] \right\} Td$ |

Negative ZVD (Zero Vibration & Derivative) Shapers

ZV shapers do not work well for most applications because they are sensitive to modeling errors, as shown in FIG. 15. To generate shapers that work on most real systems, we must add constraints that ensure insensitivity.

An often used insensitivity constraint proposed by Singer and Seering requires the derivative of the percentage vibration equation (Eq. 1) to be zero at the modeling frequency. To satisfy these ZVD constraints, the shaper must contain five impulses. If we minimize the sequence length, the amplitudes of the impulses are: $A_i = [P, -2P, 2P, -2P, P+1]$. The time location of each impulse is a complex function of $\zeta$ and P.

Curve fits to $t_2$, $t_3$, $t_4$, and $t_5$ were obtained by holding P constant. Table 2 shows the curve fit description of the negative ZVD shapers for P=1,2, & 3.

TABLE 2

Time Locations of Negative ZVD Shapers

| P = 1 | P = 2 | P = 3 |
|---|---|---|
| $t_2 = (0.15236 + 0.23230\zeta + 0.09745\zeta^2)Td$ | $t_2 = (0.11700 + 0.15424\zeta + 0.03449\zeta^2)Td$ | $t_2 = (0.10022 + 0.11695\zeta + 0.00246\zeta^2)Td$ |
| $t_3 = (0.27750 + 0.10237\zeta - 0.00612\zeta^2)Td$ | $t_3 = (0.26041 + 0.11899\zeta - 0.05910\zeta^2)Td$ | $t_3 = (0.24352 + 0.10877\zeta - 0.08790\zeta^2)Td$ |
| $t_4 = (0.63139 + 0.33716\zeta - 0.07724\zeta^2)Td$ | $t_4 = (0.49378 + 0.15092\zeta - 0.25380\zeta^2)Td$ | $t_4 = (0.44109 + 0.11059\zeta - 0.23127\zeta^2)Td$ |
| $t_5 = (0.67903 + 0.18179\zeta - 0.06008\zeta^2)Td$ | $t_5 = (0.56273 + 0.04255\zeta - 0.19898\zeta^2)Td$ | $t_5 = (0.51155 + 0.02121\zeta - 0.20054\zeta^2)Td$ |

Figure 17:
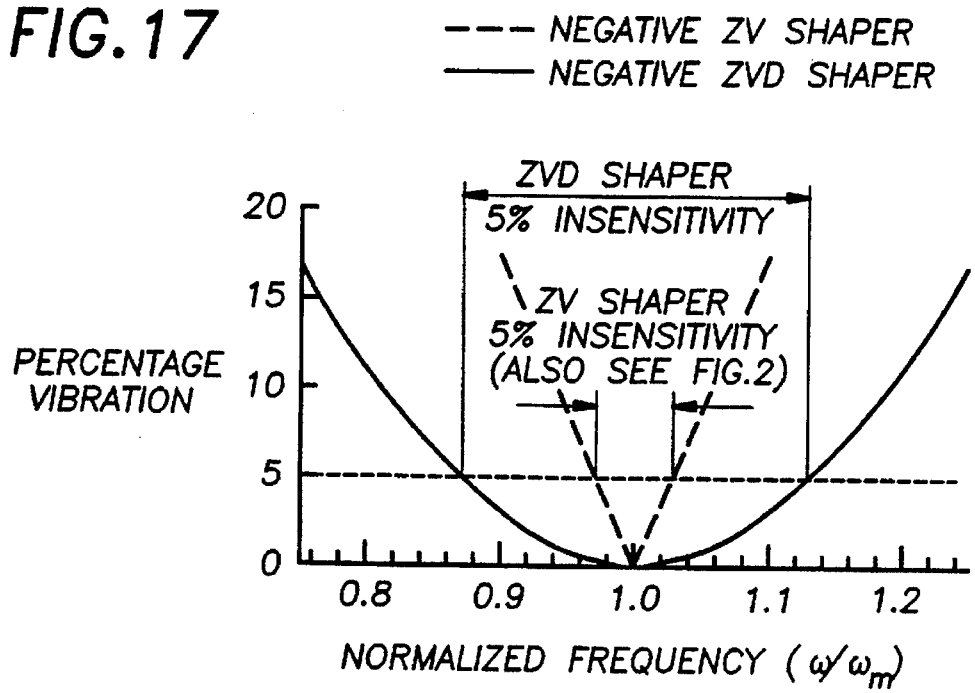

FIG. 17 shows the ZVD shaper is substantially more insensitive than the ZV shaper. The 5% insensitivity of the negative ZVD shaper with P=1 is 0.253. This is a factor of 4.6 more than the negative ZV shaper.

Figure 18:
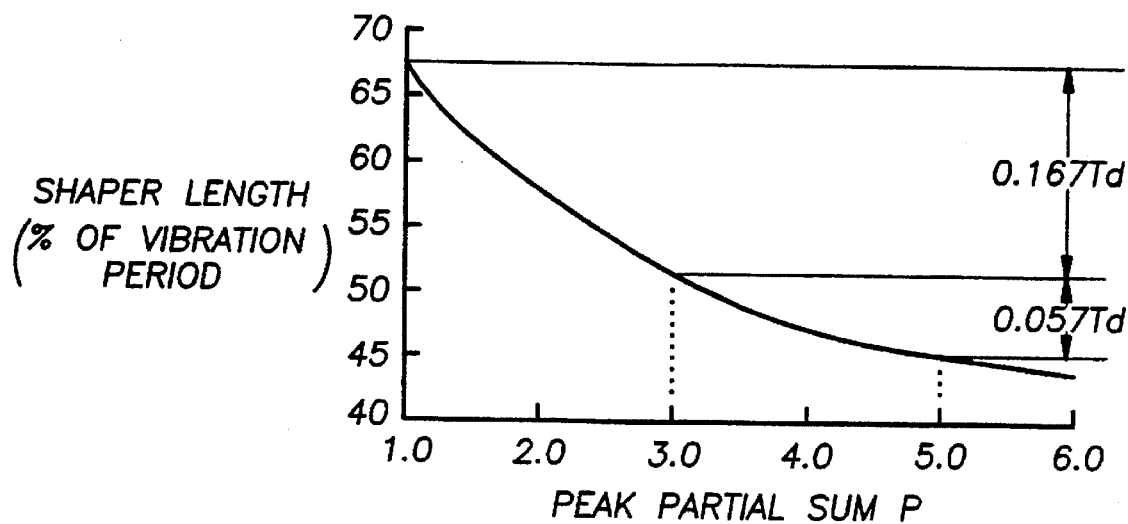
FIG. 18 graphs the length of an impulse sequence versus the peak partial sum.

The length of the negative ZVD shaper is only 68% of the positive ZVD input shaper when P=1. The time savings increases with P, as can be seen in FIG. 18. When P is increased from 1 to 3, the sequence is shortened 0.167 Td, which is considerably larger than the decrease of 0.057 Td that occurs when P is further increased from 3 to 5.

Negative EI (Extra-Insensitive) Shapers

As an alternative to ZV or ZVD constraints, we can achieve significantly more insensitivity by relaxing the constraint of zero vibration at the damped modeling frequency, $\omega d_m$. If we limit the residual vibration at the modeling frequency to some small value, V, instead of zero, we can enforce the zero vibration constraint at two frequencies, one higher than $\omega d_m$ and the other lower than $\omega d_m$. This set of constraints leads to input shapers that are essentially the same length in time as the ZVD shapers, but have more insensitivity. The constraints, in equation form, are:

$$V = e^{-\zeta \omega t_5} \{ (\Sigma A_i e^{\zeta \omega t_i} \cos(\omega \sqrt{1-\zeta^2}\ t_i))^2 + (\Sigma A_i e^{\zeta \omega t_i} \sin(\omega \sqrt{1-\zeta^2}\ t_i))^2 \}^{1/2} \quad (7)$$

$$\Sigma A_i e^{\zeta \omega t_i} \sin(t_i \omega d_{hi}) = \Sigma A_i e^{\zeta \omega t_i} \sin(t_i \omega d_{low}) = 0 \quad (8)$$

$$\Sigma A_i e^{\zeta \omega t_i} \cos(t_i \omega d_{hi}) = \Sigma A_i e^{\zeta \omega t_i} \cos(t_i \omega d_{low}) = 0 \quad (9)$$

where, $\omega d_{hi}$ and $\omega d_{low}$ are the frequencies where the sensitivity curve is forced to zero. Eq. 7 contains a $t_5$ term because the shaper contains five impulses.

Using GAMS, we solved the EI constraints over a suitable range of V, $\zeta$, and P. The shaper's amplitudes are: [P, −2P, 2P, −2P, P+1], just as in the case of ZVD constraints. Table 3 shows curve fits to the time locations of the negative EI shapers for P=1,2, & 3 when V=5%. Table 4 is the same information for the case of V=10%.

TABLE 3

Time Locations of V = 5% Negative EI Shaper

| P = 1 | P = 2 | P = 3 |
|---|---|---|
| $t_2 = (0.15687 + 0.24004\zeta + 0.20367\zeta^2)Td$ | $t_2 = (0.11955 + 0.16127\zeta + 0.05206\zeta^2)Td$ | $t_2 = (0.10219 + 0.12192\zeta + 0.01197\zeta^2)Td$ |
| $t_3 = (0.28151 + 0.10650\zeta + 0.09280\zeta^2)Td$ | $t_3 = (0.26356 + 0.12551\zeta - 0.03963\zeta^2)Td$ | $t_3 = (0.24639 + 0.11404\zeta - 0.07655\zeta^2)Td$ |
| $t_4 = (0.63431 + 0.33886\zeta - 0.12776\zeta^2)Td$ | $t_4 = (0.49804 + 0.15508\zeta - 0.24101\zeta^2)Td$ | $t_4 = (0.44526 + 0.11468\zeta - 0.22230\zeta^2)Td$ |
| $t_5 = (0.68414 + 0.18236\zeta + 0.00839\zeta^2)Td$ | $t_5 = (0.56886 + 0.04558\zeta - 0.18732\zeta^2)Td$ | $t_5 = (0.51719 + 0.02439\zeta - 0.19225\zeta^2)Td$ |

TABLE 4

Time Locations of V = 10% Negative EI Shaper

| P = 1 | P = 2 | P = 3 |
|---|---|---|
| $t_2 = (0.16136 + 0.24772\zeta + 0.31367\zeta^2)Td$ | $t_2 = (0.12207 + 0.16808\zeta + 0.07038\zeta^2)Td$ | $t_2 = (0.10412 + 0.12667\zeta + 0.02201\zeta^2)Td$ |
| $t_3 = (0.28547 + 0.11044\zeta + 0.19967\zeta^2)Td$ | $t_3 = (0.26661 + 0.13190\zeta - 0.01971\zeta^2)Td$ | $t_3 = (0.24916 + 0.11908\zeta - 0.06480\zeta^2)Td$ |
| $t_4 = (0.63719 + 0.33687\zeta - 0.14612\zeta^2)Td$ | $t_4 = (0.50210 + 0.15873\zeta - 0.22743\zeta^2)Td$ | $t_4 = (0.44925 + 0.11835\zeta - 0.21300\zeta^2)Td$ |
| $t_5 = (0.68919 + 0.17941\zeta - 0.01215\zeta^2)Td$ | $t_5 = (0.57439 + 0.04813\zeta - 0.17499\zeta^2)Td$ | $t_5 = (0.52261 + 0.02720\zeta - 0.18377\zeta^2)Td$ |

Figure 19:
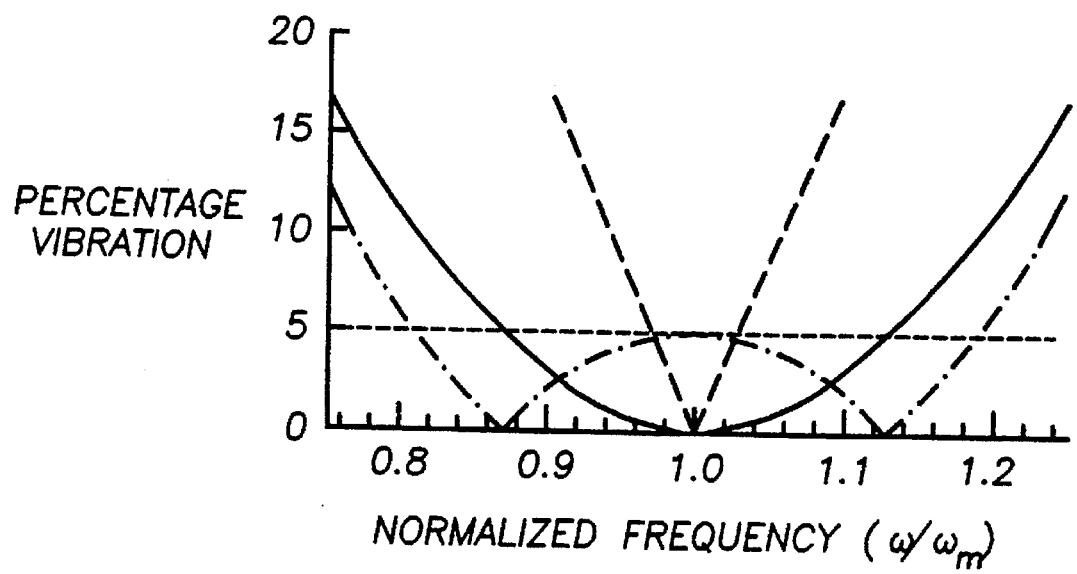
FIG. 19 graphs the residual vibration versus normalized frequency for three different impulse sequences with a peak partial sum of one.

By examining Tables 2–4, we find that the EI shapers are essentially the same length as the ZVD shapers regardless of the values for V, $\zeta$, or P. However, FIG. 19 clearly shows that the EI shapers are more insensitive to modeling errors than the ZVD shapers. For the case shown in FIG. 19 (V=5%), the EI shaper has 40% more insensitivity than the ZVD shaper. (The EI shaper has a 5% insensitivity of 0.352, while the ZVD shaper has a 5% insensitivity of 0.252.)

Figure 20:
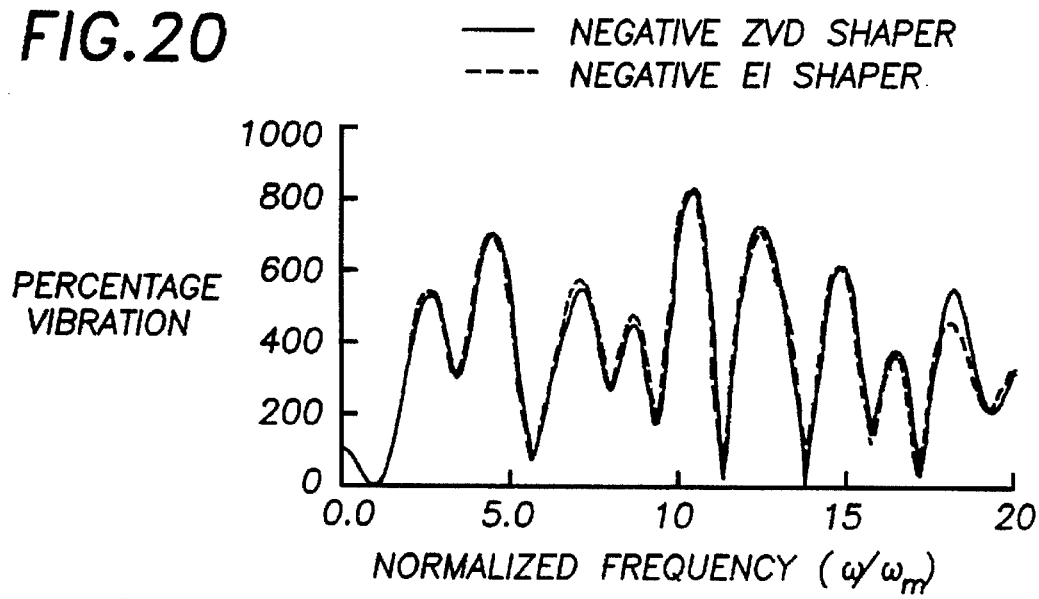
FIGS. 20 and 21 graph the residual vibration versus normalized frequency for two different impulse sequences.

The increase of insensitivity near the modeling frequency comes only from relaxing the zero vibration constraint at the modeling frequency. There are no additional costs associated with the EI shapers. We have already seen that the length of the EI shaper is essentially the same as the ZVD, and FIG. 20 shows that there is little difference between the two at high frequencies.

When P is increased, some insensitivity around the modeling frequency is lost. If P is increased from 1 to 3, the EI shaper is shortened by 24%, while the 5% insensitivity drops from 0.352 to 0.333. The drop in insensitivity is very small given the large time savings.

While the example given above was for a five-impulse sequence with one hump in the sensitivity curve, the method may be extended to sequences with an arbitrary number of impulses and/or sensitivity curves with an arbitrary number of humps, in the same manner as discussed previously for extra-insensitive shapers.

Controlling High-Mode Excitation

As we have seen, negative shapers can increase vibration at unmodeled modes higher than the frequency for which they were designed. For high-mode excitation to occur, there must be a resonance at a frequency where the sensitivity curve exceeds 100%. Even if high-mode excitation occurs, Input Shaping™ will probably decrease the total amount of system vibration. This decrease results from the elimination of the low mode, which usually contains the majority of vibration amplitude.

In cases where high-mode excitation is performance-limiting, we have several options to chose from:

1) Give up the time savings gained by using a negative sequence and use a positive input shaper.
2) Add restrictions on the amplitudes of high-mode vibration and solve the augmented set of constraints.
3) Add a digital low-pass filter.
4) Use an input with no high-frequency content.

The first option is the easiest and most appropriate when increasing the speed of the system is not the highest priority. Option 2 is the highest performance solution because we can customize an input shaper to a specific system with a minimal time penalty. Unfortunately, the look-up method provided by Tables 1–4 has to be abandoned. Options 3 & 4 can still utilize Tables 1–4, however, there can be a large increase in the computational needs during run-time.

Option 2, the process of restricting only a few problematic high frequencies is best demonstrated with an example. Suppose we select a negative EI shaper to eliminate a 1 Hz mode from our system. However, when we use the shaper, we discover that a previously unimportant mode at 7 Hz is excited more than in the unshaped case. We can eliminate this vibration by adding an equation to our set of constraints that limits the vibration at 7 Hz to 50% of the unshaped vibration. We could just as well use 30% or 60%; we just want to restrict the vibration to less than the unshaped level.

Figure 21:
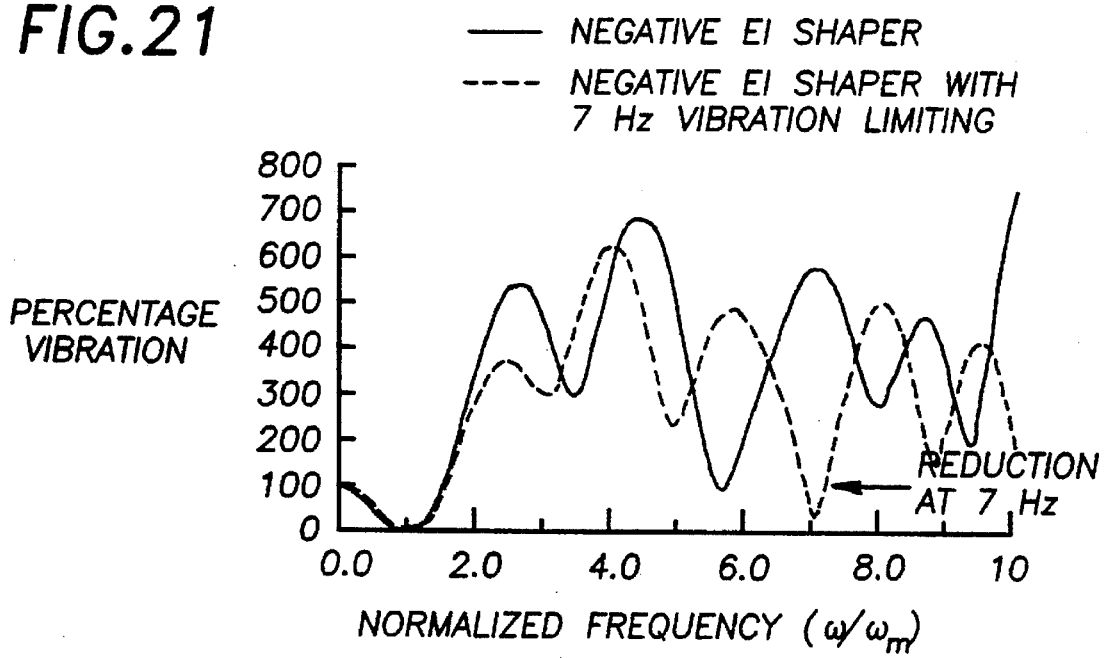

The time-optimal shaper meeting the above constraints was calculated with GAMS and is only 6% longer than the original EI shaper. Sensitivity curves for the EI shaper and the EI shaper with a 7 Hz vibration limitation are shown in FIG. 21. The vibration-limited shaper has the same number of impulses as the unconstrained shaper. However, the amplitudes are no longer: [1,–2, 2,–2,2]. Instead, they are: [1,–2,1.82,–1.82,2].

If more than one high mode is problematic, we simply add a constraint equation for each mode of vibration and solve the augmented set of constraints. For each mode that is constrained, a small amount of time will be added to the shaper length. However, a negative shaper with high-mode constraints will continue to be shorter than a positive shaper for the low mode until constraints have been placed on a large number of high modes.

The technique of restricting the vibration at a few high modes is advantageous because:

1) The shaper is customized to a specific system and, therefore, it does not over-constrain the system.
2) The computational requirements during run-time are usually unaffected.

The drawback of this approach is that it requires the one-time solution of a set of simultaneous, transcendental constraint equations; Tables 1–4 cannot be used.

Instead of restricting a few high modes, we can eliminate all high frequencies by adding a low-pass filter. The low-pass filter is used in conjunction with a negative shaper of the designer's choice from Tables 1–4 to give a modified input shaper that will not excite modes in the filter's stop band. A time delay is added when we use a low-pass filter because the length of the modified shaper is equal to the length of the original shaper plus the length of the low-pass filter. The computational requirements can increase significantly because implementation of the modified shaper requires N more multiplies and adds than the original shaper, where N is the low-pass filter length number. Standard low-pass filters are often designed with an N value of 20–30, but N can range from 5 to values in the hundreds.

To implement the modified shaper, place the low-pass filter in series with the input shaper instead of convolving the shaper and filter together. This procedure reduces the computational load during run-time.

Figure 22:
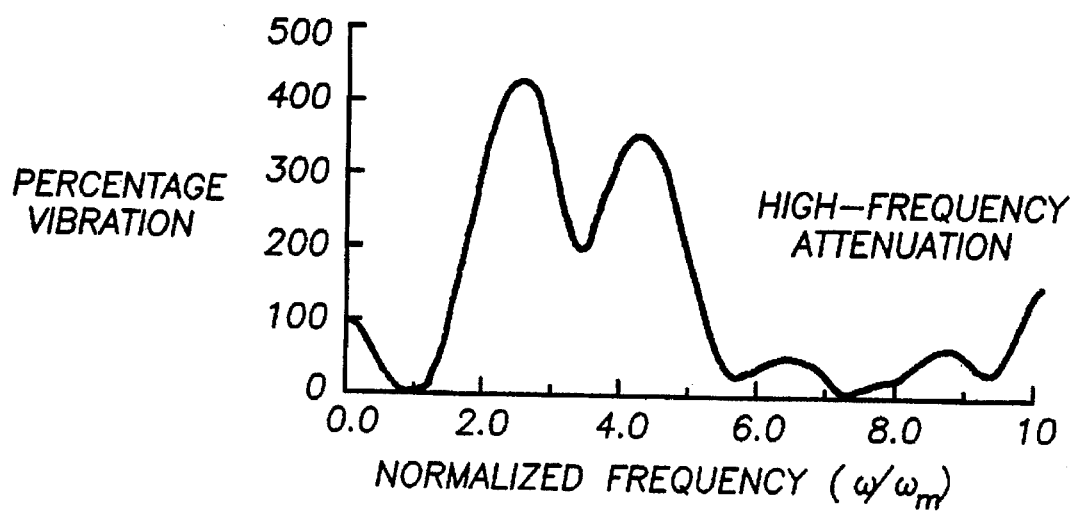
FIG. 22 graphs the residual vibration versus normalized frequency for an impulse sequence used with a low-pass filter.

To demonstrate the technique of adding a low-pass filter, we will design a modified shaper for the system discussed above. Once again, we will start with a negative EI shaper from Table 3 with P=1 to eliminate the 1 Hz mode. Next, for demonstration purposes, we add a low-pass filter designed with a pass band of 0–1 Hz, a stop band of 12–50 Hz, N=13, and a sampling frequency of 100 Hz. The high-mode sensitivity curve for the low-pass negative input shaper is shown in FIG. 22. The low-pass negative shaper has 18 impulses (5+13). This more than triples the computational requirement during run-time.

The main benefits of augmenting a negative input shaper with a low-pass filter are:

1) It requires no specific information about the high-mode frequencies, just a pass band and a stop band.
2) It eliminates a large range of high frequencies.
3) It uses well established filter design tools in combination with the solutions from Tables 1–4. This approach has two major drawbacks:

1) There is a longer time delay associated with this Input Shaping™ process than when we restrict just a few high modes. (The low-pass negative input shaper in our example is 19% longer than the original EI shaper.)
2) The run-time computation can be prohibitive.

We will not give an example of the fourth option for dealing with high-mode excitation, using an input function that does not contain energy at high frequencies. Instead, we will simply assert that the technique has more drawbacks than using a low-pass filter. It requires additional computation and performance will vary with the move distance.

Experimental Results

Tests of the negative input shapers listed in Tables 1–4 were conducted on a rotary table. To ensure a vibratory response, a steel beam was mounted to the table surface, with 19 inches of the beam free to bend when the table was rotated. A 2 lb. mass was attached to the end of the beam to simulate a payload. The Inland Torque Motor used to rotate the table was equipped with an HP HEDS-6110 encoder with 44,000 counts per revolution. The motor was powered by an Aerotech DS16020 amplifier and the control signal was generated by a Macintosh Quadra 700 running a PD controller at 500 Hz. The controller generated trapezoidal velocity profiles based on maximum velocity and acceleration limits.

A one radian move was commanded and an FFT on the residual vibration revealed a mode near 2 Hz with a damping ratio of about 0.08. Negative ZV, ZVD, and EI shapers were then calculated from Tables 1–4. Input Shaping™ was enabled and the table response with each of the shapers was recorded. Additionally, the table response with a positive ZVD shaper was measured, so that the time savings from the negative shapers could be evaluated.

Figure 23:
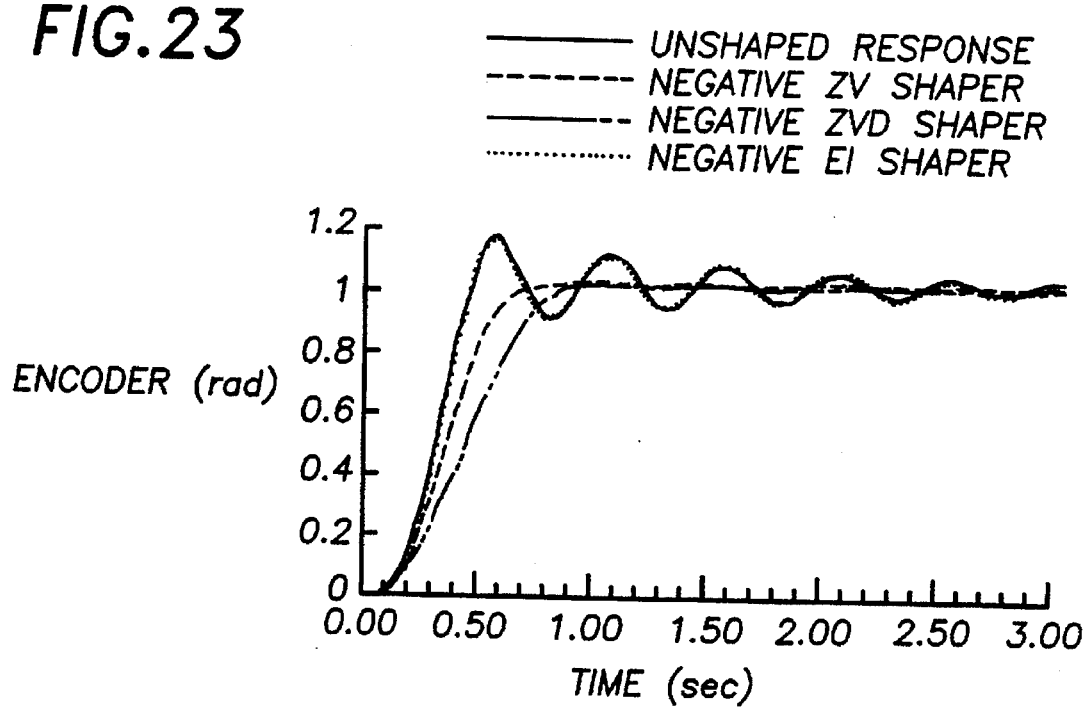
FIG. 23 graphs encoder position versus time for shaped and unshaped inputs.

FIG. 23 compares the unshaped response of the table to the responses with the negative ZV, ZVD, and EI shapers. The negative ZV and EI shapers reduced the vibration to approximately 5% of the unshaped level, while the negative ZVD reduced the vibration to 0.8%. The ZV shaper left 5% of the vibration because it is very sensitive to modeling errors and our frequency identification has limited accuracy. The EI shaper left 5% of the vibration because it is designed to leave 5% vibration near the modeling frequency.

If we examine the 2% settling time, we find the response with the negative ZV shaper settled in 0.69 sec. and both the negative ZVD and EI responses settled in approximately 0.85 sec. The response with the positive ZVD shaper settled in 0.93 sec., while the unshaped response took 2.78 sec. to settle within 2% of the desired position.

If our evaluation was based only on the above results, we might choose the negative ZV shaper because it gives the fastest settling time. Or, we might choose the negative ZVD shaper because it gives the least amount of residual vibration. However, in most real systems, the actual frequency will deviate from the modeling frequency when the system geometry changes or a payload is picked up.

To evaluate the shapers in the presence of modeling errors, additional mass was added to the steel beam and the experiments were repeated. The extra mass resulted in a very large frequency shift of approximately 25%.

Figure 24:
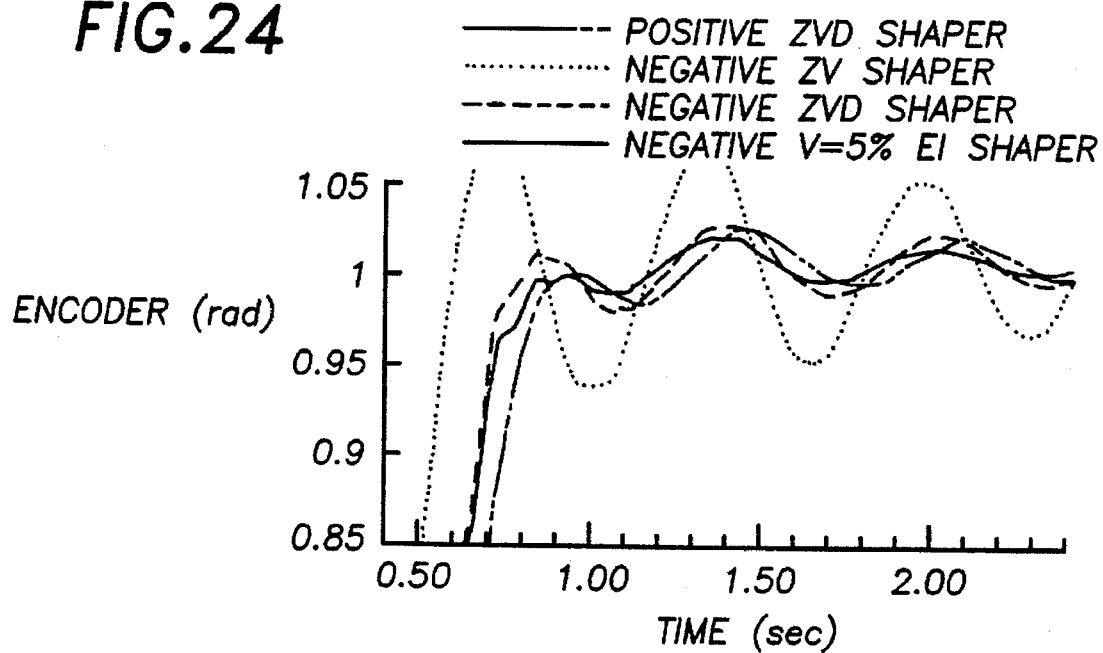
FIG. 24 graphs encoder position versus time for four different impulse sequences.

FIG. 24 compares the responses of the extra-mass system with the negative ZV, ZVD, and EI shapers. Also shown is the response to the positive ZVD shaper. In this case, the negative EI shaper is superior in both vibration suppression and settling time. Note that FIG. 24 is a close up of the residual vibration. The level of vibration with a 25% modeling error is still only about 20% of the unshaped vibration shown in FIG. 23. The unshaped vibration would be way off the scale if it were also plotted on FIG. 24. The experimental results are summarized in Table 5.

TABLE 5

Sumary of Experimental Data

| Shaper | Original System | | Extra-Mass System (25% Lower Frequency) | |
|---|---|---|---|---|
| | Vibration (% of Unshaped) | 2% Settling Time | Vibration (% of Unshaped) | 2% Settling Time |
| None | 100 | 2.78 sec. | 122 | >4 sec. |
| Postive ZVD | 0.6 | 0.93 sec. | 21 | 1.18 sec. |
| Negative ZV | 5.8 | 0.69 sec. | 57 | 3.27 sec. |
| Negative ZVD | 0.8 | 0.84 sec. | 24 | 1.44 sec. |
| Negative EI (V = 5%) | 5.5 | 0.85 sec. | 17 | 0.81 sec. |

Extra-Insensitive Input Shapers for Controlling Flexible Spacecraft

Introduction

The problem of controlling flexible structures in the presence of modeling uncertainties and structural nonlinearities is an area of active research. The control techniques currently under investigation include: adding damping to the system, stiffening the structure, developing a sophisticated model and controller, and shaping the command signals. For space-based systems, the first two options can be suboptimal because they usually require the addition of mass to the system. The third option is application specific and developments may be difficult to generalize. Generating command signals that do not excite unwanted dynamics is often the most appealing option.

This section will present a subset of the Input Shaping™ technique that is used for systems equipped with constant-magnitude actuators. This represents the case for most flexible spacecraft because reaction jets usually do not have variable force amplitude control, only on-off time control.

Some approximate, yet often effective, methods for extending Input Shaping™ to the case where only constant-magnitude inputs are used were presented in [Singhose, W. "A Vector Diagram Approach to Shaping Inputs for Vibration Reduction," MIT Artificial Intelligence Lab Memo No. 1223; March 1990]. Recently, Wie, Liu, and Sinha applied the patented method of [Singer, N,; Seering, W.; Pasch, K. "Shaping Command Inputs to Minimize Unwanted Dynamics", U.S. Pat. No. 4,916,635, Apr. 10, 1990] to the problem of controlling flexible spacecraft equipped with on-off reaction jets by combining Singer's constraint equations with a constant-magnitude constraint on the command [Liu, Q.; Wie, B. "Robust Time-Optimal Control of Uncertain Flexible Spacecraft," Journal of Guidance, Control, and Dynamics, May–June 1992, Wie, B.; Sinha, R.; Liu, Q. "Robust Time-Optimal Control of Uncertain Structural Dynamic Systems," Journal of Guidance, Control, and Dynamics, September–October 1993]. They solved the set of constraint equations with a standard optimization package. The robust time-optimal control command they obtained consists of a bang-bang signal with six alternating pulses. While the solution obtained with this method works considerably better than an unshaped bang-bang controller, Singer's original robustness constraints are not optimal. The solution presented in [Liu, Q.; Wie, B. "Robust Time- Optimal Control of Uncertain Flexible Spacecraft," *Journal of Guidance, Control and Dynamics*, May–June 1992, Wie, B.; Sinha, R.; Liu, Q. "Robust Time-Optimal Control of Uncertain Structural Dynamic Systems," *Journal of Guidance, Control, and Dynamics*, September–October 1993] is not very robust because the constant-magnitude restriction is merely added to Singer's problem formulation without attempting to improve the robustness.

We will show how a more effective command signal can be generated by using extra-insensitive (EI) constraints similar to those presented in [Singhose, W.; Seering, W.; Singer, N. "Residual Vibration Reduction Using Vector Diagrams to Generate Shaped Inputs," *ASME Journal of Mechanical Design*, June 1994]. The constraints are called extra-insensitive because they lead to input shapers that are significantly more insensitive to modeling errors and parameter variations than Singer's original robustness constraints. The set of constraint equations we develop is solved with GAMS [Brooke, Kendrick, and Meeraus, GAMS: A *User's Guide*, Redwood City, Calif. The Scientific Press, 1988], a numerical optimization program.

To support our theoretical developments, we will present results from both computer simulations and hardware experiments.

Constraint Equation Derivation

One of the great advantages of the patented Input Shaping™ technique is that it requires only a very simple system model consisting of natural frequencies and damping ratios. Constraint equations based on the simple model are formulated so that the physically complex system responds with very little residual vibration. Additional equations can be added to the problem formulation ensuring that the residual vibration will remain small in the presence of modeling errors. The constraint equations can be written in a fairly simple form because the input is assumed to be a sequence of impulses and the response of a second order harmonic oscillator to an impulse is easily described. By solving the system of constraint equations, the amplitudes and time locations of the n impulses in the desired input shaper can be determined.

Because the present investigation is concerned with constant-magnitude force inputs, the system's mass (in addition to the natural frequency) must be considered if we are to move the system to a given position. For this reason, we base our development on the simple spring-mass model shown in FIG. 25. This model represents a system with a single flexible mode and a rigid body mode. A force input, u(t), acts on mass m 1, and is restricted to have a value of +1 or −1. In many space-based systems very small damping will exist, so we have left out a damping term to simplify development at this point.

Figure 26A:
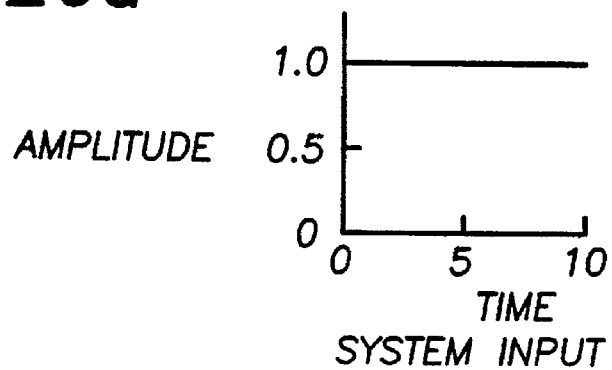
FIGS. 26a, 26b and 26c illustrate the convolution of a system input with a sequence of impulses to produce a shaped system input of constant magnitude.
Figure 26B:
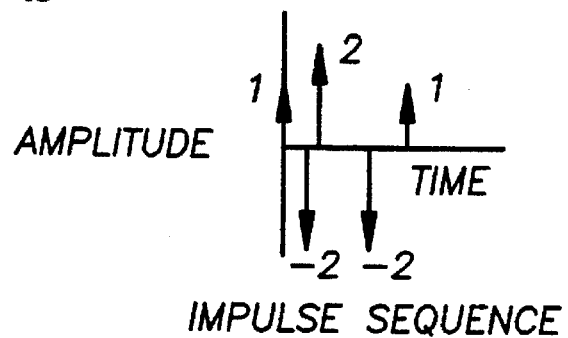
Figure 26C:
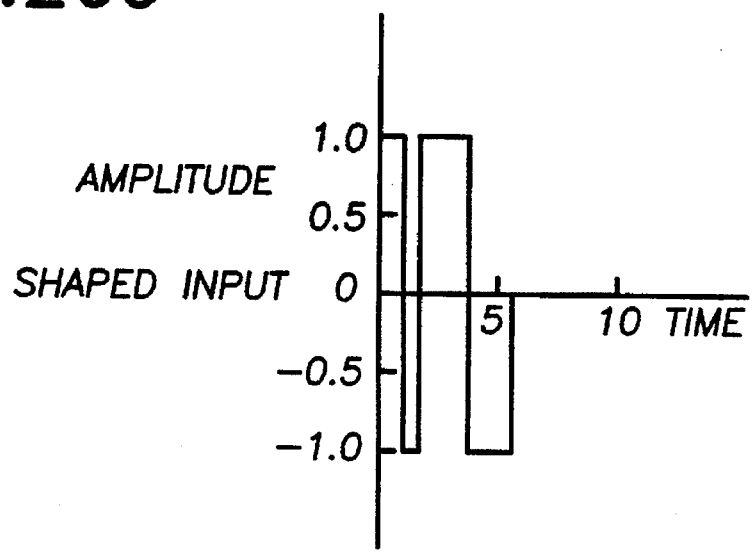

For the system under consideration, the shaped input must consist only of positive and negative constant-magnitude force pulses attainable by jet-type actuators. To achieve this form of a command signal, the unshaped command signal must be a step in force, as shown in FIG. 26a. Furthermore, the input shaper must contain impulses with amplitudes of: $A_i=[1,-2,2,\ldots,-2,1]$, where $i=1,\ldots n$, and n is odd, as in FIG. 26b. This will ensure the shaped input is a bang-bang series of alternating sign, constant-magnitude pulses of variable width, as shown in FIG. 26c. This restriction on the impulse amplitudes represents our first constraint equations, and can be written as:

$$A_j = 1 \qquad j = 1, n \tag{1}$$

$$A_i = 2\,(-1)^{i-1} \qquad i = 2, \ldots, n-1$$

The next constraint equation we will present ensures that the center of mass of the system will move the desired distance. To determine the movement of the center of mass, we assume an infinite spring stiffness with the motion described as:

$$\ddot{x}_2 = \frac{u(t)}{(m_1 + m_2)} \tag{2}$$

By integrating Eq. 2 twice we get the desired constraint equation:

$$x_d = \iint \frac{u(t)}{(m_1 + m_2)}\, dt \tag{3}$$

where $x_d$ is the desired move distance. At first glance Eq. 3 might look formidable, especially because we need to solve it simultaneously with several other equations, but u(t) has a very simple form—it is either +1 or −1. Note that Eq. 3 must be used whether or not Input Shaping™ is used.

Eq. 3 ensures that the rigid body motion will be as desired, but we also need to limit the amount of residual vibration that occurs when the system reaches its desired setpoint. The constraint on vibration amplitude can be expressed as a ratio of residual vibration amplitude with Input Shaping™ divided by residual vibration amplitude without shaping. This percentage vibration is given by:

$$V = e^{-\zeta \omega t_n}\{(\Sigma A_i e^{\zeta \omega t_i} \sin(\omega\sqrt{1-\zeta^2}\ t_i))^2 + (\Sigma A_i e^{\zeta \omega t_i} \cos(\omega\sqrt{1-\zeta^2}\ t_i))^2\}^{1/2} \tag{4}$$

where $A_i$ and $t_i$ are the amplitudes and time locations of the impulses, $t_n$ is the time of the last impulse, $\omega$ is the undamped natural frequency, and $\zeta$ is the damping ratio. The simple model in FIG. 25 does not include a damper, so Eq. 4 can be reduced considerably by setting $\zeta=0$.

By including Eq. 4 in our set of constraint equations, we can guarantee that there will be only the amount of residual vibration specified by the quantity V when the system's frequency is exactly $\omega$ and its damping ratio is exactly $\zeta$. However, if the frequency is slightly different than $\omega$, then there may exist a large amount of residual vibration. To make an input shaper robust to parameter variations, we can differentiate Eq. 4 with respect to $\omega$ and set the result equal to zero. In equation form, we get:

$$0 = \frac{d}{d\omega}\ (e^{-\zeta \omega t_n}\{(\Sigma A_i e^{\zeta \omega t_i} \sin(\omega\sqrt{1-\zeta^2}\ t_i))^2 + (\Sigma A_i e^{\zeta \omega t_i} \cos(\omega\sqrt{1-\zeta^2}\ t_i))^2\}^{1/2}) \tag{5}$$

This constraint ensures that the amount of residual vibration will not vary greatly from the quantity V when the frequency varies somewhat from $\omega$.

The final constraint we will introduce ensures that our solution is time-optimal, that is, it is the shortest command signal that meets the other constraints. The constraint is simply:

$$\text{minimize}(t_n) \tag{6}$$

where $t_n$ is the time of the last impulse.

Eqs. 1 and 3–6 form the set of constraint equations that we will use to design input shapers that generate constant-magnitude pulse signals. Different solutions will be obtained by solving these constraints in various combinations.

Input Shaper Comparison

In this section we present several different input shapers that can be derived using the above constraint equations. The first two shapers have been presented elsewhere in the literature, but we will briefly describe them here so that we can use them to evaluate the performance of the EI shapers.

Figure 27:
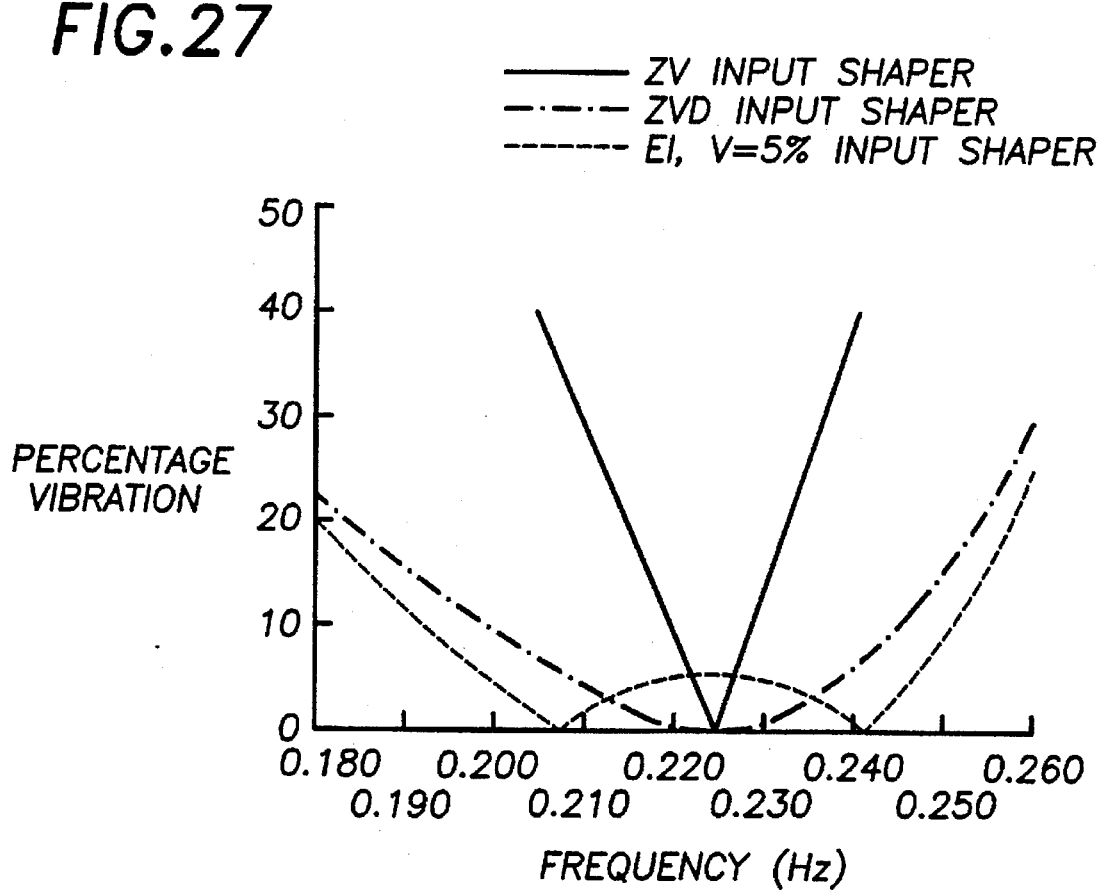
FIG. 27 graphs residual vibration versus frequency for different impulse sequences.

The first input shaper we will discuss is the one resulting from the solution of Eqs. 1,3, 4 and 6 with n=5 and V=0. Notice we have left out the constraint on the derivative of the residual vibration, Eq. 5. This solution is significant because it is the shortest input shaper that meets the constraint of zero residual vibration. Wie and Liu refer to this shaper as the "Flexible-Body Time-Optimal" control in [Liu, Q,; Wie, B. "Robust Time-Optimal Control of Uncertain Flexible Spacecraft," *Journal of Guidance, Control, and Dynamics*, May–June 1992], but we will call it the zero-vibration (ZV) input shaper because it meets the constraint of zero residual vibration when the system model is exact. The impulse sequence composing this shaper for $m_1=m_2=k=x_d=1$ is given by Liu and Wie as $$\begin{bmatrix} A_i \\ T_i \end{bmatrix} = \begin{bmatrix} 1 & -2 & 2 & -2 & 1 \\ 0 & 1.00268 & 2.10893 & 3.21518 & 4.21786 \end{bmatrix}$$

where, $A_i$ is the amplitude of the ith impulse and $T_i$ is the time location of the $i^{th}$ impulse in seconds. Wie and Liu note that perturbations in the spring constant, k, result in significant residual vibrations of the flexible mode. Changes in the mass values would, of course, also lead to residual vibration. A sensitivity curve, a plot of residual vibration (Eq. 4) as a function of m, reveals how variations in both mass and spring values effect the level of residual vibration. The solid line of FIG. 27 shows the sensitivity curve for the ZV input shaper. Notice that at the nominal frequency of 1.41 rad=0.225 Hz, which occurs when our model is exact, there is zero residual vibration. However, the amount of residual vibration increases rapidly as the frequency deviates from the nominal frequency.

We can obtain a measure of a shaper's performance in the presence of modeling errors by defining a shaper's insensitivity as the width of the sensitivity curve at a given level of vibration. Vibration levels of 5% and 10% are commonly used to calculate insensitivity. The 5% insensitivity for the ZV shaper is 0.0191; that is, the residual vibration is less than 5% of the unshaped vibration from $0.9903\omega$ to $1.0094\omega$, (1.0094−0.9903=0.0191). To allow comparison, the insensitivity is normalized by the nominal frequency.

The second input shaper we will discuss is derived by adding Singer's original insensitivity constraint (Eq. 5) to the set of equations used to solve for the ZV input shaper. This shaper was labeled the "Robust Time-Optimal" control in [Liu, Q,; Wie, B. "Robust Time-Optimal Control of Uncertain Flexible Spacecraft," *Journal of Guidance, Control, and Dynamics*, May–June 1992]. However, we will call it the zero-vibration and derivative (ZVD) shaper because it meets the requirements of both zero residual vibration (Eq. 4) and zero derivative of the residual vibration expression (Eq. 5), when the system model is exact. To achieve a solution to this set of constraints, n must be increased from 5 to 7. The impulse sequence composing this shaper is:

$$\begin{bmatrix} A_i \\ T_i \end{bmatrix} = \begin{bmatrix} 1 & -2 & 2 & -2 & 2 & -2 & 1 \\ 0 & 0.7124 & 1.6563 & 2.9330 & 4.2097 & 5.1536 & 5.8660 \end{bmatrix}$$

The dotted-dashed line of FIG. 27 graphs the sensitivity curves for the ZVD input shapers. The superiority of the ZVD shaper compared to the ZV shaper in terms of insensitivity to modeling errors is obvious. If we compare its 5% insensitivity of 0.1505 ($1.0700\omega$ to $0.9195\omega$) to the 0.0191 insensitivity of the ZV shaper, we can say it is 7.9 times more insensitive to modeling errors or parameter variations.

It should be noted that the length of the command signal must be increased from 4.218 sec. to 5.866 sec. to achieve the added insensitivity to frequency changes, a small cost for the given benefit in most cases.

The trade-off between insensitivity and the maneuver time continually arises in the design of input shapers. We will now present a technique for deriving a shaper that is even more insensitive to parameter variations than the ZVD shaper, but requires essentially no additional time. This extra-insensitive input shaper is determined by setting V to a non-zero value in Eq. 4 when $\omega$ is equal to the nominal frequency. We then set Eq. 4 equal to zero at two other undetermined frequencies, one higher than the nominal frequency, $\omega_{hi}$, and the other lower, $\omega_{low}$. The complete set of constraint equations will be listed here for clarity:

$$A_j = 1 \qquad j = 1, n \qquad (7)$$

$$A_i = 2(-1)^{i-1} \qquad i = 2, \ldots, n-1$$

$$x_d = \iint \frac{u(t)}{(m_1 + m_2)} \, dt \qquad (8)$$

$$V = e^{-\zeta \omega t_n} \{ (\Sigma A_i e^{\zeta \omega t_i} \sin(\omega \sqrt{1-\zeta^2} \, t_i))^2 + \qquad (9)$$
$$(\Sigma A_i e^{\zeta \omega t_i} \cos(\omega \sqrt{1-\zeta^2} \, t_i))^2 \}^{1/2}$$

$$0 = e^{-\zeta \omega_{hi} t_n} \{ (\Sigma A_i e^{\zeta \omega_{hi} t_i} \sin(\omega_{hi} \sqrt{1-\zeta^2} \, t_i))^2 + \qquad (10)$$
$$(\Sigma A_i e^{\zeta \omega_{hi} t_i} \cos(\omega_{hi} \sqrt{1-\zeta^2} \, t_i))^2 \}^{1/2}$$

$$0 = e^{-\zeta \omega_{low} t_n} \{ (\Sigma A_i e^{\zeta \omega_{low} t_i} \sin(\omega_{low} \sqrt{1-\zeta^2} \, t_i))^2 + \qquad (11)$$
$$(\Sigma A_i e^{\zeta \omega_{low} t_i} \cos(\omega_{low} \sqrt{1-\zeta^2} \, t_i))^2 \}^{1/2}$$

$$0 = \frac{d}{d\omega} (e^{-\zeta \omega t_n} \{ (\Sigma A_i e^{\zeta \omega t_i} \sin(\omega \sqrt{1-\zeta^2} \, t_i))^2 + \qquad (12)$$
$$(\Sigma A_i e^{\zeta \omega t_i} \cos(\omega \sqrt{1-\zeta^2} \, t_i))^2 \}^{1/2})$$

$$\text{minimize } (t_n) \qquad (13)$$

Eqs. 7–13 were solved using GAMS, a numerical optimization tool, for the case of n=7, V=0.05=5% and $m_1=m_2=k=x_d=1$. The impulse sequence composing this extra-insensitive shaper is:

$$\begin{bmatrix} A_i \\ T_i \end{bmatrix} = \begin{bmatrix} 1 & -2 & 2 & -2 & 2 & -2 & 1 \\ 0 & 0.7188 & 1.6731 & 2.9465 & 4.2199 & 5.1742 & 5.8930 \end{bmatrix}$$

This EI shaper is compared to the two previous input shapers in FIG. 27. It has a 5% insensitivity of 0.2118 ($1.0957\omega$ to $0.8839\omega$). This is 1.4 times more insensitive than the ZVD input shaper and 11.1 times more insensitive than the ZV input shaper. The significant increase in insensitivity that comes with the EI shaper is obtained with an almost negligible increase in command signal length (5.893 sec. as compared to 5.866 sec. for the ZVD shaper).

It is interesting to compare the insensitivity for the above shapers, which lead to constant-magnitude pulse commands, to the more general input shapers that allow for variable-magnitude commands. For the case of the input shaper derived with only the zero-vibration constraints, we have already stated the 5% insensitivity is 0.0191. This is considerably less than the insensitivity of 0.065 that is obtained with the variable-magnitude input shaper derived with the zero-vibration constraints. Table 6 displays this insensitivity comparison and the corresponding comparisons for the ZVD shaper and the EI shaper. Table 6 clearly shows that the constraint requiring constant-magnitude commands leads to large decreases in insensitivity. For this reason, the more general input shapers should be used if the actual system commands are not restricted to constant-magnitude pulses.

TABLE 6

The Reduction in Insensitivity Caused
By the Constant-Magnitude Constraint

| Shaper Type | Variable-Magnitude Commands | Constant-Magnitude Pulses | Reduction in Insensitivity |
|---|---|---|---|
| ZV | 0.065 | 0.0191 | 71% |
| ZVD | 0.287 | 0.1505 | 48% |
| EI | 0.399 | 0.2118 | 47% |

Input Shaper Verification

Figure 25:
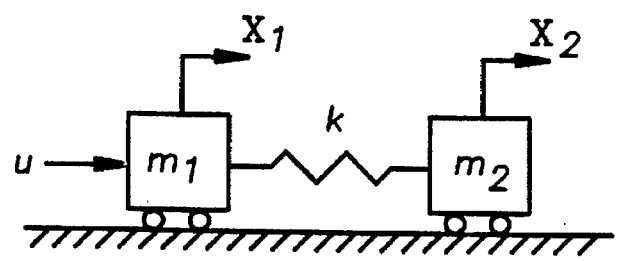
FIG. 25 illustrates a simple system model.
Figure 28A:
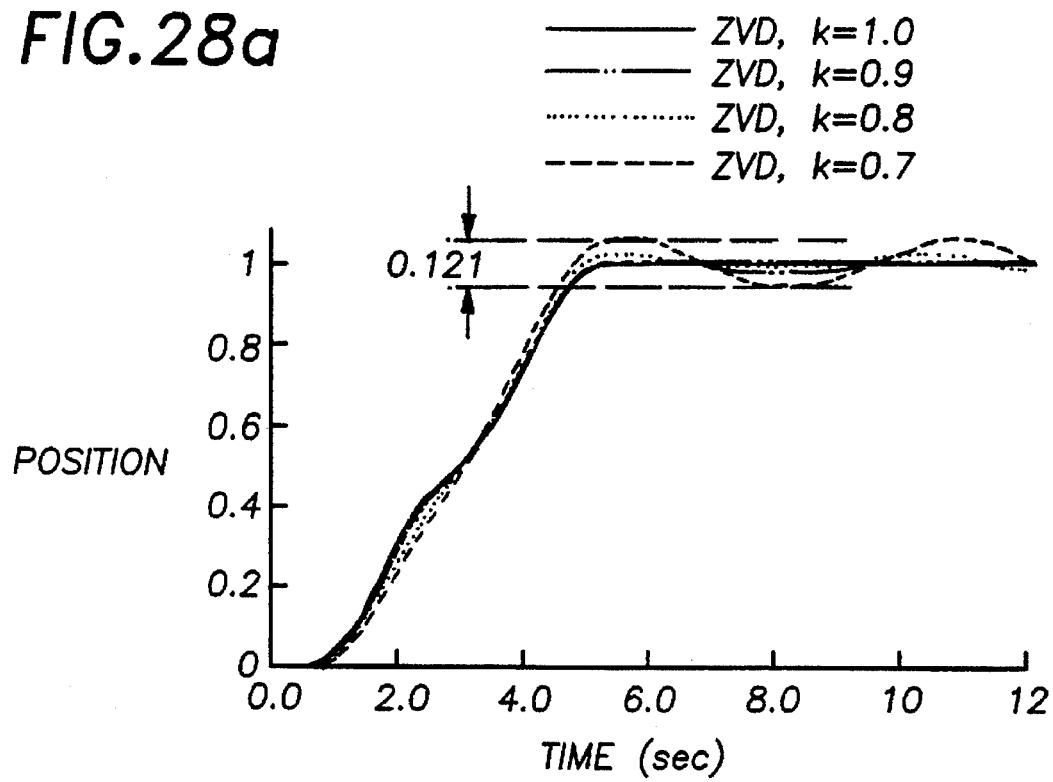
FIGS. 28a and 28b graph position versus time for various impulse sequences and spring constants.
Figure 28B:
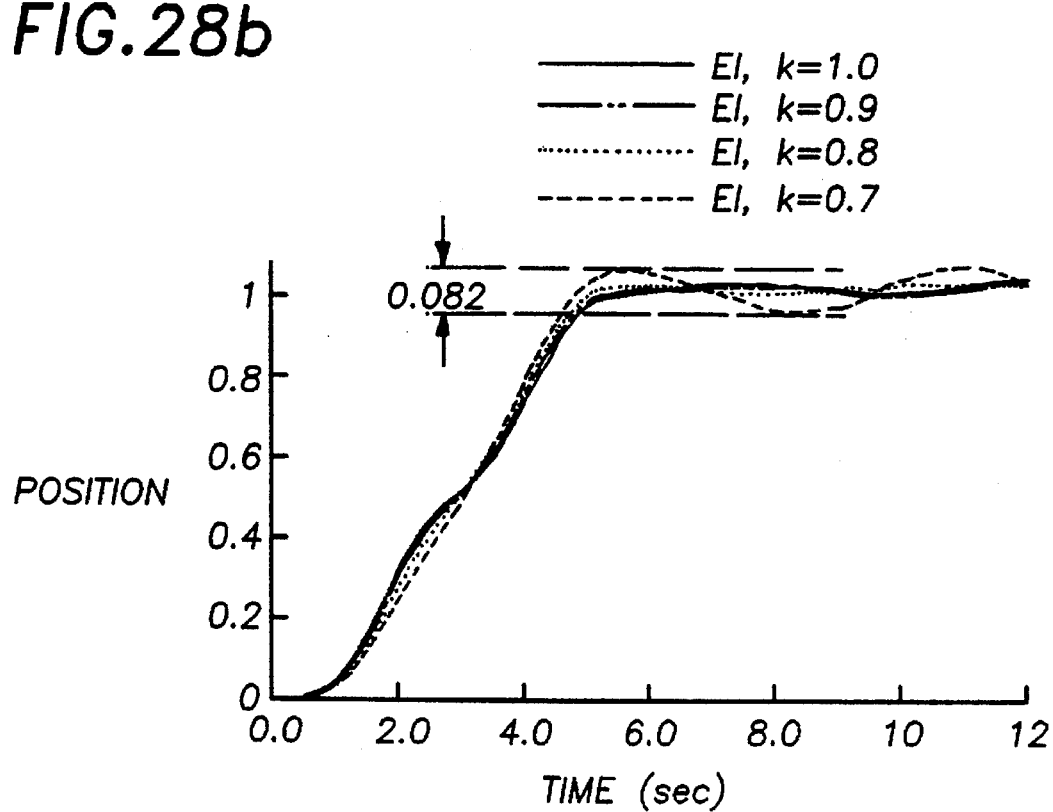

A computer simulation of the system shown in FIG. 25 was constructed in MATLAB. The simulation was performed using the command signal generated with the ZVD input shaper and the V=5% EI input shaper. FIG. 28a graphs the system response to the ZVD shaper and FIG. 28b graphs the response to the EI shaper when k is varied from the nominal value of 1.0 to 0.7 in steps of −0.1. The envelope on the residual vibration is 32% lower for the EI shaper than for the ZVD shaper. For almost any variation of k, the envelope will be smaller for the EI shaper.

The sensitivity curves in FIG. 27 can be interpreted as giving the relative size of the residual vibration amplitude envelope as a function of ω. The only time the ZVD shaper outperforms the EI shaper is when the frequency is in the range of 0.945ω to 1.050ω. We should remember, however, that Input Shaping™ is used because there is uncertainty in the system model or the frequency is expected to change during operation. If it is known that the system will operate within ±5% of its nominal frequency, then a robust input shaper is not needed. In physical systems this is almost never the case, therefore, an EI shaper is almost always preferred to a ZVD shaper.

Figure 29:
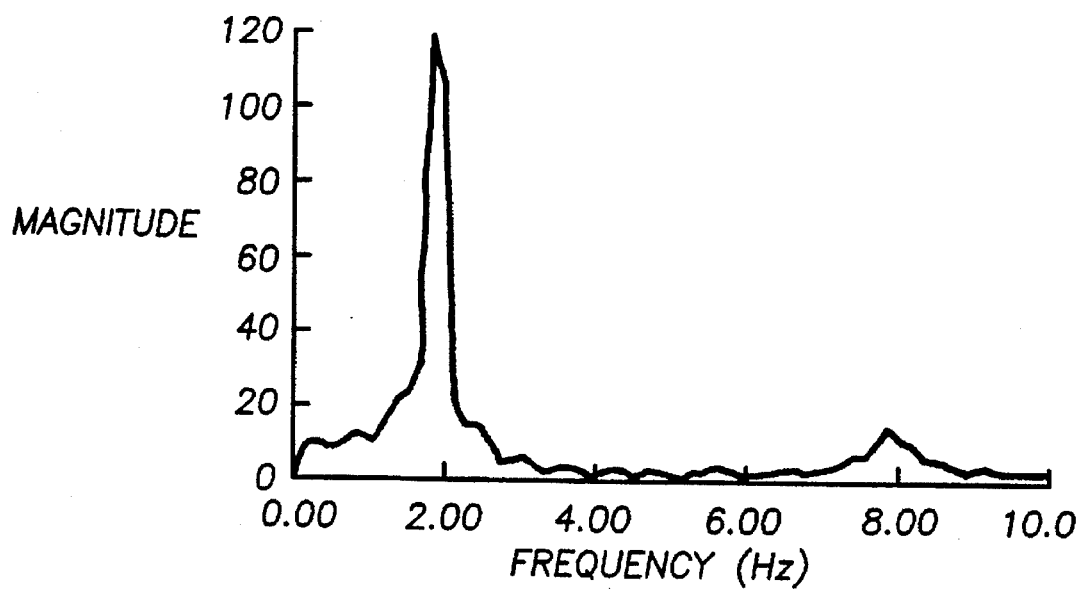
FIG. 29 graphs magnitude versus frequency for the vibration resulting from an unshaped input.

As a further test of the EI input shaper for constant-magnitude pulse systems, we conducted hardware tests on a rotary table. To ensure a vibratory response, a 24 in. steel beam was mounted to the table surface and a 2 lb. mass was attached to the end of the beam. The Inland Torque Motor used to rotate the table was equipped with an HP HEDS-6110 encoder with 44,000 counts per revolution. The motor was powered by an Aerotech DS16020 amplifier and the control signal was generated by a Motion Engineering PC/DSP Motion Controller. A bang-bang acceleration command was given to the table and an FFT was performed on the residual vibration. The frequency spectrum of FIG. 29 shows that the table's dominant low mode is approximately 2 Hz, and its second mode approximately 8 Hz.

Figure 30:
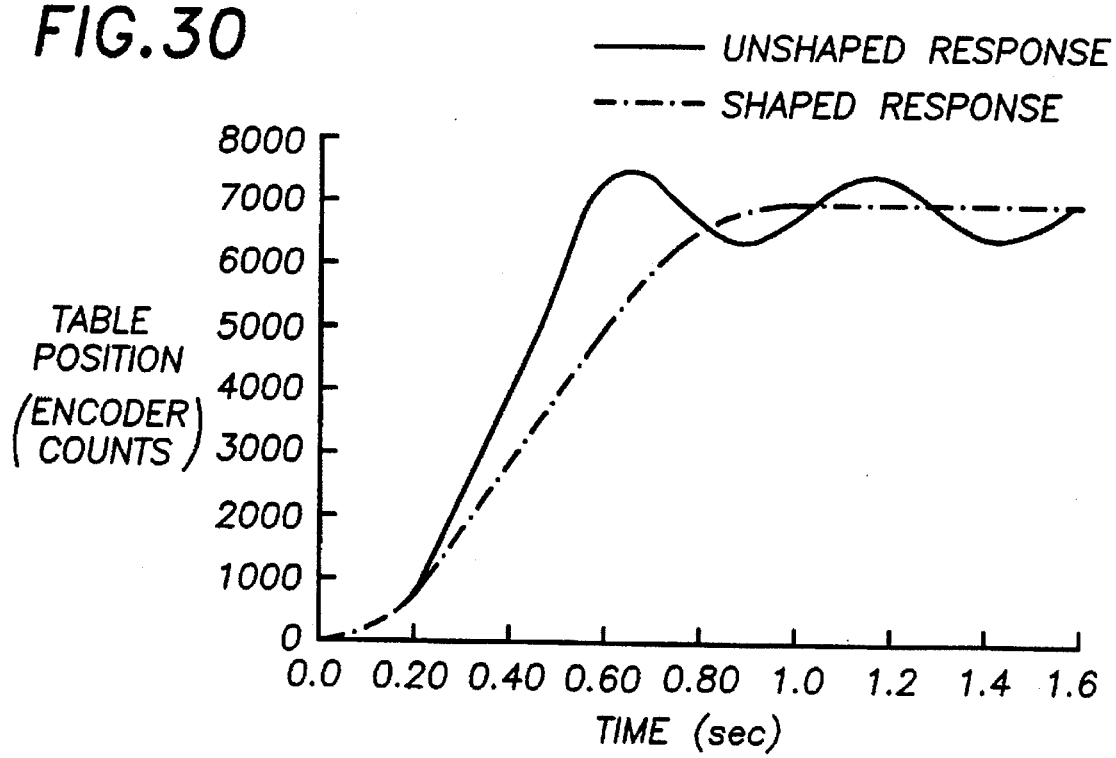
FIG. 30 graphs table position versus time for an unshaped and a shaped input.

A V=5%, EI constant-magnitude shaper was designed for the 2 Hz mode and a 1 radian move. FIG. 30 compares the shaped response and the response to an unshaped bang-bang command that also moves the system 1 radian. The EI shaper reduced the vibration to about 7% of the unshaped vibration level. This is very close to the theoretical reduction of 5%. The small deviation from theory can be explained by errors in our choice of modeling frequency and damping ratio. Additionally, our assumption that the rotary table is a single mode system is not entirely accurate because a second mode at 8 Hz is clearly visible in the frequency spectrum.

Multiple-Mode Impulse Shaping Sequences

Introduction

Singer and Seering [Singer, N., and Seering, W, "Preshaping Command Inputs to Reduce System Vibration," *Journal of Dynamic Systems, Measurement, and Control*, March, 1990] demonstrate that sequences for systems with multiple modes of vibration can be generated by convolving together single-mode sequences for each of the frequencies. This method of shaping for m modes will result in $3^m$ impulses in the sequence, and the sequence will extend the theoretical move time by an amount equal to the sum of the periods of vibration of the modes being shaped. In an effort to reduce the number of impulses and decrease the sequence duration, Hyde and Seering [Hyde, I. and Seering, W., "Using Input Command Pre-Shaping to Suppress Multiple Mode Vibration," *Proceedings of the 1991 IEEE International Conference on Robotics and Automation*, Sacramento, Calif.: April, 1991] developed a method for generating multiple-mode sequences that simultaneously solves the constraint equations for all modes. Direct solution of the constraints for multiple-modes yields sequences with only 2m+1 impulses. Hyde's method generates sequences that produce good vibration reduction characteristics, while being generally shorter than convolved sequences. Unfortunately, this solution method requires complex optimization routines to generate the sequences.

Observation shows that many of the sequences generated by Hyde's method are symmetric about the middle impulse. The undamped systems have sequences that are symmetric in both time and amplitude, while the systems with damping have sequences that are symmetric only in time. We use this symmetry to derive an analytic solution for a two-mode, undamped system.

Two-Mode Sequences:

The method of command shaping was developed from a second-order, linear model of a system with natural frequency, ω, and damping ratio, ζ, Singer, Neil C., *Residual Vibration Reduction in Computer Controlled Machines*, Massachusetts Institute of Technology Artificial Intelligence Laboratory Technical Report No. 1030, 1989]. This system has a known response, y(t), to a sequence of impulses of amplitudes, $A_i$, applied at times, $t_i$.

$$y(t) = \sum_{i=1}^{n} \frac{A_i \omega}{\sqrt{1-\zeta^2}} e^{-\zeta\omega(t-t_i)} \sin[(t-t_i)\omega\sqrt{1-\zeta^2}\,] \quad (1)$$

Singer generates his sequences using the following constraints derived from (1). We present the derivation here because the multiple-mode sequences are derived from the same equations. The amplitude of the response to a series of n impulses is constrained to zero after the sequence of impulses:

$$\sum_{i=1}^{n} A_i e^{-\zeta\omega(t-t_i)} \sin(t_i \omega \sqrt{1-\zeta^2}\,) = 0 \quad (2)$$

$$\sum_{i=1}^{n} A_i e^{-\zeta\omega(t-t_i)} \cos(t_i \omega \sqrt{1-\zeta^2}\,) = 0 \quad (3)$$

The derivatives of (2) and (3) with respect to natural frequency are also constrained to zero, adding insensitivity to modeling errors:

$$\sum_{i=1}^{n} A_i r_{ie}^{\zeta\omega(t-t_i)} \sin(t_i \omega \sqrt{1-\zeta^2}) = 0 \quad (4)$$

$$\sum_{i=1}^{n} A_i r_{ie}^{\zeta\omega(t-t_i)} \cos(t_i \omega \sqrt{1-\zeta^2}) = 0 \quad (5)$$

Three other constraints are specified:

$$t_1 = 0 \quad (6)$$

$$\sum_{i=1}^{n} A_i = 1 \quad (7)$$

$$A_i \geq 0 \quad (8)$$

Eqn. (6) sets the time origin for the shaper, eqn. (7) guarantees unity gain, and eqn. (8) constrains the amplitudes to be positive, insuring that higher frequencies will not be excited by the shaper. With these seven constraints, (2)–(8), the three-impulse sequence is generated.

The two-mode sequence requires a different set of constraints: (2)–(5) are repeated for the $\omega$ and $\zeta$ of each of the two frequencies and (6) and (7) are included. These ten constraint equations yield a five-impulse sequence for two modes of vibration. When $\zeta$ is zero for both modes, a closed-form solution can be found. We assume that a five-impulse, symmetric solution exists to equations (2)–(8) for two modes, with amplitudes $A_i$ and times $t_i$, substitute $$T_i = t_i - t_3 \quad (9)$$

into (1), and re-derive (2)–(5) in terms of the $T_i$, with $\zeta=0.0$. The symmetry assumption makes $T_1=-T_5$, $T_2=-T_4$, $A_1=A_5$, and $A_2=A_4$. This derivation yields four equations (10) & (11), which with (6) and (7), define a five-impulse, symmetric sequence for two frequencies of vibration, $\omega_j$:

$$\frac{1}{4} = A_1 \sin^2\left(\frac{\omega_j T_1}{2}\right) + A_2 \sin^2\left(\frac{\omega_j T_2}{2}\right), j = 1, 2. \quad (10)$$

$$0 = T_1 A_1 \sin(\omega_j T_1) + T_2 A_2 \sin(\omega_j T_2), j = 1, 2. \quad (11)$$

Figure 31:
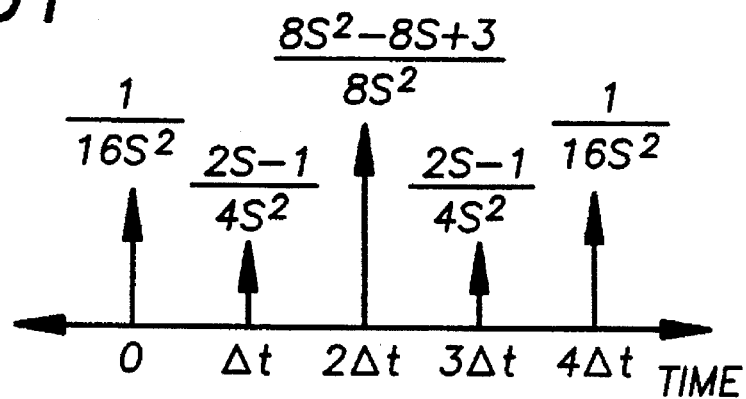
FIG. 31 illustrates a symmetric, five impulse sequence which reduces vibrations for two different modes.

FIG. 31 shows the symmetric, five-impulse sequence for two undamped modes. The impulse amplitudes do not depend upon the actual values of the frequencies, but only upon r, the ratio of the frequencies. The impulse spacing is a function of the sum of the two frequencies. Furthermore, the impulses are evenly spaced as well as symmetric. This two-mode sequence should have several advantages over Singer's three-impulse sequences. First, the new sequence uses fewer impulses to cancel the same number of modes, while meeting the same constraints to increase insensitivity to modeling errors. Fewer impulses reduces the computation requirements for the impulse shaping, increasing the ease of implementation. Second, the two-mode sequence will always be shorter than convolved sequences. Comparing the length of the two sequences, we see that the length of the two-mode sequence is always less than the sequence resulting from the convolution of two three-impulse sequences.

$$\frac{4}{f_1 + f_2} \leq \frac{1}{f_1} + \frac{1}{f_2} \quad (12)$$

The time savings of the direct-solution sequence is up to 25% over the convolved sequence.

$$T_{savings} = \left(\frac{r-1}{r+1}\right)^2 \quad (13)$$

Unfortunately, the domain of frequency ratios, r, that yield valid sequences is limited. For frequency ratios greater than 3.0, this solution yields sequences with negative impulses.

The five-impulse sequence has been generated for the two-mode, undamped system. Sequences can be generated for systems with significant damping as well, using the following equations, which were found by fitting curves to sequences generated by using Mathematica's Equation Solver [Wolfram, S., Mathetmatica™: A System for Doing Mathematics by Computer, New York: Addison-Wesley, 1988].

$A_1 = 0.1033 - 0.0899r + 0.0459r^2 + 0.2465\zeta + 0.2411r\zeta + 0.0155r^2\zeta$ $A_2 = 0.0446 + 0.2903r - 0.1005r^2 + 1.5768\zeta - 0.9519r\zeta + 0.2216r^2\zeta$ $A_3 = 0.7030 - 0.3964r + 0.1076r^2 - 1.4736\zeta + 1.5214r\zeta - 0.4604r^2\zeta$ $A_4 = 0.0451 + 0.2846r - 0.0982r^2 + 0.3336\zeta - 1.4657r\zeta + 0.4953r^2\zeta$ $A_5 = 0.1037 - 0.0884r + 0.0452r^2 - 0.6813\zeta + 0.6529r\zeta - 0.2714r^2\zeta$ $$t_1 = 0 \quad (14)$$

$t_2 = (0.753 - 0.306r + 0.047r^2 + 2.017\zeta - 2.694r\zeta + 0.889r^2\zeta - 12.796\zeta^2 + 16.342r\zeta^2 - 4.860r^2\zeta^2)t_d$ $t_3 = (1.453 - 0.551r + 0.0788r^2 - 0.143\zeta + 0.232r\zeta - 0.0599r^2\zeta + 3.687\zeta^2 - 4.543r\zeta^2 + 1.519r^2\zeta^2)t_d$ $t_4 = (2.208 - 0.858r + 0.127r^2 + 2.052\zeta - 2.662r\zeta + 0.857r^2\zeta - 9.054\zeta^2 + 12.045r\zeta^2 - 3.561r^2\zeta^2)t_d$ $t_5 = (2.908 - 1.102r + 0.158r^2 + 0.757\zeta - 0.821r\zeta + 0.205r^2\zeta + 5.150\zeta^2 - 6.010r\zeta^2 + 2.001r^2\zeta^2)t_d$ where $$r = \frac{\max(\omega_1, \omega_2)}{\min(\omega_1, \omega_2)}, \quad \zeta = \frac{\zeta_1 + \zeta_2}{2}, \quad t_d = \frac{2\pi}{\min(\omega_1, \omega_2)}$$

Using a similar derivation, a shorter sequence for two modes, can be found. This sequence will be derived without using the derivative constraints (4) & (5). However, the resulting sequence will not be as insensitive to modeling errors as the five-impulse sequence. The three-impulse sequence for two modes has the same time spacing as the five-impulse sequence. The sequence amplitudes are as follows, $$A_1 = A_3 = \frac{1}{4S} \quad (15)$$

$$A_2 = \frac{(2S-1)}{2S} \quad (16)$$

where S is defined in FIG. 31.

When the damping ratios are not zero, finding solutions to the ten constraint equations is not as simple. Closed-form solutions have not been found. However, using GAMS, a non-linear equations solving software package, solutions can be found as described in [Hyde, J. and Seering, W., "Using Input Command Pre-Shaping to Suppress Multiple Mode Vibration," *Proceedings of the 1991 IEEE International Conference on Robotics and Automation*, Sacramento, Calif.: April, 1991] and [Rappole, B. W.; Singer, N. C.; Seering, W. P. "Input Shaping™ with Negative Sequences for Reducing Vibrations in Flexible Structures," *Proceedings of 1993 Automatic Controls Conference*, San Francisco, Calif.].

Figure 32:
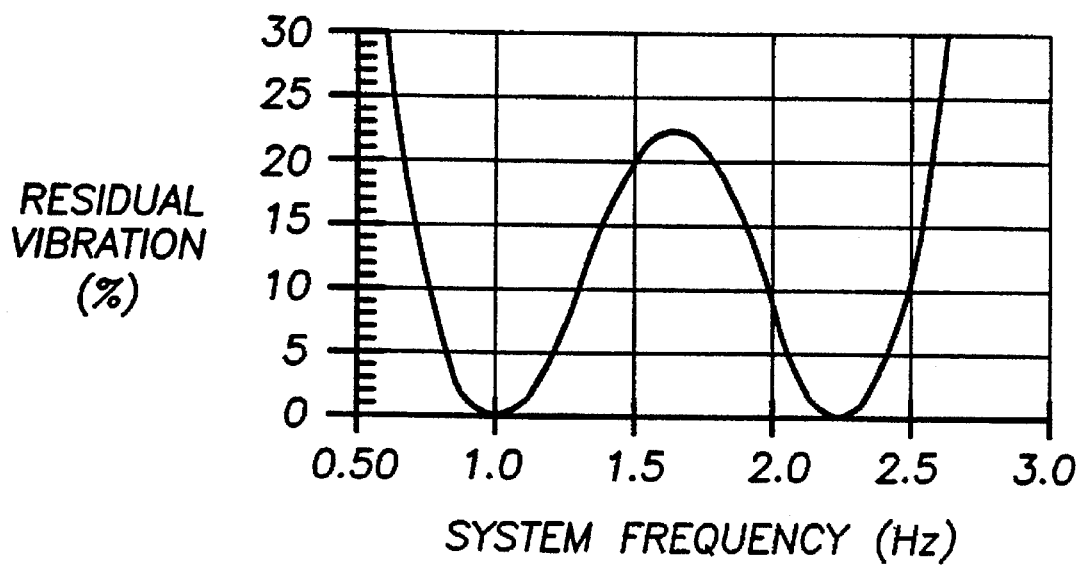
FIG. 32 graphs the residual vibration versus system frequency for a sequence of the type shown in FIG. 31.

Insensitivity to modeling errors:

A major benefit of command shaping over other methods is its insensitivity to errors in modeling. The insensitivity of a sequence to errors in the estimate of system frequency can be calculated using the linear system response to a series of impulses, as given by eqn. (1). The insensitivity is measured as the range of system frequencies for which a sequence will reduce the residual vibration below 5% of the unshaped system response. Singer's three-impulse sequences have insensitivity of ±13% for each mode. A five-impulse sequence for 1.0 Hz and 2.25 Hz has insensitivity of ±17% around the lower mode and ±8% for the high mode as shown in FIG. 32. The high mode insensitivity will vary with the frequency ratio.

Figure 33:
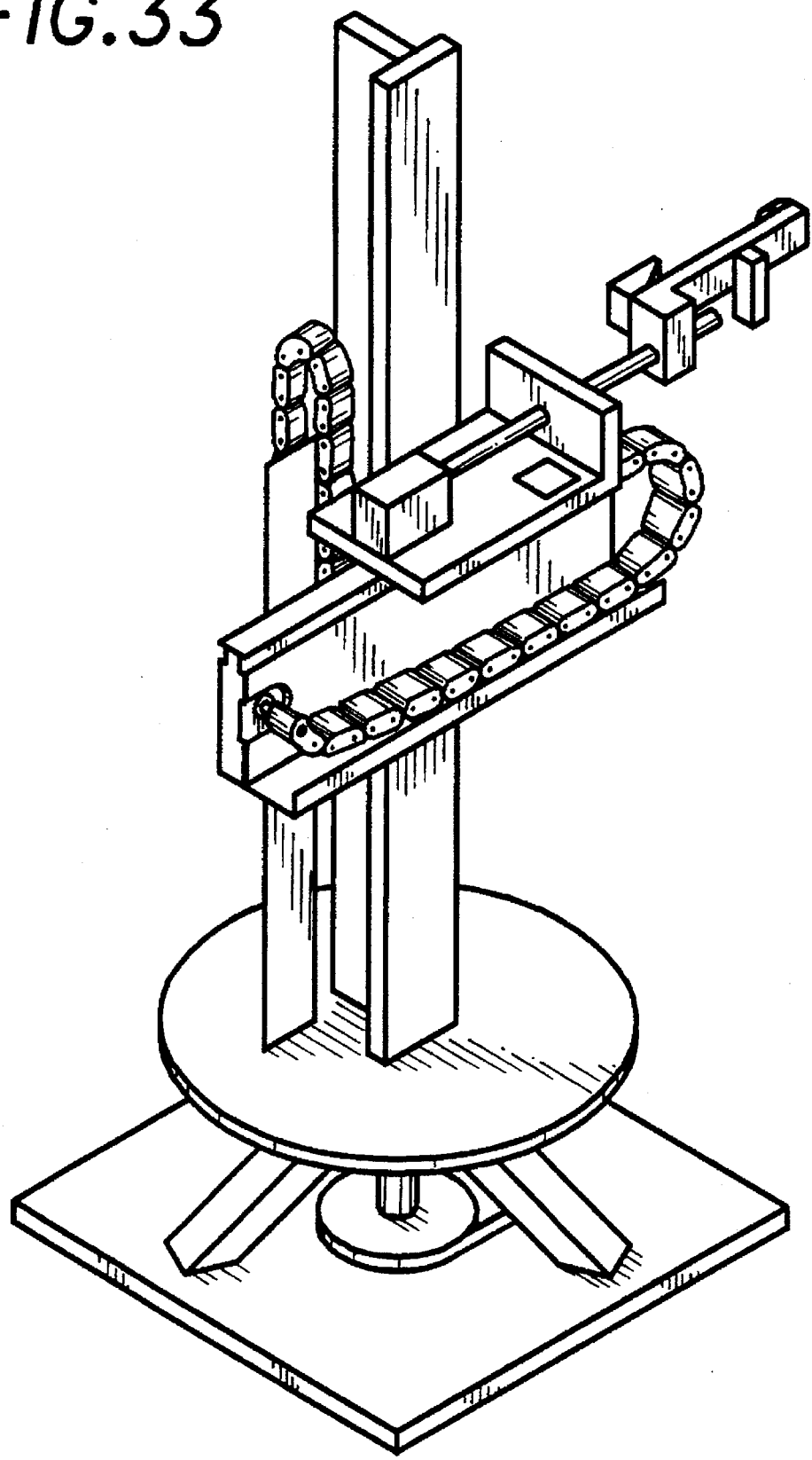
FIG. 33 illustrates the CMS system.

Experimental setup:

The CMS is a four-axis robot used for handling work-in-progress during the manufacture of silicon wafers. FIG. 33 shows a drawing of the robot portion of the CMS. The R-axis refers to the radial reach of the robot; the Z-axis is the vertical travel of the gripper and R-axis; the T-axis is the rotation of the whole robot. The W-axis is the rotation of the gripper. The R, Z, and T axes contribute significantly to the system vibrations. The W-axis motions do not tend to excite the system. The travel distance, direction, velocity and acceleration are shown in Table 7. The slow speed refers to the original controller. The fast speed refers to the speeds at which the Input Shaping™ tests were run. The robot stores cassettes of silicon wafers in racks surrounding the robot. There are two vibration problems with this system. First are structural vibrations found in the bending of the z-rail. These vibrations have significant amplitude and affect the positioning of the cassettes and the visual appeal of the system. Second are smaller vibrations in the r-axis that excite the wafers. Wafer rattle is of great concern as it generates particles that can contaminate the wafers.

TABLE 7

CMS Motion Parameters

| Axis | Range (in)* | Slow Vel (in/sec) | Slow Accel (in/sec$^2$) | Fast Vel (in/sec) | Fast Accel (in/sec$^2$) |
|---|---|---|---|---|---|
| R (reach) | 21 | 12.8 | 42.6 | 24.6 | 91.9 |
| Z (up/down) | 63 | 16.1 | 30.8 | 30.6 | 57.5 |
| T (rotation) | 300 | 132 | 120 | 164 | 290 |

*Substitute degrees for inches on T.

A DSP (digital signal processing) based control system utilizing Input Shaping™ technology was developed for the robot. The controller is a PC-Bus based 4-axis board. A PID controller is run with a 1500 Hz servo rate. Encoder feedback is used in the control for both position and velocity. The velocity is calculated as the first difference in the encoder position. Desired position and velocity are commanded at each servo interrupt. The motions of the axes are based upon trapezoidal velocity profiles using the maximum velocity and acceleration values from Table 7. An unshaped move is a trapezoidal velocity profile. A shaped profile is the unshaped profile convolved with the shaping filter.

Figure 34:
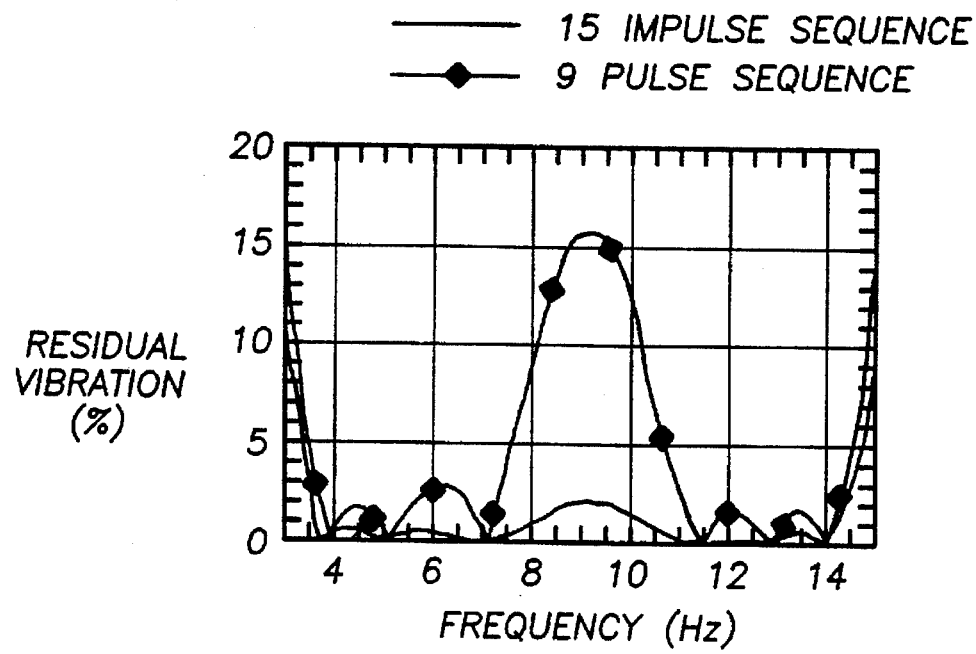
FIG. 34 graphs the residual vibration versus frequency for a nine-impulse and fifteen-impulse sequence.

Before Input Shaping™ can be implemented, the system resonances must be determined. A laser interferometer was used to measure the vibrations in the CMS robot during several standard maneuvers. These maneuvers were repeated with the laser retroreflector located at different points on the structure: on the z-rail and the r-axis endpoint. The system exhibits two primary resonances: 3.95 Hz and 5.10 Hz. These two frequencies are the bending of the z-rail in two directions. The frequency identification showed that these two frequencies remain within +5% throughout the workspace. It was determined that a three-impulse sequence for these two frequencies be used. Preliminary tests with this sequence showed the presence of higher frequency vibrations that cause wafer rattle. Further identification revealed several smaller resonances at 6.7, 7.5, 8.7, 9.5, and 11.2 Hz. Two new sequences were calculated to remove these frequencies as well. The insensitivity plot for these two sequences are shown in FIG. 34. The 9-Impulse Sequence is a second three-impulse, two-mode sequence for 7.0 and 11.5 Hz, convolved with the 3-impulse sequence for the lower modes. The 15-impulse sequence is a five-impulse sequence for the higher modes convolved with the three-impulse sequence for the lower modes.

Experimental Results:

Experiments were performed using the two sequences from FIG. 34. There were two goals in the experiments. The first goal was to validate the new sequences. The second goal was to determine if the speed of the robot could be increased while maintaining certain vibration tolerances.

Figure 35:
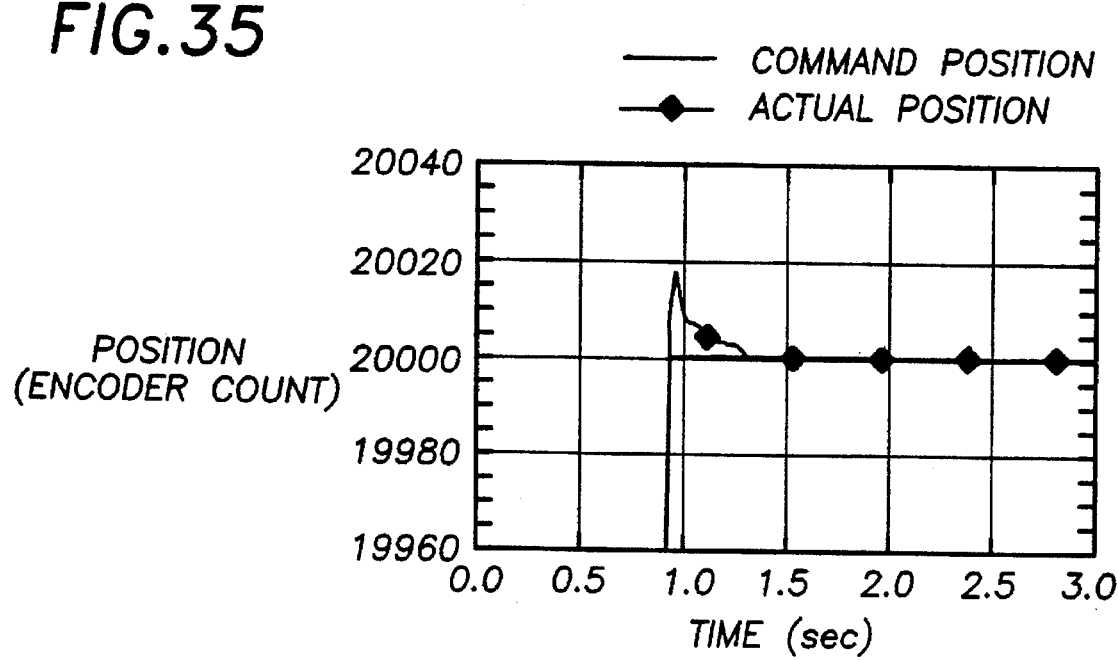
FIG. 35 graphs encoder position versus time.
Figure 36A:
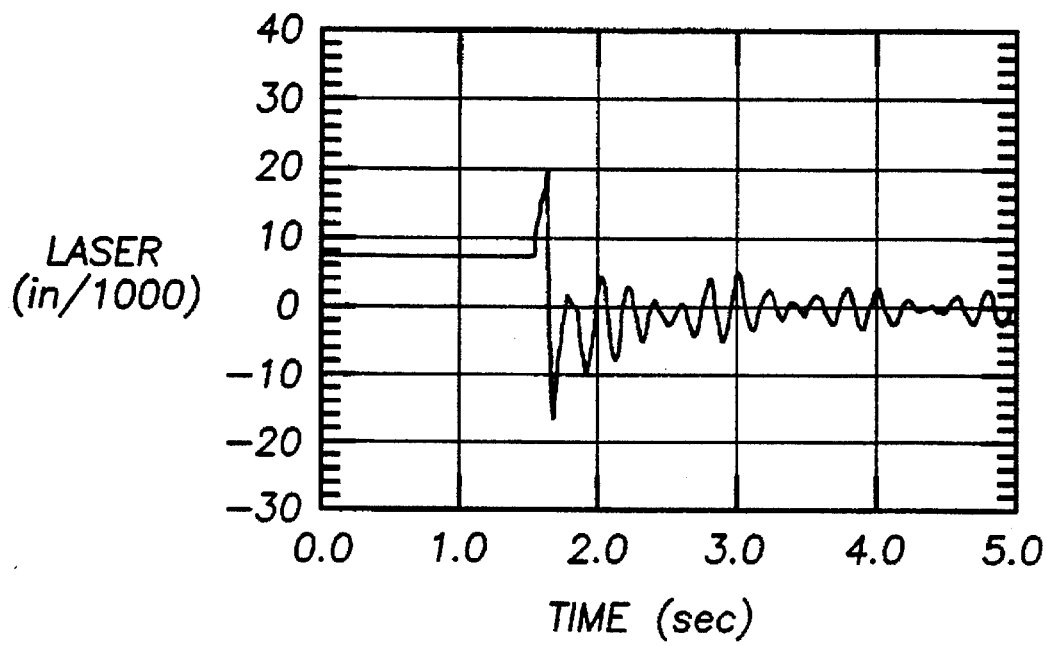
FIGS. 36a, 36b, 36c, and 36d graph laser derived position versus time for four different impulse sequences.
Figure 36B:
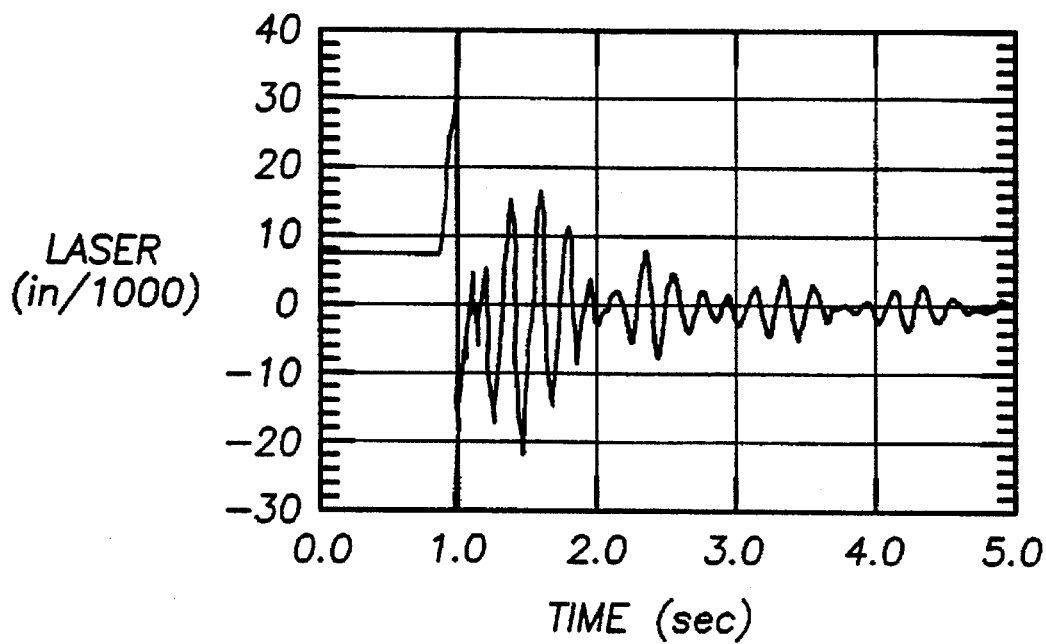
Figure 36C:
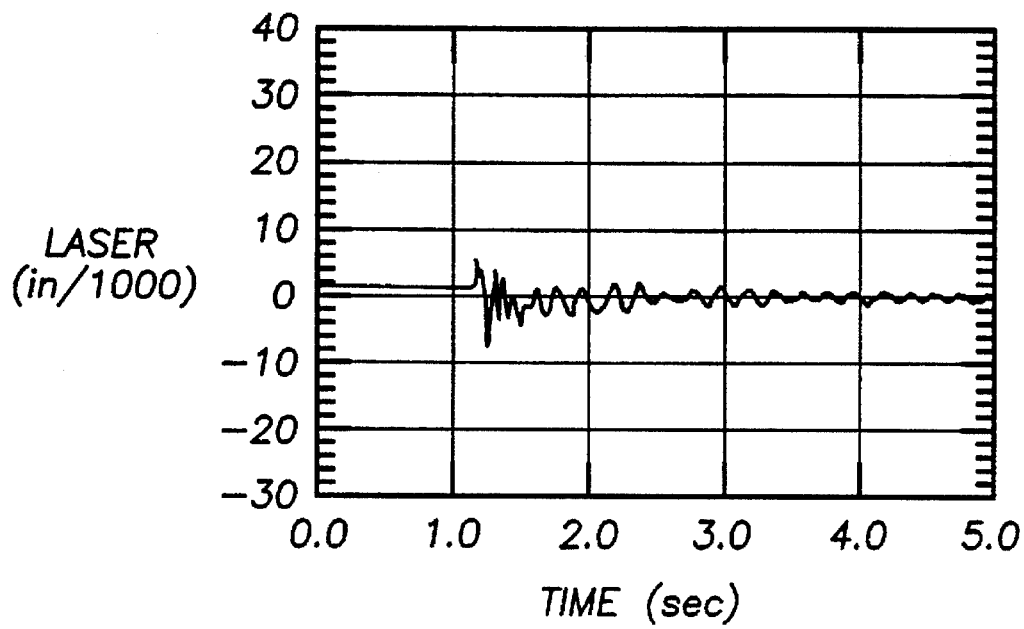
Figure 36D:
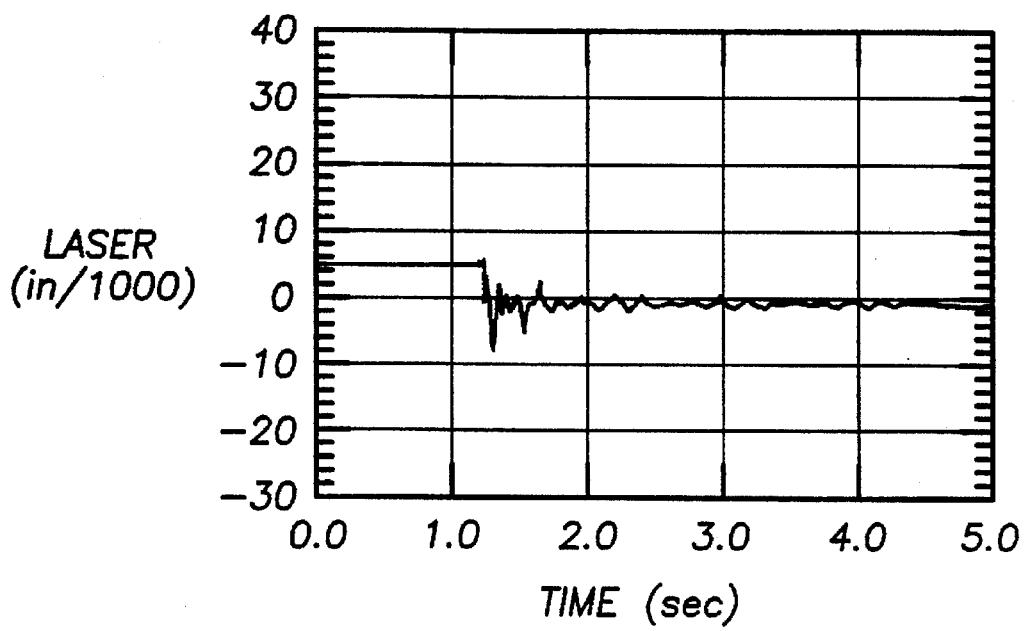

The vibrations of the CMS are entirely unobservable at the feedback encoders. FIG. 35 shows a close-up of the settle portion of an unshaped, Fast, 20,000 count (16.78 in) R-axis maneuver. There are no vibrations present at the encoders. Similar results can be found on the Z and T axes.

In order to validate the new sequences, several R-axis maneuvers were performed. An unshaped Slow slew and unshaped Fast slew were compared to a 9-impulse shaped Fast slew, and a 15-impulse shaped Fast slew, as shown in FIGS. 36a, 36b, 36c and 36d, respectively. During these tests, the laser retroreflector was mounted on the side of the gripper. The laser only reads valid data at the end of the slew, when the retroreflector has entered the laser beam. All the laser data have been normalized such that the end position is zero. Table 8 contains the vibration reducing ability of the different sequences at different speeds. One common method of reducing vibrations is to slow down the machine. The data show that a 70% increase in move time results in at least 56% of the vibration from the original unshaped, fast move. Input Shaping™ produces superior results. By using the 15-impulse sequence, the move time is increased by only 44% and reduces the vibrations to less than 15% of the original magnitude.

TABLE 8

Comparison of R-Axis Moves to Fast Unshaped.

| Sequence Time (sec) | Speed | Move Time (sec) | 4 Hz (%) | 5 Hz (%) | 6.7 Hz (%) | 7.5 Hz (%) |
|---|---|---|---|---|---|---|
| 0.00 | Fast | 0.95 | 100.0 | 100.0 | 100.0 | 100.0 |
| 0.33 | Fast | 1.27 | 20.9 | 20.3 | 21.5 | 18.8 |
| 0.43 | Fast | 1.37 | 18.1 | 14.3 | 10.7 | 14.6 |
| 0.00 | Slow | 1.61 | 72.1 | 58.9 | 56.0 | 66.6 |

The new Input Shaping™ sequences are effective in reducing the vibrations of a particular move. In applying Input Shaping™ to the CMS, the goal was not to reduce vibrations, but to increase the throughput of the system. To this effect we must simultaneously decrease the move time and maintain the vibrations below the specified tolerance. Original, unshaped, slow moves are compared to Fast, shaped moves using both the 9-impulse and 15-impulse sequences. The shaped Fast speeds have been determined as acceptable in both positional accuracy and wafer raffle. Each move is tested on three axes: +16.78 in along the R-Axis, −26.25 in. along the Z-axis, and +211.26° clockwise in T-axis. Table 9 shows the results of these tests.

TABLE 9

Comparison of Moves: Fast 15 Impulse Shaped and
Fast 9 Impulse Shaped to Slow Unshaped a) R-Axis

| Sequence Time (sec) | Speed | Move Time (sec) | 4 Hz (%) | 5 Hz (%) | 6.7 Hz (%) | 7.5 Hz (%) |
|---|---|---|---|---|---|---|
| 0.33 | Fast | 1.27 | 29.0 | 34.5 | 38.5 | 28.2 |
| 0.43 | Fast | 1.37 | 25.1 | 24.3 | 19.0 | 21.9 |
| 0.00 | Slow | 1.61 | 100.0 | 100.0 | 100.0 | 100.0 | b) Z-Axis

| Sequence Time (sec) | Speed | Move Time (sec) | 4 Hz (%) | 5 Hz (%) | 8.7 Hz (%) | 12.0 Hz (%) |
|---|---|---|---|---|---|---|
| 0.33 | Fast | 2.16 | 70.9 | 29.4 | 124.3 | 42.9 |
| 0.43 | Fast | 2.25 | 51.0 | 33.8 | 86.8 | 42.3 |
| 0.00 | Slow | 2.70 | 100.0 | 100.0 | 100.0 | 100.0 | c) T-Axis

| Sequence Time (sec) | Speed | Move Time (sec) | 4 Hz (%) | 5 Hz (%) | 9.0 Hz (%) | 11.2 Hz (%) |
|---|---|---|---|---|---|---|
| 0.33 | Fast | 1.71 | 73.3 | 31.6 | 78.5 | 83.0 |
| 0.43 | Fast | 1.81 | 80.2 | 31.5 | 123.0 | 82.7 |
| 0.00 | Slow | 2.15 | 100.0 | 100.0 | 100.0 | 100.0 |

In all cases, the vibration levels were reduced while the move time was also reduced by 15%–21%. The T-axis shows the poorest vibration reduction, likely due to the poor resolution of the T-axis encoder. One encoder count of the T axis corresponds to 0.0029 in. in the direction of the laser. This poor resolution in T, limits the ability of reducing the vibrations to less than the magnitude that the 15-impulse sequence does. The small decrease in the 3.9 Hz vibration during the Z-axis moves can be attributed to the small magnitude of the 3.9 Hz vibrations during unshaped Z-axis maneuvers. The lowest mode is barely excited during unshaped Z-axis moves; the 5.0 Hz mode is approximately 10 times greater in magnitude during Z-axis moves.

Figure 37:
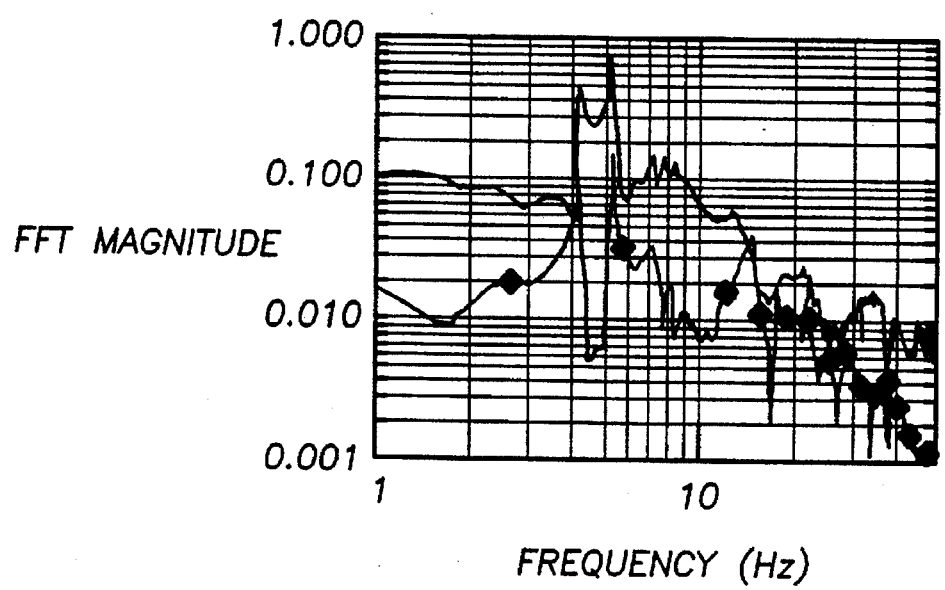
FIG. 37 graphs the magnitude of the FFT versus frequency for a shaped and an unshaped input.

The tests also reveal that the 15-impulse sequence yields better performance at all frequencies than the 9-impulse sequence. The longer sequence is much more successful in reducing the wafer rattle. FIG. 37 shows an FFT of the laser data from an unshaped, Slow R-axis slew and from a 15-impulse shaped, Fast slew. The Input Shaping™ yields an order of magnitude decrease in vibrations throughout the range important to the CMS.

Input Shapers™ for Digital Systems:

Introduction

Figure 38:
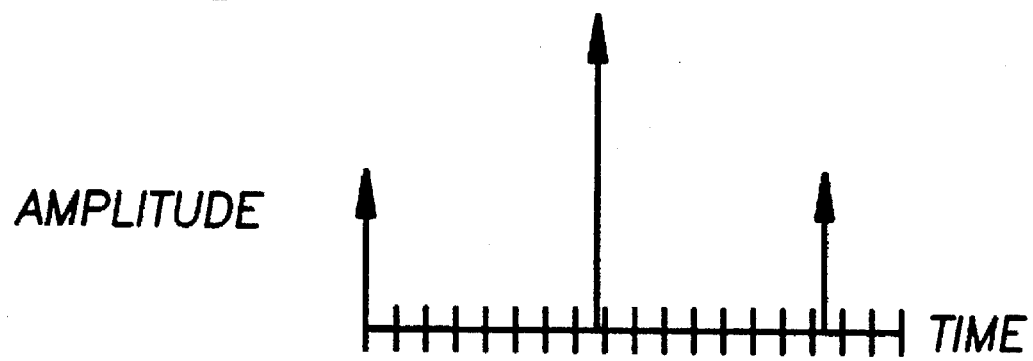
FIG. 38 illustrates a situation in which a three-impulse sequence does not fit the discrete spacing of a system.
Figure 39:
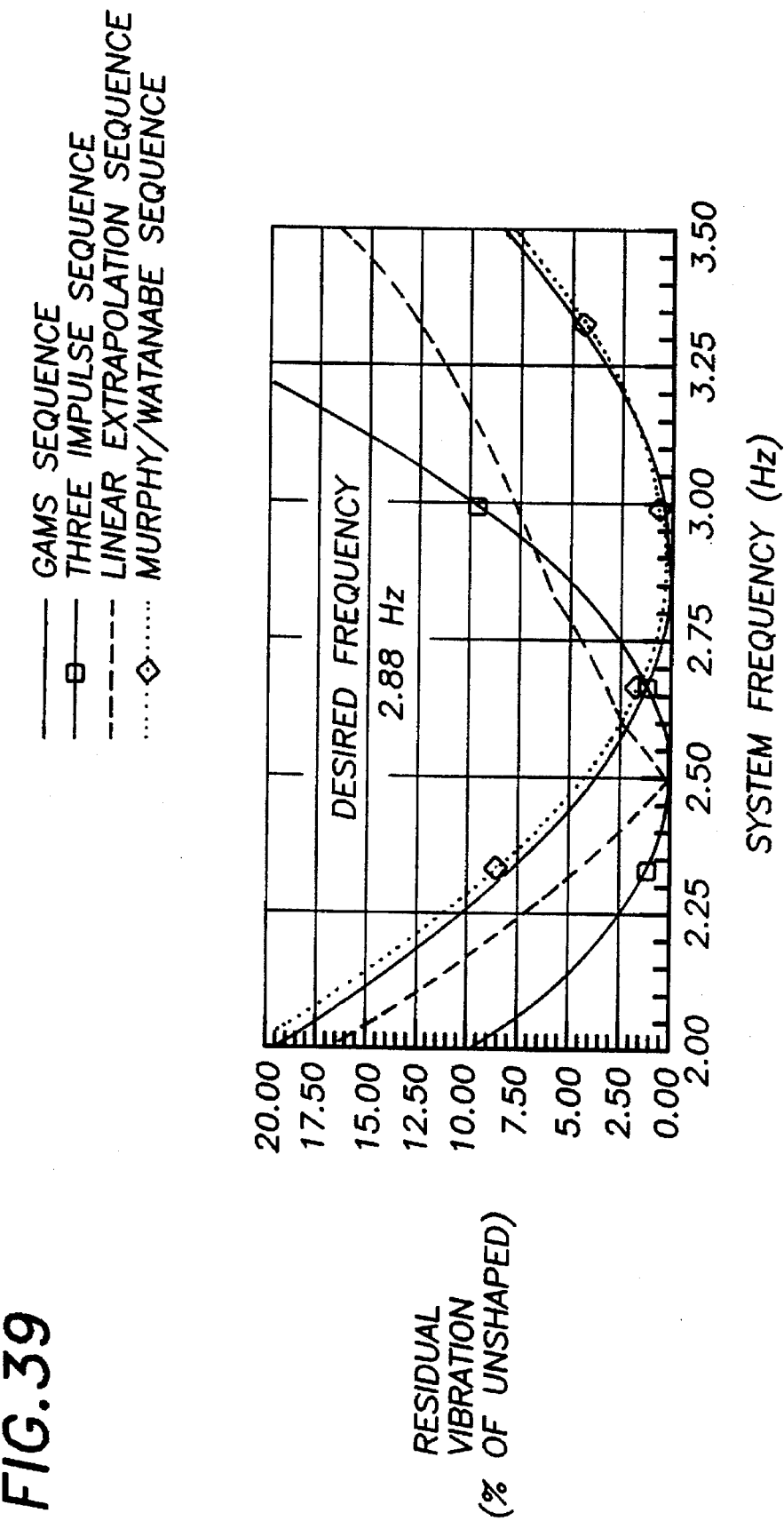
FIG. 39 graphs residual vibrations versus system frequency for four different impulse sequences.

Real computer controlled systems have a limitation that is ignored in Singer and Seering's constraints for the three-impulse sequence, given by equations 2–8 in the previous section: the discrete time spacing of the controller. As depicted by the hash marks in FIG. 38, a computer controlled system operates using a time system which is discretized. However, both the three impulse sequence and the five-impulse sequence are essentially analog in nature and the exact locations of the impulses may not fall on the discrete time locations used by the computer controlled system. To fit the sequences to the digital spacing of a computer controlled system requires some alterations to the sequences. Several methods have been proposed. First, the impulses may be moved to the closest digital time step. This method will alter the frequency that the sequence will eliminate, but will maintain the insensitivity to modeling errors. Second, Watanabe and Murphy [Murphy, B. R., and Watanabe, I., "Digital Shaping Filters for Reducing Machine Vibration," *IEEE Transactions on Robotics and Automation*, Vol. 8, No. 2, Apr., 1992] suggest a graphical method for dividing impulses that fall between digital steps. The method they present will violate constraint (7), but normalizing the amplitudes to one can fix this problem. Third, Rappole presents a linear extrapolation method to divide impulses that fall between digital steps. This method works well when $f_{sample}/f_{vibration}$ is large. Fourth, Hyde and Seering [Hyde, J. and Seering, W., "Using Input Command Pre-Shaping to Suppress Multiple Mode Vibration," *Proceedings of the 1991 IEEE International Conference on Robotics and Automation*, Sacramento, Calif.: April, 1991] and Rappole, Singer and Seering [Rappole, B. W. Jr., Singer, N. C., and Seering, W. P., "Input Shaping™ With Negative Sequences for Reducing Vibrations in Flexible Structures," *Transactions of the 1993 Automatic Controls Conference*, San Francisco, 1993] present a method of using GAMS (a non-linear equation solver) to find an exact solution to (2)–(8) with the digital time spacing also included in the constraints. The sequences from GAMS work very well, unfortunately, the optimization routines employed in GAMS are time consuming and not closed-form. FIG. 39 shows the insensitivity of sequences generated using the techniques listed above when used to digitize a sequence for 2.88 Hz. and 0.00 damping with a 10.0 Hz. sample rate. With these parameters, the linear extrapolation method works worst because of the low $f_{sample}/f_{vibration}$ value. The sequence found by changing the time spacing of the three-impulse sequence has good insensitivity to modeling errors, but no longer eliminates the desired frequency.

Input Shaping Method

The last three methods are preferable to the first in that they generate sequences that eliminate exactly the desired frequency. All three of these methods are similar in that the sequence is changed from three impulses to five impulses, and all three use the two closest digital time steps to the impulses that fall between steps. We can express the times of a modified three-impulse sequence in equation form, where dt is the time step of the controller and t is the time spacing of the original sequence:

$$t_1 = 0.0 \tag{13}$$

$$t_2 = dt * \text{floor}(t/dt)$$

$$t_3 = t_2 + dt$$

$$t_4 = dt * \text{floor}(2*t/dt)$$

$$t_5 = t_4 + d$$

By assuming that an exact solution to (2)–(8) exists with the five times given by (13), we now have five equations with five unknowns-the impulse amplitudes. We find the amplitudes from the matrix equation for the $A_i$:

$$A = M^{-1}V \tag{14}$$

Where $$A = \begin{bmatrix} A_0 \\ A_1 \\ A_2 \\ A_3 \\ A_4 \end{bmatrix}, \quad (15)$$

$$M = \begin{bmatrix} 1 & 1 & 1 & 1 & 1 \\ B_0 S_0 & B_1 S_1 & B_2 S_2 & B_3 S_3 & B_4 S_4 \\ B_0 C_0 & B_1 C_1 & B_2 C_2 & B_3 C_3 & B_4 C_4 \\ t_0 B_0 S_0 & t_1 B_1 S_1 & t_2 B_2 S_2 & t_3 B_3 S_3 & t_4 B_4 S_4 \\ t_0 B_0 C_0 & t_1 B_1 C_1 & t_2 B_2 C_2 & t_3 B_3 C_3 & t_4 B_4 C_4 \end{bmatrix}, \quad (16)$$

$$V = \begin{bmatrix} 1 \\ 0 \\ 0 \\ 0 \\ 0 \end{bmatrix}, \quad (17)$$

$$B_i = e^{-\zeta \omega t_i}, \quad (18)$$

$$S_i = \sin(t_i \omega \sqrt{1-\zeta^2}), \text{ and} \quad (19)$$

$$C_i = \cos(t_i \omega \sqrt{1-\zeta^2}). \quad (20)$$

Figure 40A:
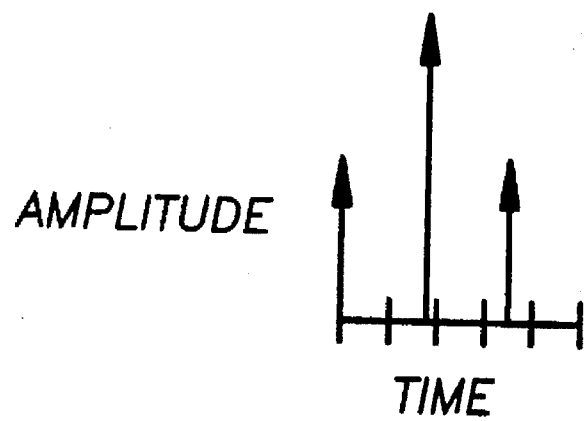
FIG. 40a illustrates how a three-impulse sequence which does not fit the discrete spacing of a system.
Figure 40B:
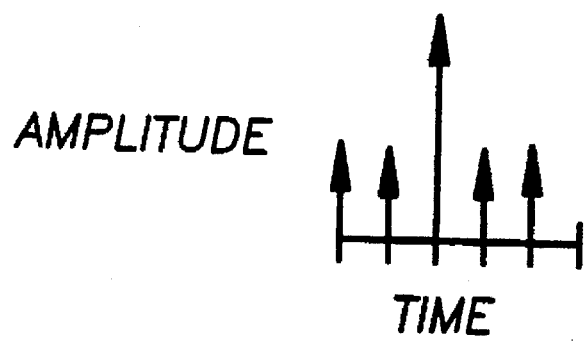
FIG. 40b illustrates a five-impulse sequence, based on the three-impulse sequence of FIG. 40a, which does fit the discrete spacing of a system.

Using the above equations, we can calculate an exact solution for the Singer & Seering three-impulse sequence fit to the digital time spacing of a system. FIG. 40a shows the original three-impulse sequence from FIG. 39, while FIG. 40b shows the exact digital sequence from (14), which we will refer to as a five-impulse digital sequence. For many values of $f_{vibration}$, $\zeta$, and $f_{sample}$, the new method yields the same sequence as GAMS will. The insensitivity of the five-impulse digital sequence will resemble that of the GAMS sequence in FIG. 39. Using a similar derivation, exact digital sequences for the five-impulse sequences derived above can also be found. When digitized, the five-impulse sequence will become a nine-impulse digital sequence. Using the equations presented previously for the damped five-impulse sequence, we calculate the digital times using the same idea as in (13). Once the nine times are calculated, the matrices in Equation (14) are expanded to 9×9 by repeating rows 2–5 for the second frequency, and adding extra columns for four extra impulses.

Experimental results

Figure 41:
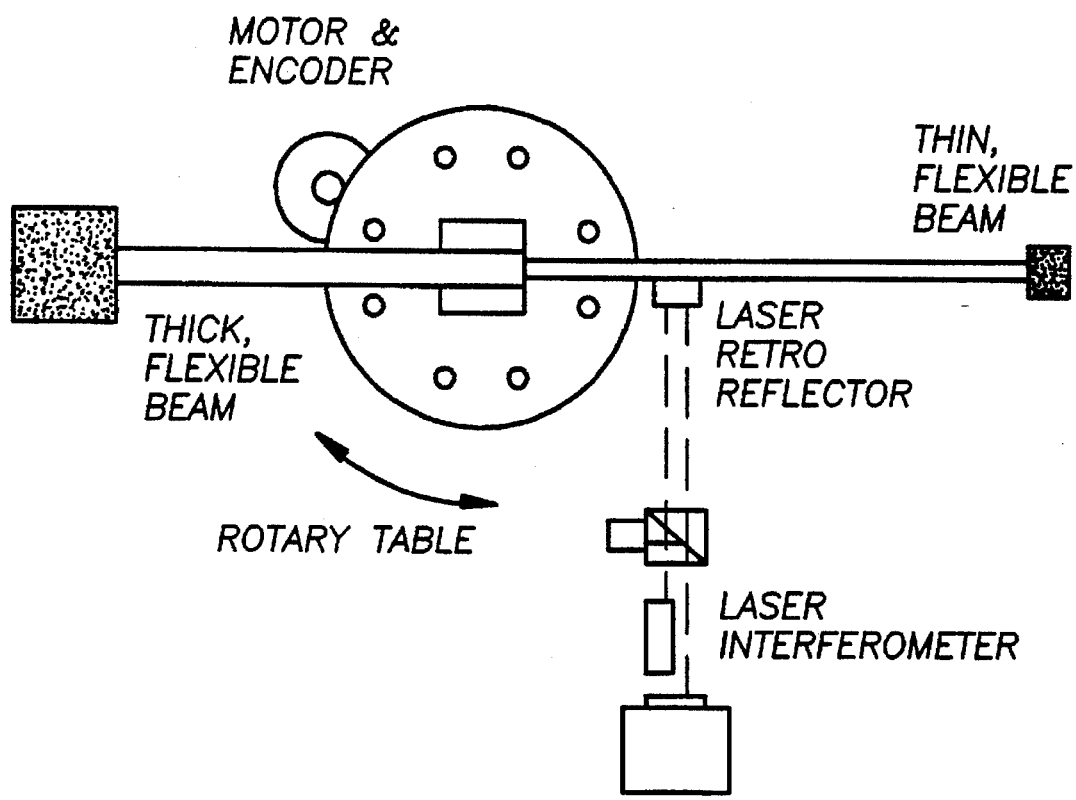
FIG. 41 illustrates an experimental configuration with two modes of vibration.

Tests were conducted on a rotary table with two flexible beams as shown in FIG. 41. A PD controller was designed to control the position of the table, using the motor encoder for both position and synthetic tachometer feedback. The laser interferometer was used to measure the position of the thin, flexible beam, but it was not used for feedback. The laser and encoder were both sampled at the same rate (250 Hz.) by the computer controller. Under the PD control, the system showed a first frequency of vibration of 2.34 Hz. with approximately 0.10 damping ratio. The second vibratory mode has a frequency of 3.90 Hz., with approximately 0.01 damping ratio. In the configuration shown, the laser was able to measure the beam position through an angle of 30°. When measuring the residual vibration, the error due to misalignment caused by measuring the rotational vibration using a linear scale is less than 0.001 in. for vibrations with 0.250 in. amplitude. All maneuvers use trapezoidal velocity profiles to avoid saturating the control signal. In the configuration shown, the rotary table has a velocity limit of 10 rad./sec. and an acceleration limit of 15 rad./sec./sec.

Figure 42:
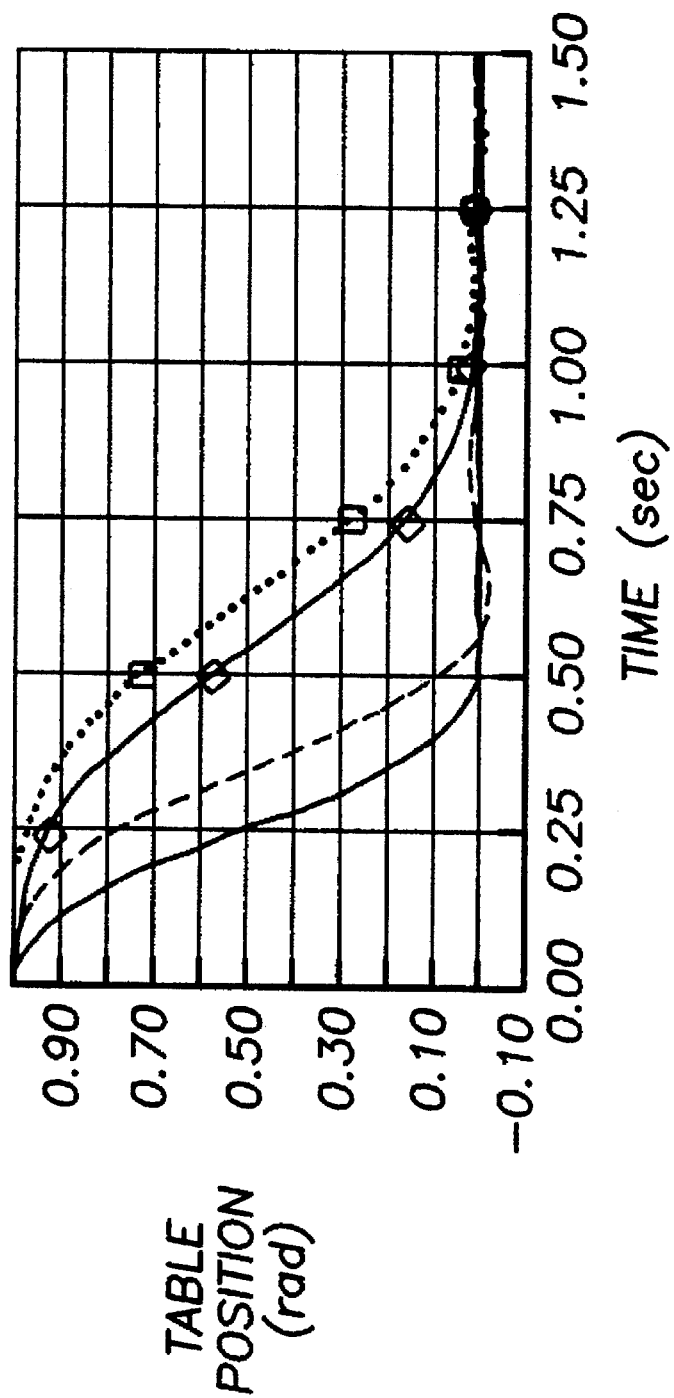
FIGS. 42, 43, 44 and 45 graph table position as a function of time for various inputs.

Tests were performed on the rotary table as shown in FIG. 41. Two different shaping sequences were compared with an unshaped maneuver. First, two five-impulse digital sequences were used, one for the 2.34 Hz. and 0.10 damping ratio mode and one for the 3.90 Hz. and 0.01 damping ratio mode. Second, one nine-impulse digital sequence for both modes was used. All sequences were calculated using the exact, digital solution method described above. FIG. 42 shows the position command and the encoder position for both the unshaped and the nine-impulse sequence shaped maneuvers from 1.0 rad. to 0.0 rad. Notice that only the 2.34 Hz. mode is visible at the encoder.

Theoretically, the two different shaping sequences should produce similar results. There are two differences that may make the nine-impulse digital sequence better than the two five-impulse digital sequences. First, the nine-impulse digital sequence is 0.644 sec. long, while the two five-impulse digital sequences take 0.692 sec., a difference of 7.5%. Second, when convolved together, the two five-impulse digital sequences result in one twenty-five impulse sequence; implementing twenty-five impulses is much more computationally intensive than is implementing one nine-impulse digital sequence.

Figure 43:
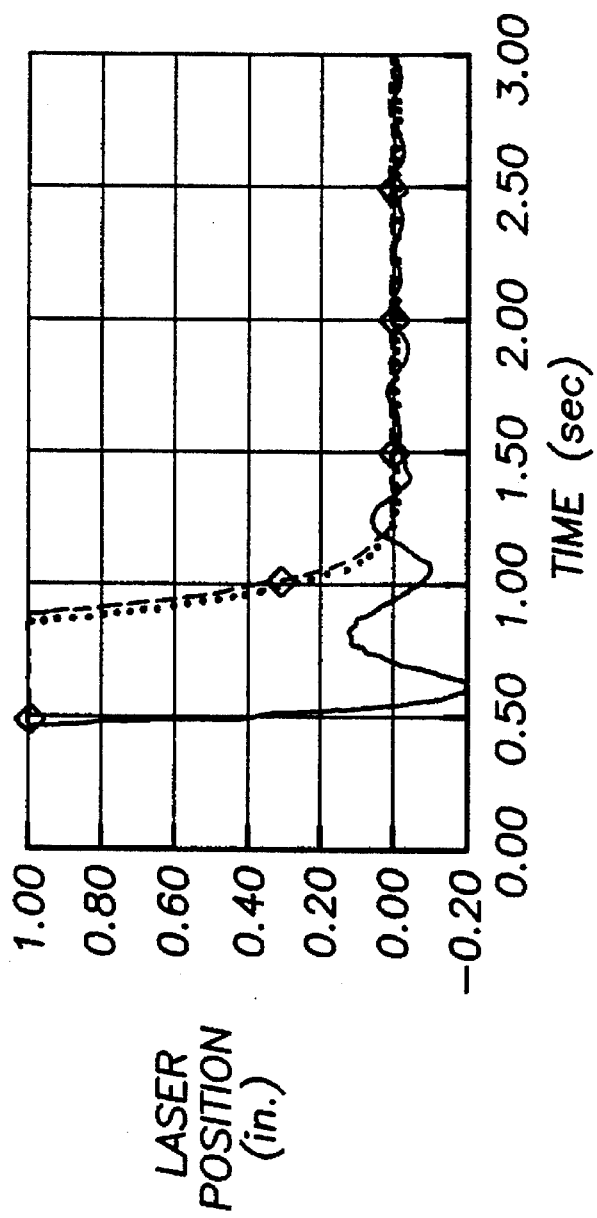
Figure 44:
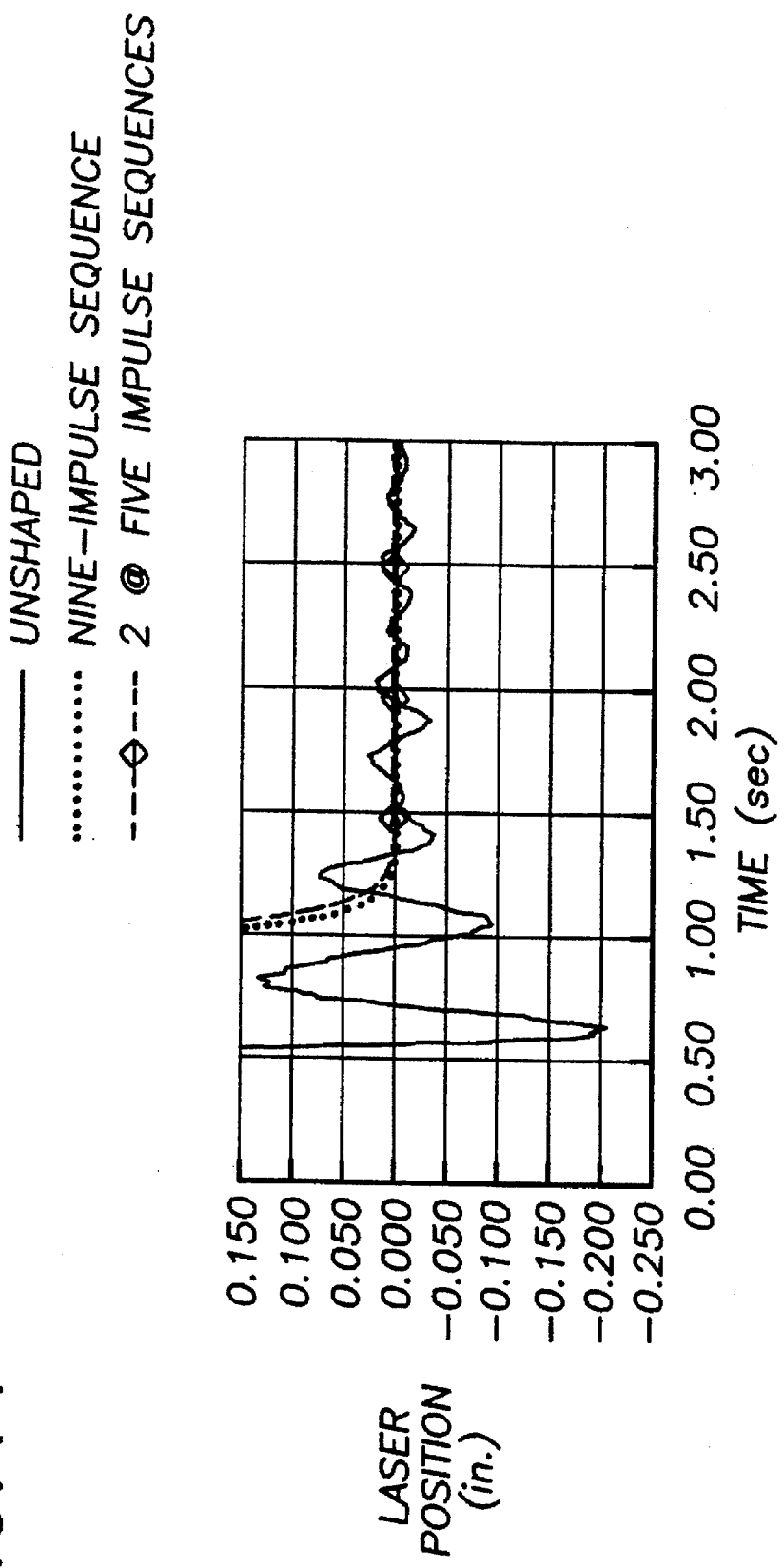
Figure 45:
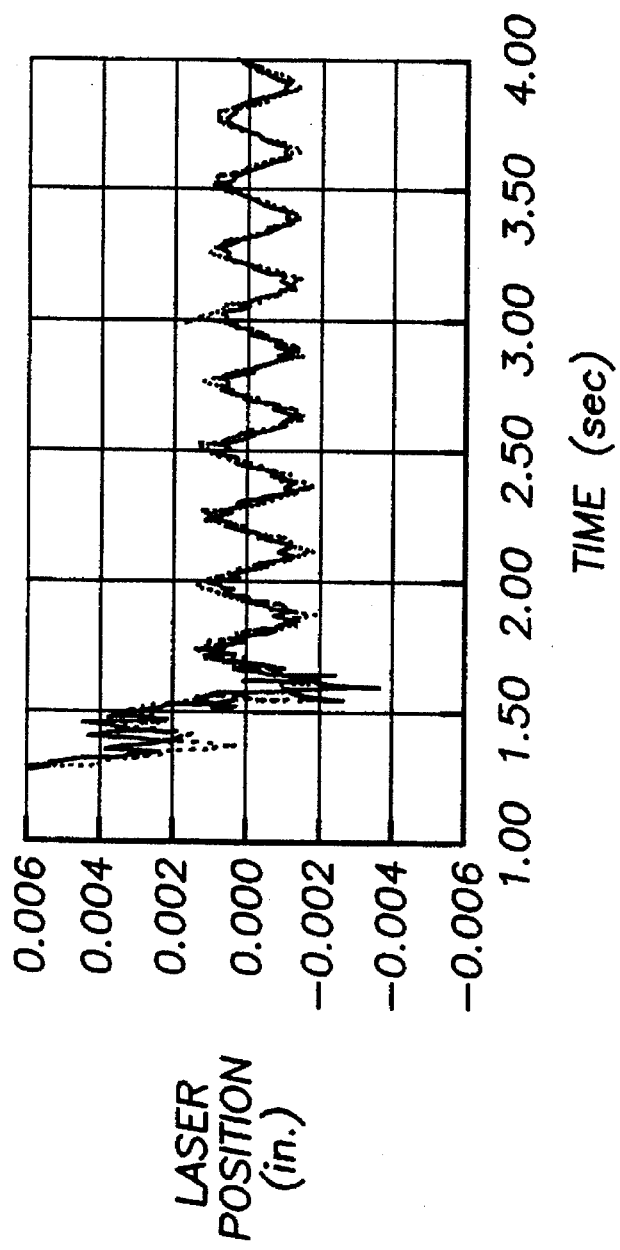

FIGS. 43–45 show the laser measurement for the same maneuver from 1.0 rad. to 0.0 rad. The beam enters the range of the laser at 1.00 in. FIG. 43 shows the entire move; FIG. 44 shows the residual vibration of both the shaped and unshaped maneuvers; and FIG. 45 shows a close up of the residual vibration of the two shaped maneuvers. Table 10 shows a comparison of the vibration reduction achieved by the different shaping sequences. The percentages are calculated from the average of four maneuvers with each shaping sequence (or unshaped maneuvers). A 1024 point FFT is performed on the residual vibration and the magnitude of the FFT at the vibrational frequencies is measured.

TABLE 10

Comparison of Vibration Reduction for Nine-Impulse Digital Sequences and 2 @ Five-Impulse Digital Sequences.

| Type of Sequence | Sequence Length (sec.) | 2.34 Hz. Vibration (% of Unshaped) | 3.90 Hz. Vibration (% of Unshaped) |
|---|---|---|---|
| Unshaped | 0.000 | 100.00 | 100.00 |
| Nine-Impulse Digital Sequence | 0.644 | 0.40 | 7.71 |
| 2 @ Five-Impulse Digital Sequences | 0.692 | 0.37 | 7.26 |

Input Shaping™ for Trajectory Following

Introduction

The effectiveness of Input Shaping™ for reducing residual vibration in point-to-point motions has been well established. However, very little work has been done to determine how Input Shaping™ effects trajectory following. Experiments in [Drapeau V.; Wang, D. "Verification of a Closed-loop Shaped-input Controller for a Five-bar-linkage Manipulator," 1993 *IEEE Transactions on Robotics and Automation*] show a five-bar-linkage manipulator follows a clover pattern better with shaping than without. The shaping process alters the desired trajectory, so it is often assumed that Input Shaping™ will degrade trajectory following. While this may be true for temporal trajectories, trajectories where the location as a function of time is important, this section will show it is untrue for spatial trajectories, where only the shape of the move is important. Spatial trajectories compose a large percentage of the trajectory following applications including cutting, scanning, welding, machining and measuring.

One major reason the effects of Input Shaping™ on trajectory following have not been rigorously investigated is due to the difficulty in measuring the deviation from a desired trajectory. For this reason we studied a simple two-mode system and gave it uncomplicated, yet representative trajectories to follow.

Figure 46:
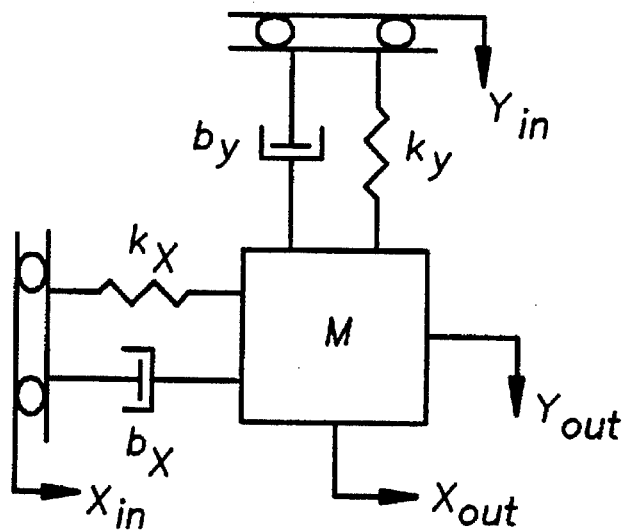
FIG. 46 illustrates a two-mode model for a flexible system under PD control.

Our model, shown in FIG. 46, represents a system with two orthogonal modes under PD control. The flexibility and damping of the controller and structure have been lumped together into a single spring and damper for each mode. The inputs to the system are x and y position commands. This model is very representative of gantry robots, coordinate measuring machines, and XY stages with flexible structures mounted to them.

The following describes how Input Shaping™ affects the response to circular and square trajectory input, presents two simple methods for altering the unshaped command to better utilize Input Shaping™, and presents experimental results.

Circular Trajectories

The response of the model shown in FIG. 46 to unshaped and shaped unit-circle inputs was simulated in MATLAB. The unshaped response is a function of commanded speed around the circle, frequency ratio (r=high frequency/low frequency), damping, and the initial departure angle relative to the lowest mode (for this section the low mode will always be in the x direction). The response to shaped unit-circle inputs is a function of the above variables and the type of input shaper selected.

Figure 47:
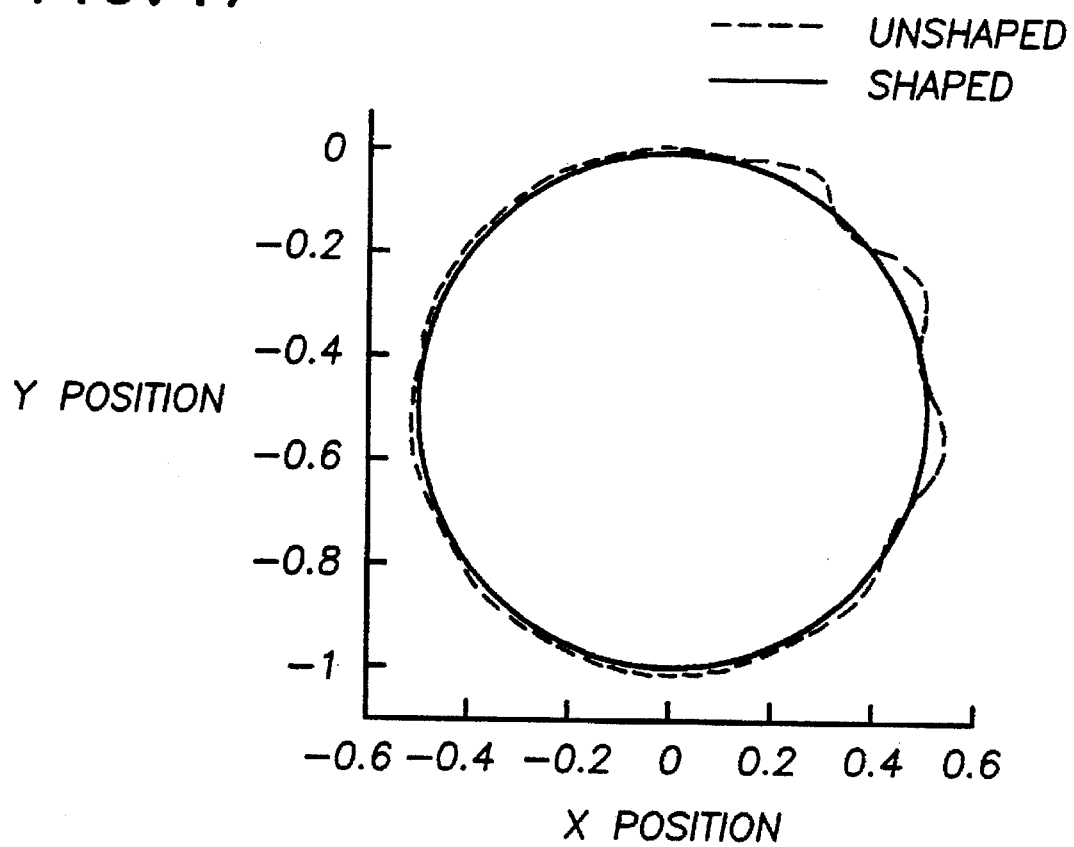
FIG. 47 graphs the trajectories resulting from an unshaped and a shaped input.

FIG. 47 compares the unshaped and ZVD shaped responses for the case where the frequencies are $f_1=f_2=1$ Hz, the damping ratios are $\zeta_1=\zeta_2=0.05$, and the unit-circle command has a duration of 10 seconds. The circle is initiated in the +x direction at location (0.0). By examining FIG. 47 we can say, qualitatively, that the shaped response is closer to the desired trajectory than the unshaped.

Figure 48:
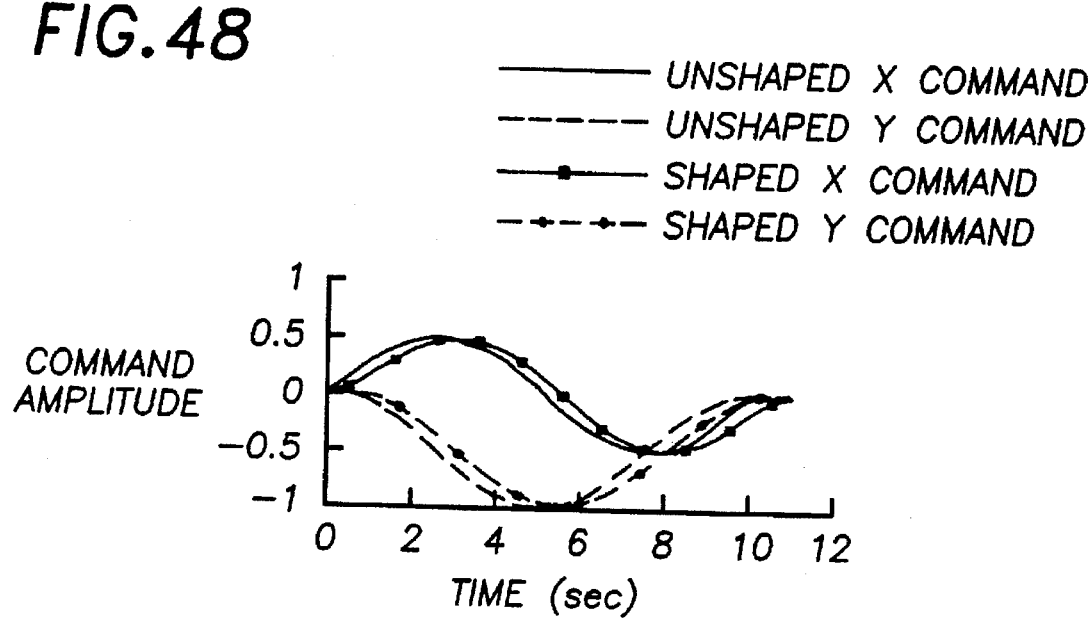
FIG. 48 graphs the command amplitude versus time for four different commands.

We can also compare the responses quantitatively by examining the maximum and minimum values of the response radius, the envelope enclosing the radius, as well as, calculating the mean and standard deviation of the radius. This comparison is shown in Table 11 along with the performance measures for the desired unit-circle response. The shaped response is substantially closer to the desired performance measures in every category except mean value. The mean value results are understandable because the unshaped response oscillates about the desired radius, while the shaped response tracks almost the entire circle with a nearly constant, but slightly smaller than desired radius. Input Shaping™ leads to a smaller than commanded radius because the convolution process yields inputs that lag the unshaped inputs. This can be seen in FIG. 48 where shaped and unshaped command signals are compared.

TABLE 11

Performance Measures for an Unshaped, ZVD Shaped, and Desired Unit Circle Response.

| Radius of Response | Unshaped | ZVD Shaped | Desired |
|---|---|---|---|
| Maximum | 0.5313 | 0.5000 | 0.5000 |
| Minimum | 0.4804 | 0.4927 | 0.5000 |
| Envelope | 0.0509 | 0.0073 | 0 |
| Mean | 0.3052 | 0.4935 | 0.5000 |
| Std | 0.0091 | 0.0020 | 0 |

Input Shaping™ improves circular trajectory following over a large range of $\zeta$, r ($f_2/f_1$), and command speed. To display this data, we combine $f_1$ and the command speed into one unit called vibration cycles/circle. This measure tells us how fast the system is commanded relative to its natural frequency. In the above example, the command speed was 10 cycles/circle because the frequency was 1 Hz and the desired input lasted for 10 seconds. As this measure is decreased, the system is required to move more rapidly, so performance is poor for low values of cycles/circle. When our two-mode model has different frequencies in the x and y directions, the cycles/circle will be measured relative to the low mode.

Figure 49:
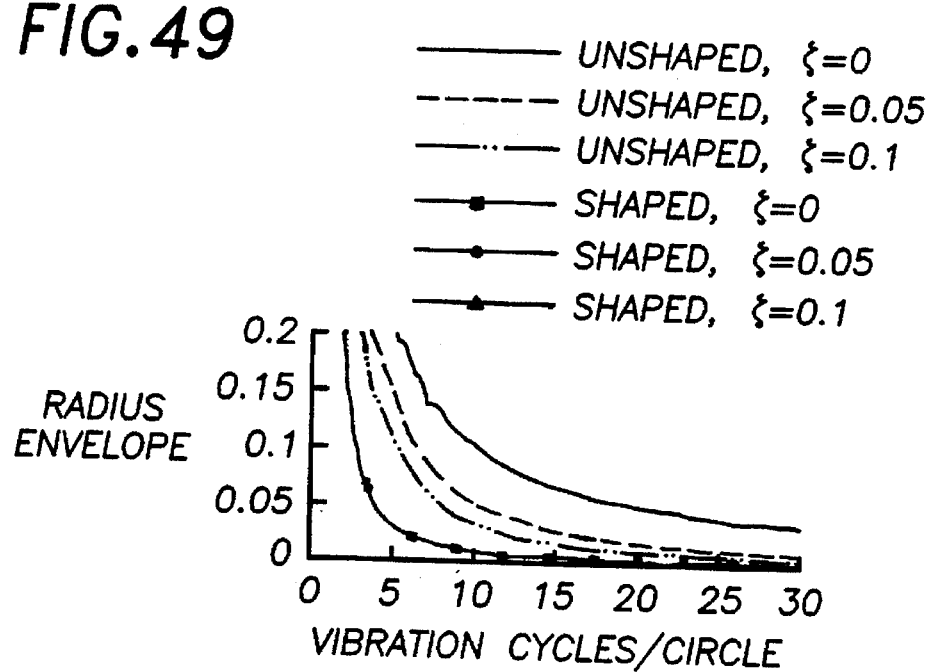
FIG. 49 graphs radius envelope versus vibration for different inputs and damping coefficients.

FIG. 49 compares the ZVD shaped and unshaped radius envelope (maximum radius–minimum radius) as a function of cycles/circle and $\zeta$ for the case of r=1. For every command speed and damping ratio, the envelope on the shaped response is smaller than that for the unshaped response. Furthermore, the performance is no longer a function of $\zeta$ when Input Shaping™ is used because there is no vibration to damp out.

The results shown in FIG. 49 are only for the specific case where r=1. For all values of r, the benefit from shaping is greatest in cases with low damping. As damping is increased the performance of the unshaped response approaches the shaped performance. When r differs from 1, the input shaper needed to eliminate the two modes will be longer than the shaper for r=1 (provided the same type of input shaper is used). The longer the shaper, the more the shaped command lags the unshaped and, therefore, the greater the deviation from the desired radius. The increase in shaper length is significant for $1.3 \leq r \leq 2.5$. When $r \leq 1.3$, a single mode EI shaper can be used effectively to cancel both modes. For $r \geq 2.5$, the shaper length will be only slightly longer than for r=1.

For all of the results presented so far, the unit circle command has been initiated in the +x direction, which is parallel to the low mode of our model. If the angle of departure is varied relative to the +x direction, the trajectory following performance will also vary. The performance measures repeat every 180° of departure angle, so we will present results that span from −90° to +90° relative to the +x direction, that is, from the −y direction to the +y direction.

Figure 50:
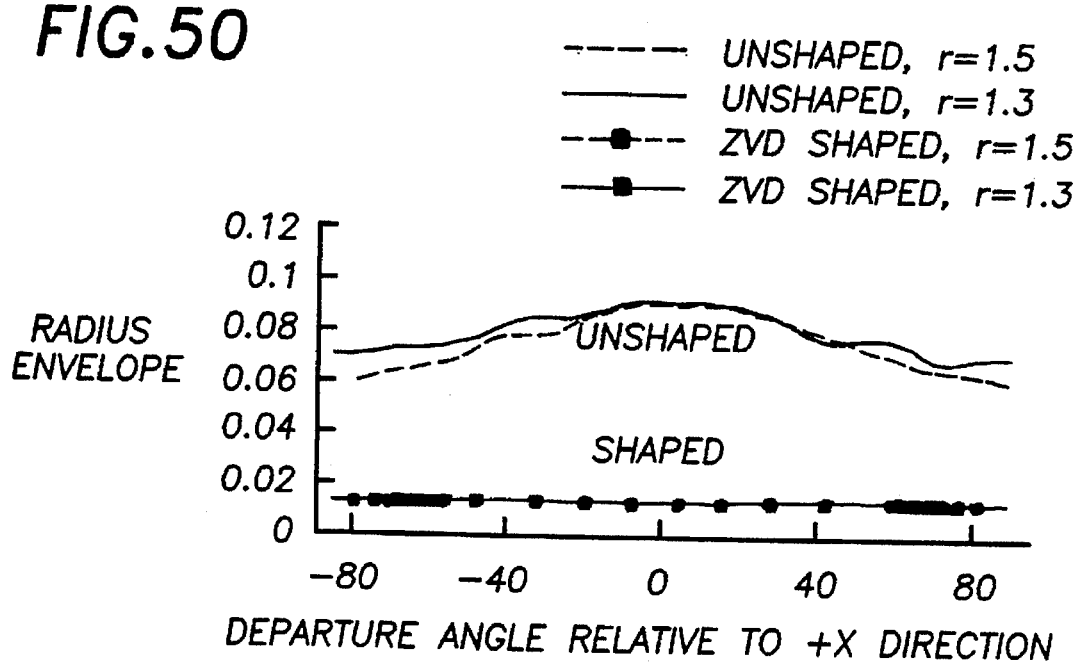
FIG. 50 graphs radius envelope versus departure angle for various inputs.

FIG. 50 shows the unshaped and ZVD shaped radius envelope (max radius−min radius) for the cases of 11 cycles/circle, $\zeta_1=\zeta_2=0$, and r=1.5, 1.3. For every value of the departure angle, the envelope with shaping is at least four times smaller than without shaping. FIG. 50 also reveals that it is a poor idea to start the circle in the direction of the low mode when shaping is not used. This makes sense, as the start-up transient excites the low mode instead of the high mode. When shaping is used, it makes little difference what departure angle is used to commence the circular trajectory. It is interesting to note that for the case of r=1.3, the best departure angle is not parallel to the high mode, rather at an angle of +70° relative to the x direction. This phenomenon only occurs with low (r<1.5) frequency ratios; for larger r values, the best performance without shaping occurs when the circle is initiated parallel to the high mode. These results indicate that an optimal departure angle exists for tracing out a circular (or, nearly circular, such as oval) trajectories. This optimal departure angle can be found by varying the angle and measuring the performance, as was done to make FIG. 50. Or, for r>1.5, the departure angle should be chosen perpendicular to the low mode of vibration.

When errors exist in the system model, Input Shaping™ remains effective for controlling residual vibration. For point-to-point motions, a shaper's performance in the presence of modeling errors is evaluated by its sensitivity curve. However, for trajectory following we are not concerned with residual vibration, rather we are concerned with deviation from the desired trajectory. To evaluate shaping circular trajectories in the presence of modeling errors, we plot the trajectory performance measures over a range of frequencies. By doing this we can determine how modeling errors effect performance.

Figure 51:
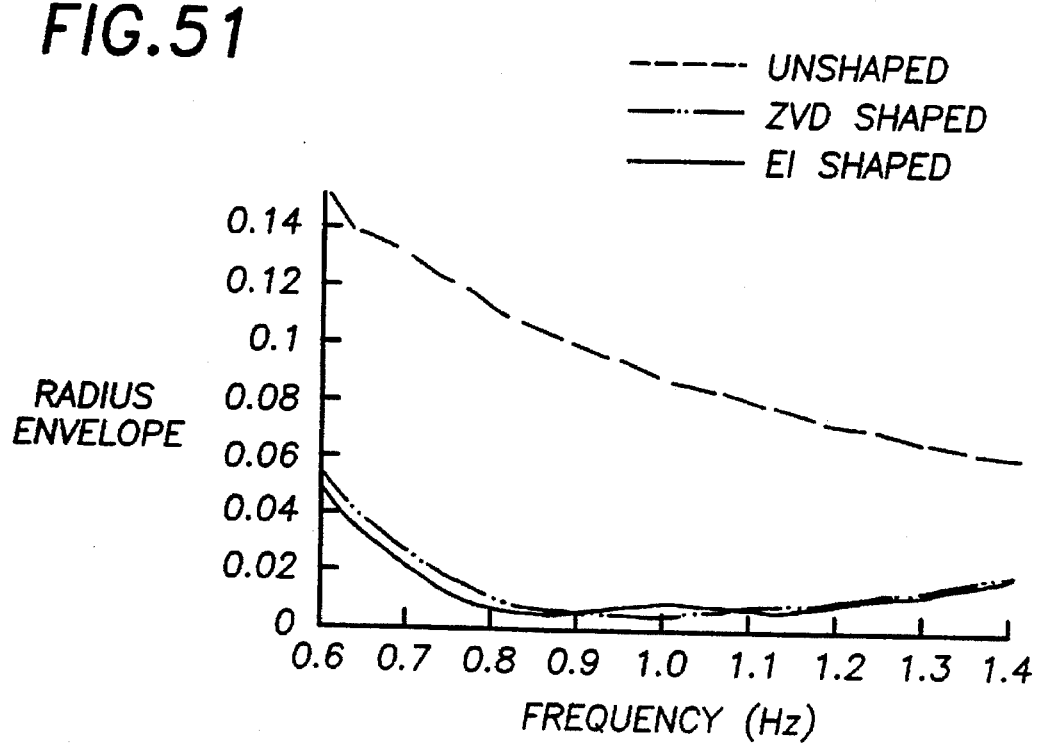
FIG. 51 graphs radius envelope versus frequency for various inputs.

Unshaped and shaped inputs were designed for the case of $f_1=1$ Hz, r=1, $\zeta_1=\zeta_2=0$, and cycles/circle=11. FIG. 51 shows the response radius envelope for these inputs over the range of $0.6 \leq f_1 \leq 1.4$ Hz. FIG. 51 shows that when the actual frequency deviates 40% from the modeling frequency, the performance with shaping is still at least three times better than without shaping. If we were to compare the circular trajectory sensitivity curve of FIG. 51 with the residual vibration sensitivity curve used to evaluate a point-to-point motion, we would see a similarity; the ZVD shaper performs better than the EI shaper at frequencies very close to the modeling frequency, but the EI shaper is better over a large range of frequencies.

Square Trajectories

The results from our simulations with circular trajectories indicate Input Shaping™ is usually beneficial for following smooth spatial trajectories. The question of how shaping works with trajectories containing rapid directional changes remains unanswered. For this reason, we simulated the response of our model to square trajectory commands.

Figure 52:
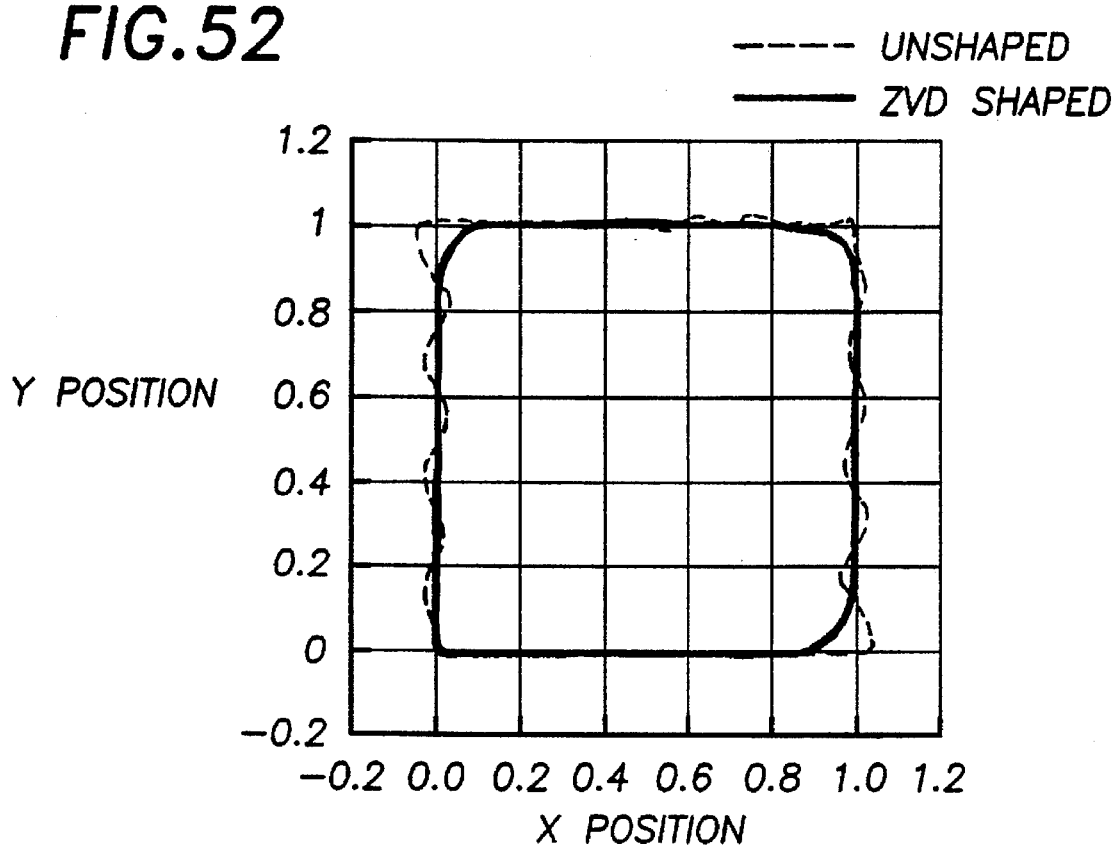
FIG. 52 graphs the trajectories resulting from an unshaped and a shaped input.

FIG. 52 compares the unshaped and ZVD shaped responses for the case of r=1.5, $\zeta_1=\zeta_2=0.05$, and cycles/square=15. The square is initiated in the +x direction at location (0,0). FIG. 52 reveals that the response with shaping is much closer to a square than the unshaped response. To compare the results quantitatively, we calculated the distance from the response position to the desired square at each time step of the simulation. Table 12 compares the maximum, mean, and standard deviation of the square tracking error for the shaped and unshaped cases. The shaped response error has a much lower mean and standard deviation, however, the maximum deviation is 90% of the unshaped value. The maximum shaped response errors occur at the corners of the square, which are rounded by the shaping process.

TABLE 12

Performance Measures for an Unshaped, ZVD Shaped, and Desired Unit-Square Response.

| Tracking Error | Unshaped | ZVD Shaped | Desired |
|---|---|---|---|
| Maximum | 0.0461 | 0.0413 | 0 |
| Mean | 0.0106 | 0.0034 | 0 |
| Std | 0.0113 | 0.0083 | 0 |

Figure 53:
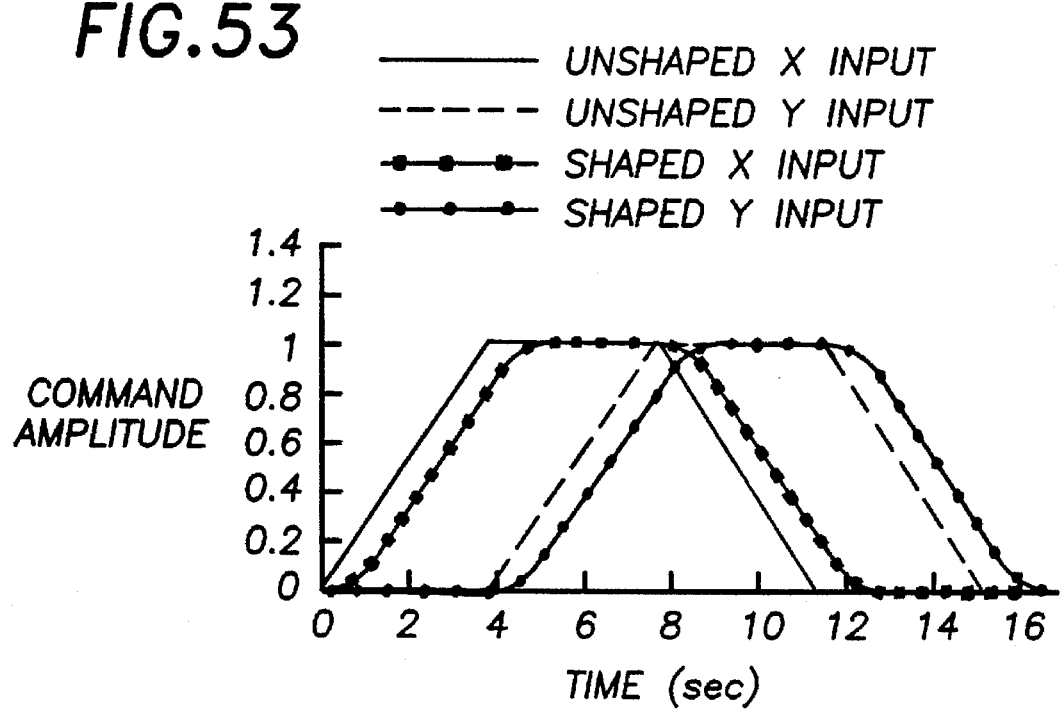
FIG. 53 graphs the command amplitude versus time for various inputs.

The source of the rounded corners can be discovered by examining the command profiles shown in FIG. 53. For the unshaped input, the x and y commands are never changing at the same time; plotting the y command versus the x command would give us a perfectly square shape. However, the shaped inputs are extended by the convolution process. There are now small periods of time when the x and y commands are changing simultaneously. Plotting the shaped y command versus the shaped x command would give a square with rounded corners, similar to the response shown in FIG. 52.

Figure 54:
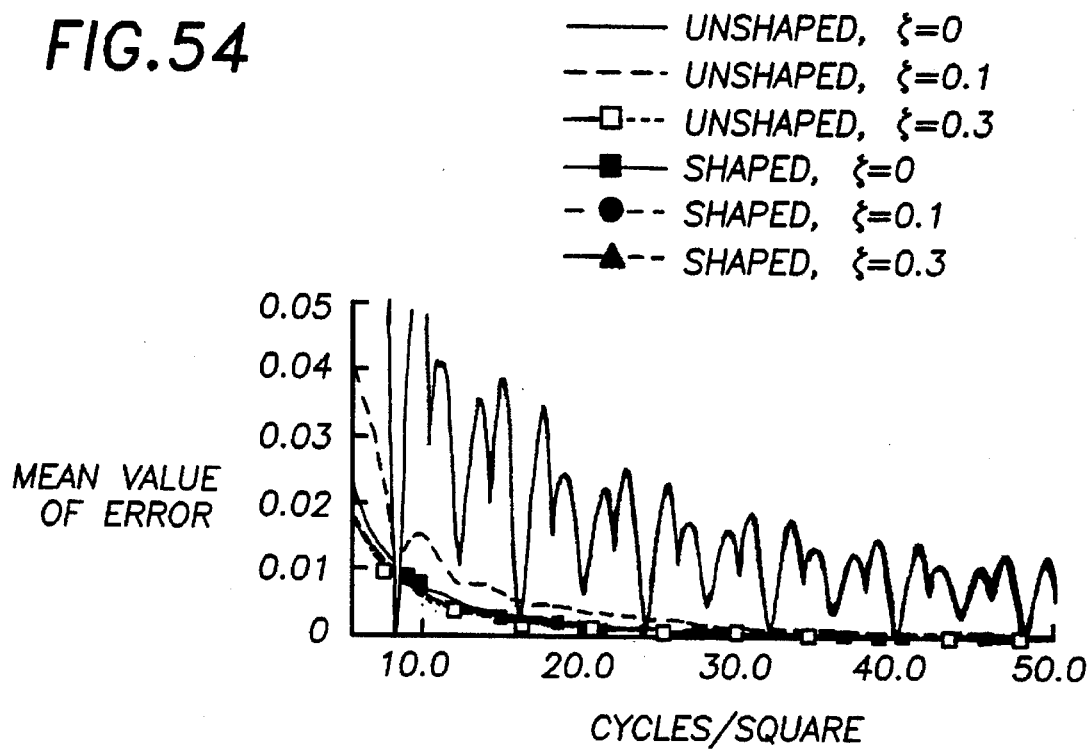
FIG. 54 graphs mean error versus cycles per square for various input and damping coefficients.

FIG. 54 compares the ZVD shaped and unshaped mean tracking error as a function of cycles/square and $\zeta$ for the case of r=1.5. The performance increase from Input Shaping™ is most significant at low damping values. If the system has a high damping ratio, the unshaped tracking error can be smaller than the shaped.

Figure 55:
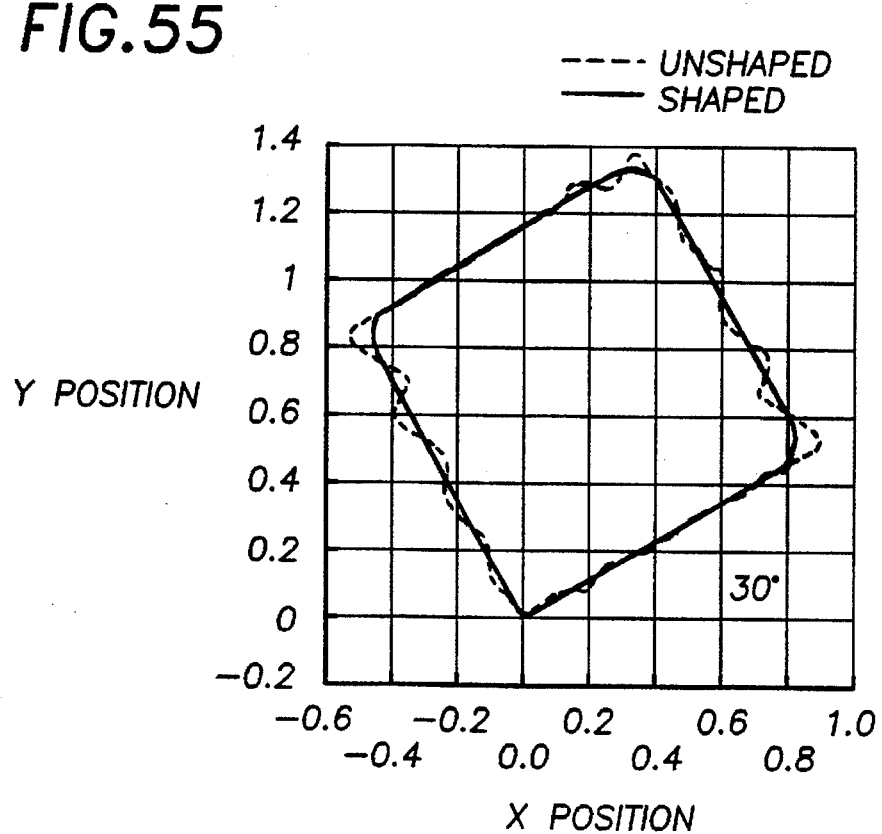
FIG. 55 graphs the trajectories resulting from an unshaped and a shaped input for a departure angle of thirty degrees.

The results so far have been for cases when the square is initiated in the +x direction, parallel to the low mode. If the initial angle of departure is varied relative to the +x direction, the trajectory following performance will also vary, just as it did for the circular trajectories. FIG. 55 shows the unshaped and ZVD shaped responses for our previous example (r=1.5, $\zeta_1=\zeta_2=0.05$, and cycles/square=15) when the departure angle is +30° relative to the low mode. Unlike the case when the departure angle is parallel to the low mode, vibration is now visible along the first side of the square.

Figure 56:
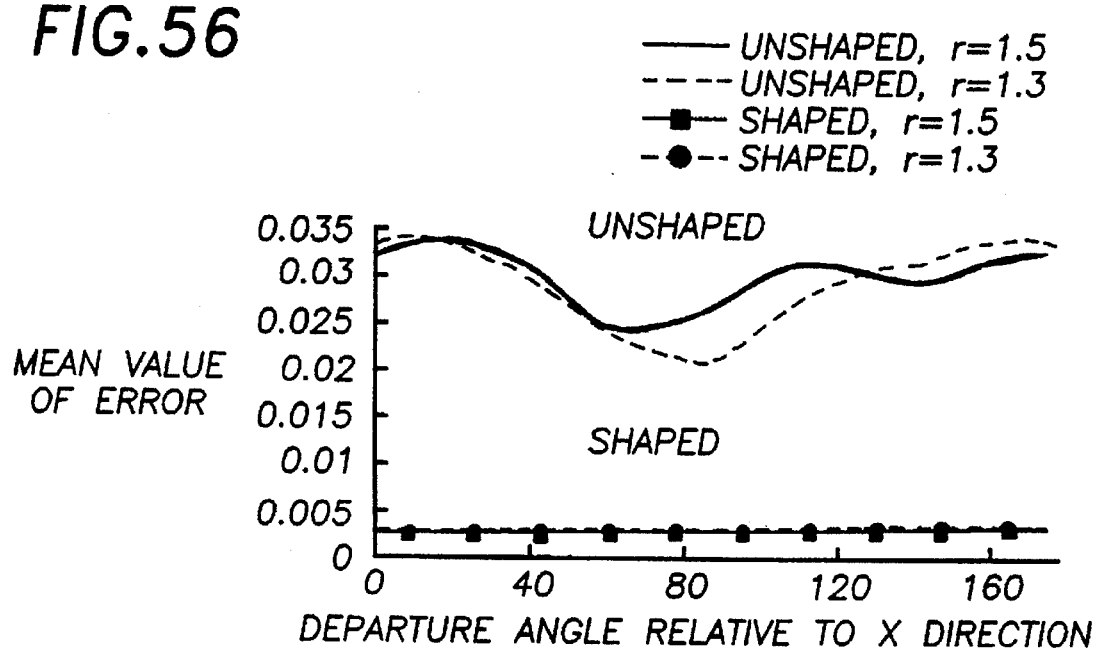
FIG. 56 graphs mean error versus departure angle for various inputs.

The trajectory following performance measures repeat every 180° of departure angle, so we will present results that span from 0° to +180° relative to the x direction. FIG. 56 shows the unshaped and ZVD shaped mean tracking error for the cases of r=1.5 and 1.3, $\zeta_1=\zeta_2=0$, and cycles/square= 17. FIG. 56 reveals an important difference between circular and square trajectories: when shaping is not used, performance is improved when the square is initiated parallel to the low mode. This is because vibration does not show up on the first side of the square when it is initiated parallel to the low mode.

Figure 57:
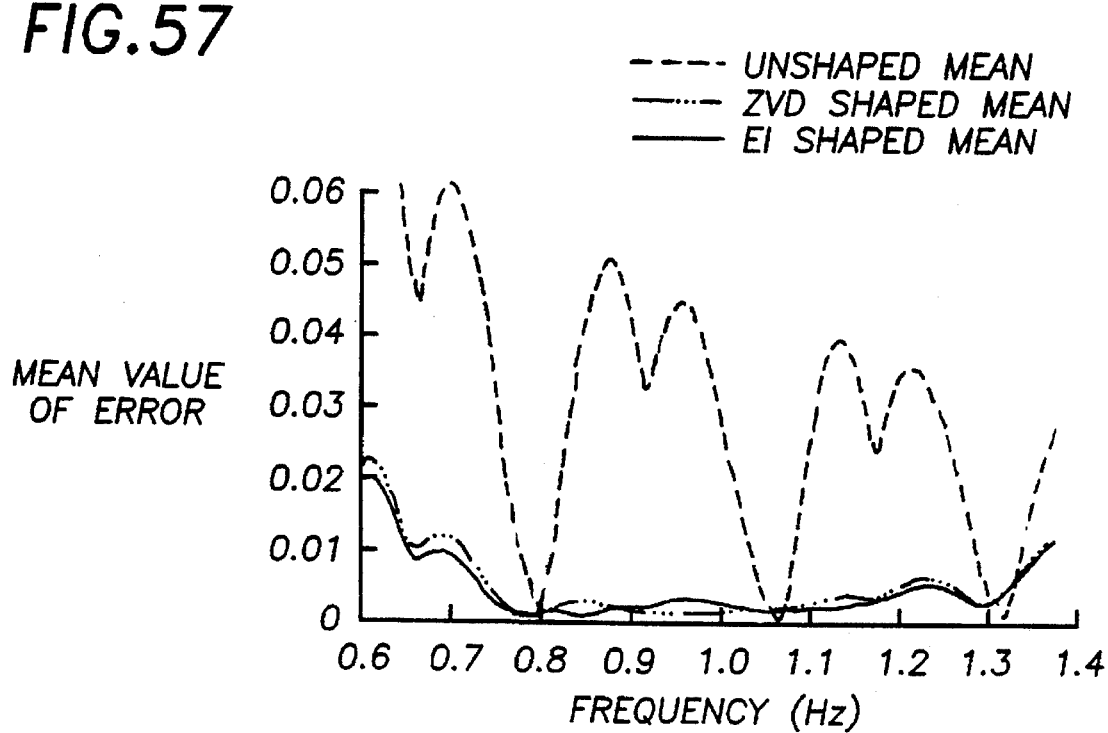
FIG. 57 graphs mean error versus frequency for various inputs.

The square tracking performance will vary with modeling errors just as did the circular tracking performance. Unshaped and shaped inputs were designed for the case of $f_1=1$ Hz, r=1, $\zeta_1=\zeta_2=0$, and cycles/square=15. FIG. 57 shows the mean of the square tracking error to these inputs over the range of $0.6 \leq f_1 \leq 1.4$ Hz. FIG. 57 shows that the square tracking performance with shaping is very insensitive to modeling errors. We also see, once again, that the EI shaper is somewhat better than the ZVD shaper over a large range of frequencies.

Improving Shaped Circular Responses

Our simulation results indicate that Input Shaping™ is a benefit to trajectory following in most cases, however, the shaped responses are never exactly the desired. The major problem with shaped circular trajectories is the smaller-than-desired radius around most of the circle. We can reduce this problem by using an unshaped circle command that has a radius larger than desired.

If the radius is chosen correctly, the shaped response will track very closely the correct radius at all times except the initial and final L seconds (the length of the shaper). If the application for trajectory following contains a process that can be turned on and off, such as painting or cutting, then the transient deviation from the desired radius can also be eliminated by sending the shaper an unshaped circular command that has a length of:

$$CC*T+L \qquad (2)$$

where, CC is the desired cycles/circle for the low mode, T is the period of the low mode, and L is the shaper length. The shaped command is initiated, then after L seconds the process is started. At L seconds from the end of the shaped command, the process is stopped. For r=1, this procedure yields a circular response during the process. For r≠1 there will exist a small oscillation in the radius during the process-on portion of the trajectory. However, when this oscillation is centered around the desired radius by commanding an overvalued unshaped radius, the trajectory following performance is far superior to the unshaped response.

Figure 58:
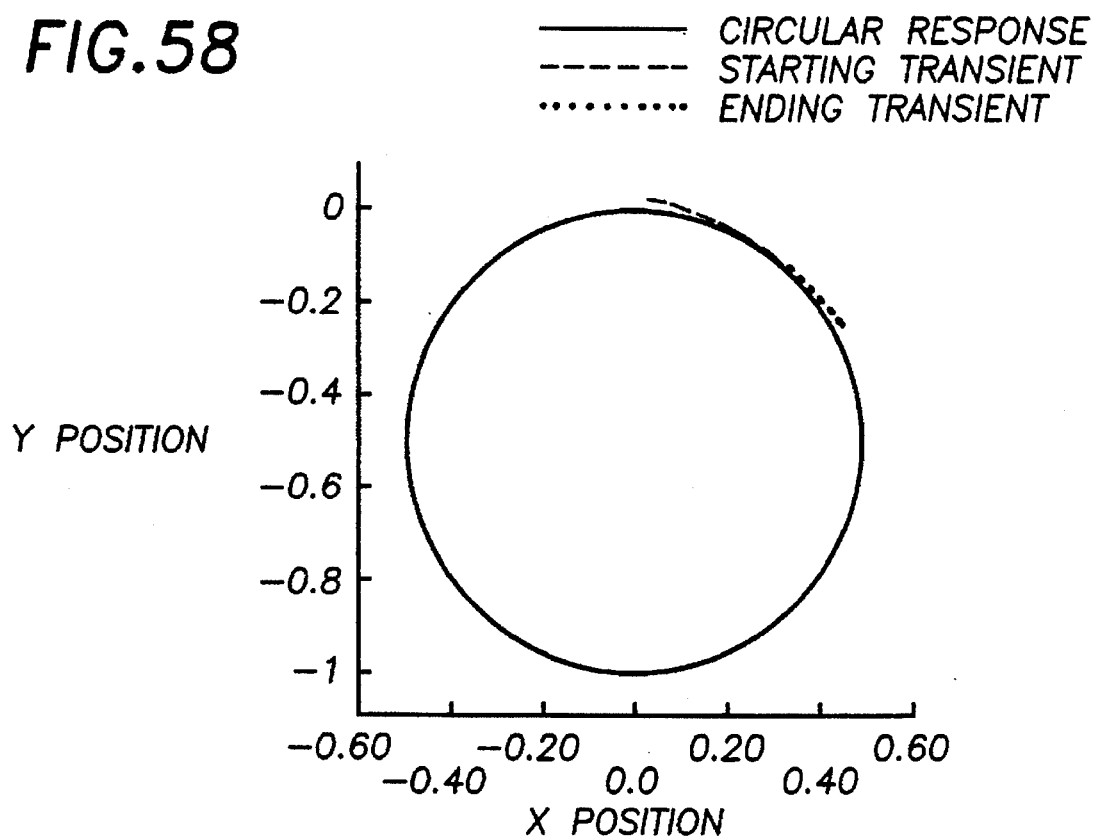
FIG. 58 graphs the trajectory resulting from using a shaped input designed for a circle of increased radius and allowing for transients.

FIG. 58 shows the shaped response to a circular command with a commanded radius of 0.521. During the initial and final L seconds of the response (shown dashed), the radius is slightly larger than desired. However, during the 360° between the transient regions, the response is a circle with the desired radius of 0.5.

Improving Shaped Square Responses

The major problem with the shaped response to square inputs was the rounding of the corners. As mentioned previously, the rounding is caused by simultaneous changes in the x and y shaped command signal. To eliminate the rounding, we use a system command signal that has no overlap in its shaped x and y components. The requisite unshaped command signal has a delay equal to one shaper length at each of the three corners during the trajectory (the fourth corner of the square does not have to be navigated to complete the square).

For a departure angle of 0°, this procedure results in an exact square response. When the departure angle is not zero and r≠1, a small amount of deviation from a square will result.

Figure 59:
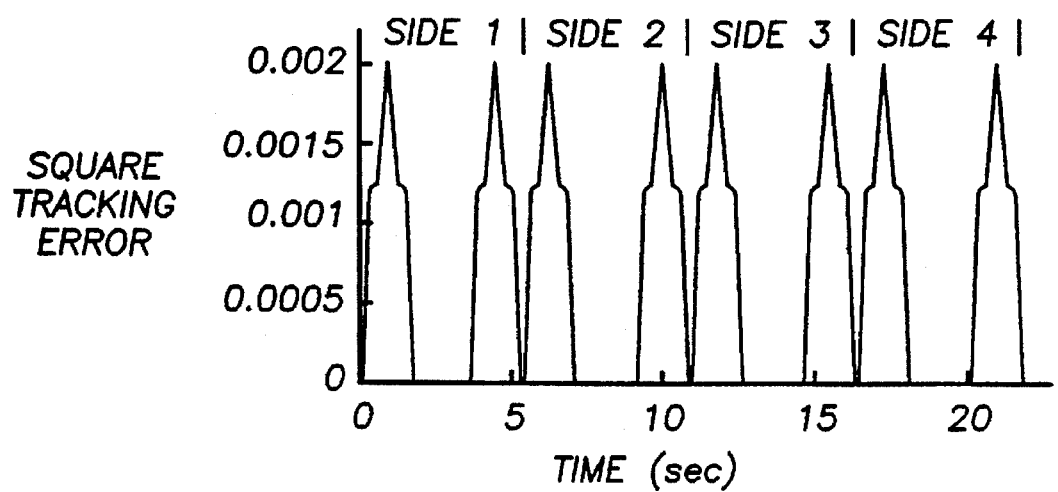
FIG. 59 graphs tracking error versus time for a shaped input used to trace a square.

The deviation does not occur at the corners, rather during the acceleration and deceleration portion of each side. This is because there is flexibility of two different frequencies occurring during these transients. FIG. 59 shows this small level of square tracking error for the case of r=1.5, $\zeta_1=\zeta_2=0$, cycles/square=15, and departure angle equals 30°. Note: the corresponding unshaped errors are over 60 times larger.

Experimental Results

Figure 60:
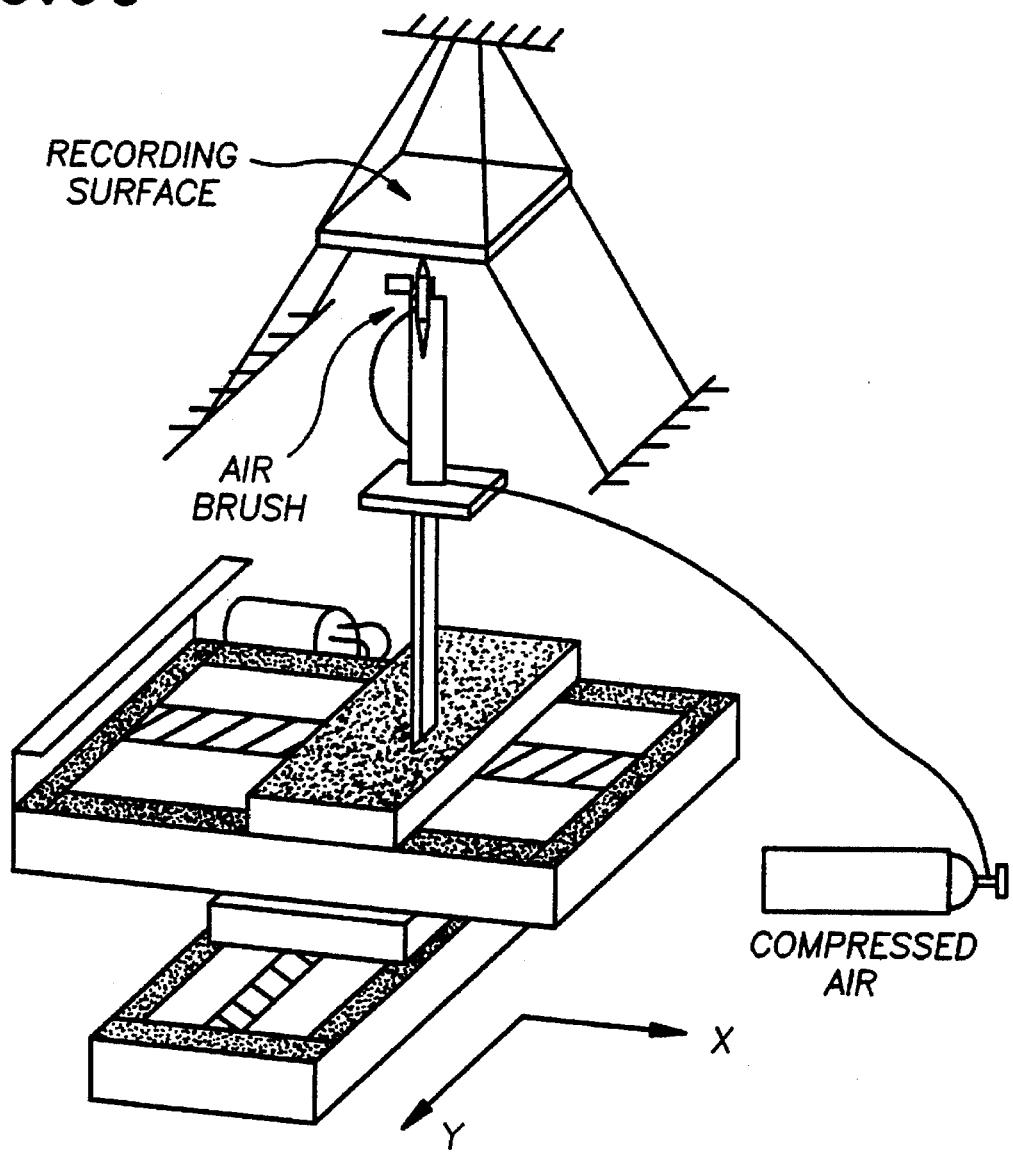
FIG. 60 illustrates a device used to record different trajectories.

To test our theoretical results, a flexible structure with orthogonal decoupled modes was constructed by mounting a two-stage beam vertically to an Aerotech XY stage moving in a horizontal plane as shown in FIG. 60. The first section of the beam consisted of a 6×1.25×1/8 in. steel beam mounted with its flexibility parallel to the x direction. The second section was a 12×1×1/8 in. steel beam attached to the end of the first section, but mounted with its flexibility in the y direction. The XY stage was driven by Aerotech DS16020 amplifiers. The command signal was sent to the amplifiers by a Macintosh Quadra 700 running a PD controller at 500 Hz.

To record endpoint position, a Paasche compressed-air paint brush was mounted vertically to the end of the flexible structure. A flat plane with recording paper attached was suspended above the airbrush. The air flow valve on the paint brush was fixed open so that the flow of paint could be controlled by a remote valve. The system had uncoupled modes at 4.9 Hz and 7.4 Hz, for a frequency ratio of 1.5.

Figure 61:
FIG. 61 illustrates the trajectory produced by an unshaped input.
Figure 62:
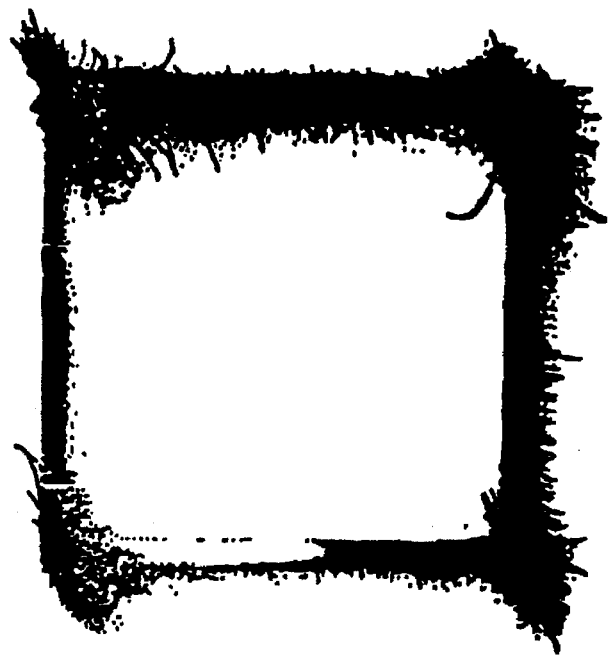
FIG. 62 illustrates the trajectory produced by a shaped input.

Experiments were conducted by turning on the flow of air to the brush, commencing the desired trajectory, shutting off the flow of air at the end of the move, and then changing the recording paper. FIG. 61 shows the recorded trajectory when a 3×3 in. unshaped square with delays equal to the length of a ZVD shaper at each corner was commanded. Delays were added at each corner so that the total move length would be equal to the corresponding shaped move. The inexact nature of the paint control is revealed as excess paint at the start of the trajectory (the upper left hand corner). The air brush is not designed to operate vertically, so the splattering of paint is greater than normal and leads to ragged edges of the trajectory. FIG. 62 shows the response for a 3×3 in. EI shaped square. The trajectory following ability of the system was clearly improved with Input Shaping™.

Figure 63:
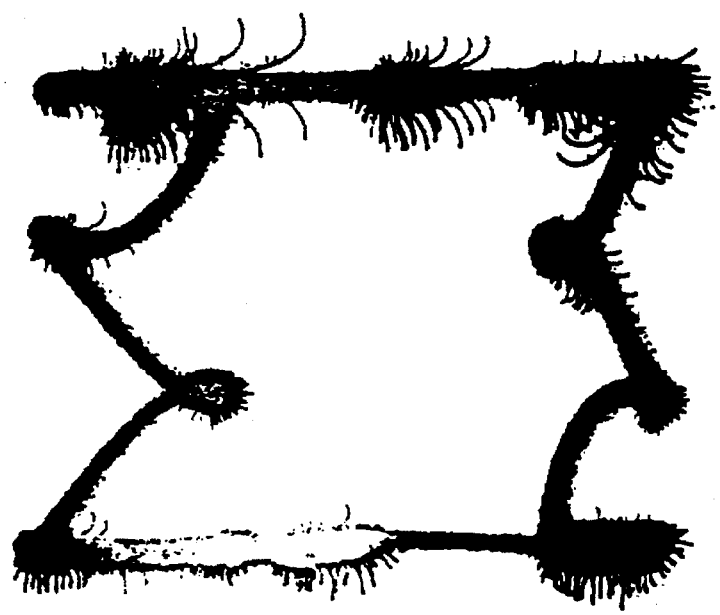
FIG. 63 illustrates the trajectory produced by an unshaped input when an endpoint mass is added to the device of FIG. 60.
Figure 64:
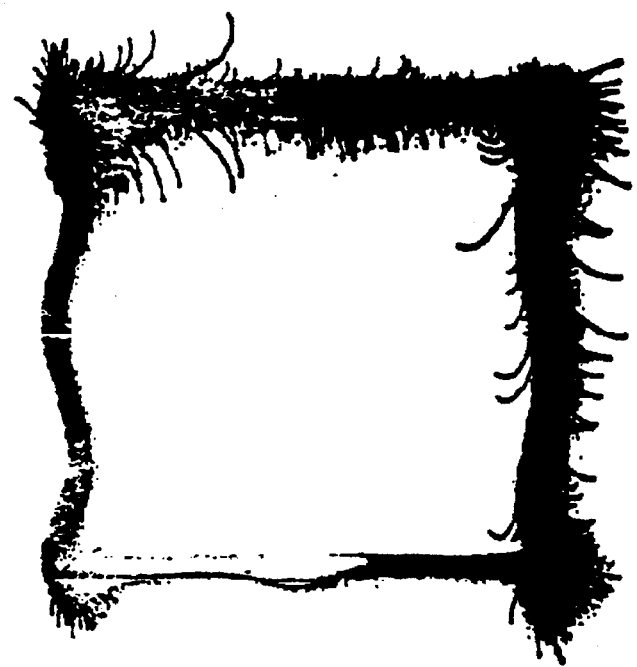
FIG. 64 illustrates the trajectory produced by a shaped input when an endpoint mass is added to the device of FIG. 60.

To test the effectiveness of Input Shaping™ in the presence of modeling errors, additional mass was added to the endpoint. The frequencies were lowered to 3.0 Hz and 5.0 Hz, changes of 40% and 32%, respectively. The unshaped response is shown in FIG. 63. The vibration amplitude is noticeably larger with the additional mass. The response with the same EI shaper designed for the original system is shown in FIG. 64. Even with very large modeling errors, the shaped response is closer to a square than the original unshaped response.

Using Different Shapers for Each Axis of Motion

In the previous discussion on Input Shaping™ for trajectory following, it was assumed that the same input shaper was used for each axis, i.e., the x direction command used the same shaper as the y direction command. If trajectory following is not important, then a multi-axis move can be shaper with different shapers for each axis. Each axis can use a shaper designed for only the frequencies that are problematic for that axis. If shaping is implemented in this manner, then move times can be decreased because the shapers for each axis will be shorter in length than the a shaper designed for all modes at once.

Reduction of Vibration During Scanning

The trajectory results shown in the previous section demonstrate that vibration is reduced during a move as well as after the completion of the move. Therefore, more consistent trajectories can be commanded using the shaping methods presented above. In many industrial processes, measurements need to be taken during the move phase. Vibrations induced during the move will degrade these measurements. We will define "scanning" to refer to the performance of a task while a machine is moving. The task may be measuring, glueing, machining, or any other process. By using the trajectory technology presented above, scanning tasks can be performed at higher accelerations, higher velocities, and higher accuracies.

Whole Trajectory Shaping

Figure 65:
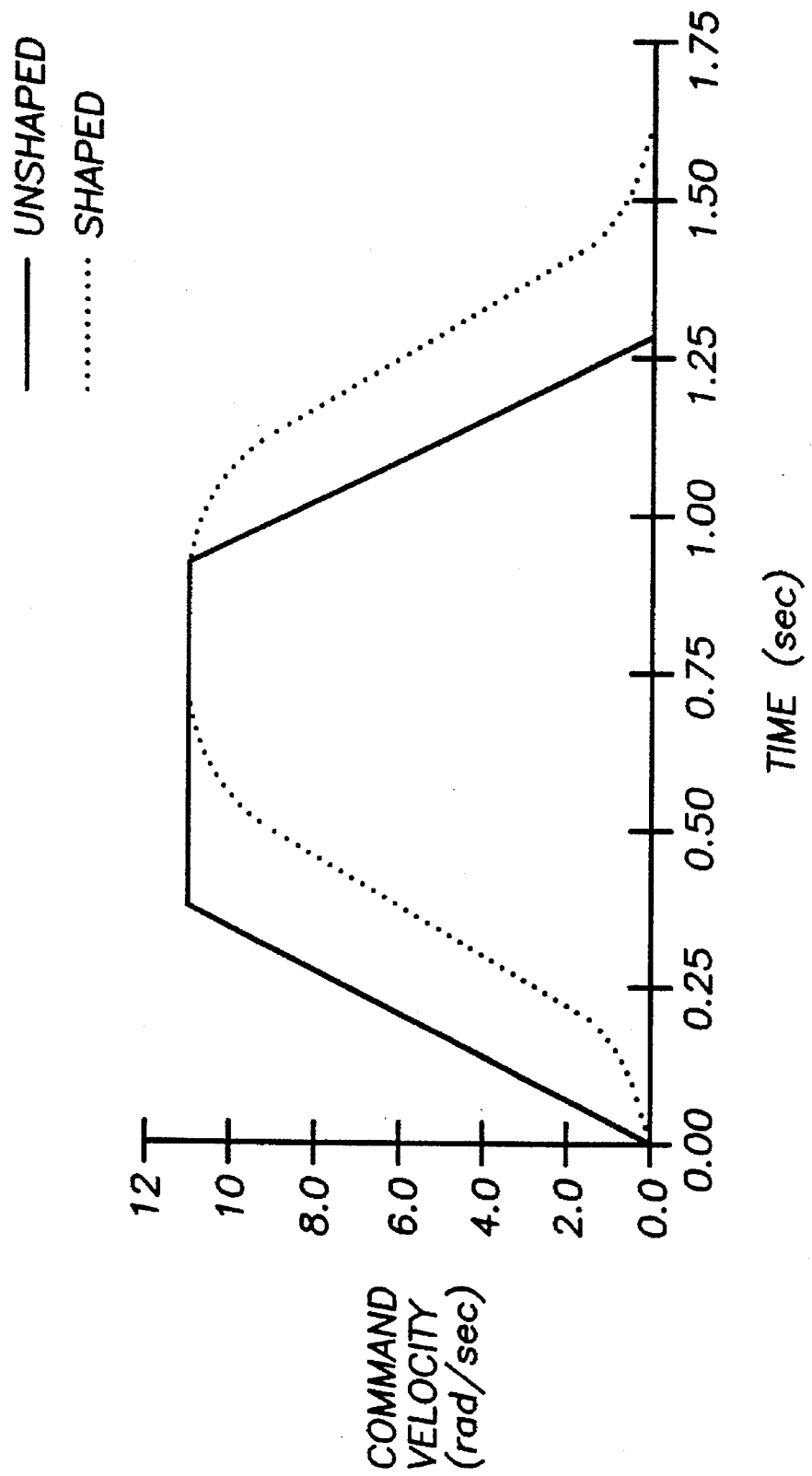
FIG. 65 graphs velocity versus time for an unshaped and shaped trapezoidal velocity profile.

The techniques presented above assemble trajectories by first generating an input shaper and then convolving the shaper with a desired trajectory. If the desired trajectory is known in advance, the shaping process can be made simpler. For example, we will consider a time-optimal trapezoidal profile like the one shown in FIG. 65. The shaped trapezoidal trajectory is also shown in FIG. 65. The shaped profile of FIG. 65 can be calculated analytically a priori and the analytical solution can then be coded directly. The computer then need only evaluate the coded analytical solution rather than numerically calculating the full convolution, as is required in the general case. The advantage of this approach is a savings in computation time and memory storage. The memory storage requirements are reduced since it is no longer necessary to save the entire past command history and computation time is reduced because the many multiplications required in the convolution algorithm are no longer required. In the following, we will consider an example based on a trapezoidal trajectory. However, this technique can be extended to other trajectories which can be parameterized. The convolution may be performed using the parameterized function, yielding an analytical answer which is a function of the original parameters. The shaped input can then be calculated using the analytical answer, thus eliminating the need to store the previous command history. The original parameterization may include derivatives and integrals, and if, for example, the original input is simpler in acceleration, jerk or another derivative, then the shaping can be done on the simpler derivative and the result integrated by summation.

Continuing the trapezoidal trajectory example of FIG. 65, the shaped trajectory appears to be a complex curve. However, in acceleration, it is simply composed of two steps in acceleration and the effect of shaping the input is to produce an acceleration which has a staircase profile. Since the convolution operation is linear, shaping the original trajectory is equivalent to differentiating the trajectory to arrive at the acceleration profiles, shaping the acceleration profiles and then integrating the shaped acceleration profiles to arrive at the shaped trajectory profiles. The latter realization simplifies the computation in this case since the shaped acceleration profile is piece-wise flat. We need only store the transition times between the piece-wise flat elements and the values of each step and the shaped trajectory can then be calculated using only simple additions and branching statements. The following section presents the C code to implement a shaped trapezoidal velocity profile in this manner on an LM628/629 motion control chip.

Implementing Look-up Table for Shaped Trapezoidal Profiles on an LM628/629

The LM628/629 is set in position mode. To implement Input Shaping™, we recommend that the chip be serviced at a frequency, $f$sample, which is greater than ten times the frequency being shaped, $f$. New position and velocity commands will be sent to the LM628/629 at $f$sample.

Typically, the LM628/629 maximum acceleration is set to its maximum value. For a system using a 6 MHz. clock on the LM628/629 and a 5,000 counts/in encoder, the maximum acceleration will be 10,000 in/sec². The maximum acceleration value is used, so that the LM628/629 is actually not doing any trapezoidal profiling. At each time step, we will command a maximum velocity and a desired position that will yield the maximum velocity for the entire command step.

The units used are encoder counts (count) for position, LM628/629 sample periods (sample) for time and command periods (step) for time. With a 6 MHz. clock, one sample is 341.33 μsec. For calculations defining the trajectory, we use units of counts and steps. For commands being sent to the LM628/629, we use units or counts and samples.

Set Up:

These operations are performed once upon system startup or they can be precalculated and hard coded.

Required Parameters:

| double | accmax | Maximum Acceleration of system. (in./sec.2) |
|---|---|---|
| double | velmax | Maximum Velocity of system. (in./sec.) |
| double | f | Frequency of vibration to eliminate. (Hz.) |
| double | $\zeta$ | Damping ratio of vibration. |

Define the conversion factors from inches to encoder counts and from command steps to LM628/629 sample periods.

| double | count_per_inch | Convert from inches to encoder counts (count/in.) |
|---|---|---|
| double | sample_period | Sample Period, 6 or 8 MHz. Clock (sec./sample) |
| double | sample_per_step | Number of samples in a step. (sample/step) |
| #define | count_per_inch | 5000 |
| #define | sample_period | 3.4133333 E-6 /* sec. for 6 MHz. Clock */ |
| #define | sample_per_step | 50 |
| #define | step_period | sample_per_step * sample_period /* 0.0170667 sec */ |

Calculate the maximum acceleration and maximum velocity.

```
int32    vmax    Maximum velocity (count/212 step)
int32    amax    Maximum acceleration (count/216 step2)
vmax = (int)(velmax* count_per_inch * 212 * step_period);
amax = (int)(accmax* count_per_inch * 216 * step_period * step_period);
```

Generate an Input Shaping™ sequence. A shaping sequence is a series of impulses, each specified by a time and an amplitude. The shaped input is calculated by convolving the shaping sequence with the raw input. The shaping sequence is calculated using the method described in 'Generating Impulse Shaping™ Sequences for Digital Systems', a separate document. Typically, a shaping sequence is calculated only once for a particular system. The sequence is a function of the vibrational frequency $f$, damping $\zeta$, and the sampling rate $f_{sample}$:

```
seq Digital shaping sequence.
int16    time[j] Time of jth pulse (step).
int16    amp[j] Amplitude of jth pulse (dimensionless/216).
int16    pulses Number of pulses in seq.
```

For Each Maneuver.

These operations are performed at the beginning of each maneuver:

Required Parameters:

| double | xdes | Desired final position. (in.) |
|---|---|---|

Recall the current command position:

| | | |
|---|---|---|
| int32 | xo | Current command position. (count/212) |

Calculate the move distance in encoder counts.

| | | |
|---|---|---|
| int32 | xf | Desired final position. (count/212) |
| int32 | dx | Change in position (count/212) | xf = (int)(xdes* count_per_inch + 0.5) << 12;
dx = xf - xo;

Calculate the unshaped trapezoidal profile values:

| | | |
|---|---|---|
| int16 | Ssteps | Sequence steps. |
| int16 | Asteps | Acceleration time steps. |
| int16 | Bsteps | Steps before deceleration. |
| int16 | Tsteps | Total Steps |
| int32 | Aact | Actual Acceleration (count/212 step2) |

Ssteps = time[pulses - 1];

$$A_{steps} = (int) \left( \frac{v_{max} << 4}{a_{max}} \right) + 1;$$

$$B_{steps} = (int) \left( \frac{dx}{v_{max}} \right) + 1;$$

if(A steps > Bsteps) {

$$A_{steps} = (int) \left( \sqrt{\left(\frac{dx}{a_{max}}\right) << 4} \right) + 1;$$

Bsteps = Asteps;
}
Tsteps = Asteps + Bsteps + Ssteps;

$$A_{act} = (int) \left( \frac{dx}{A_{steps}B_{steps}} \right);$$

Generate a table of jerk values by multiplying the shaping sequence amplitudes, amp[i], by the actual acceleration, A act, and changing units. An extra value is added to the table to prevent accessing values beyond the array bounds.

Figure 66A:
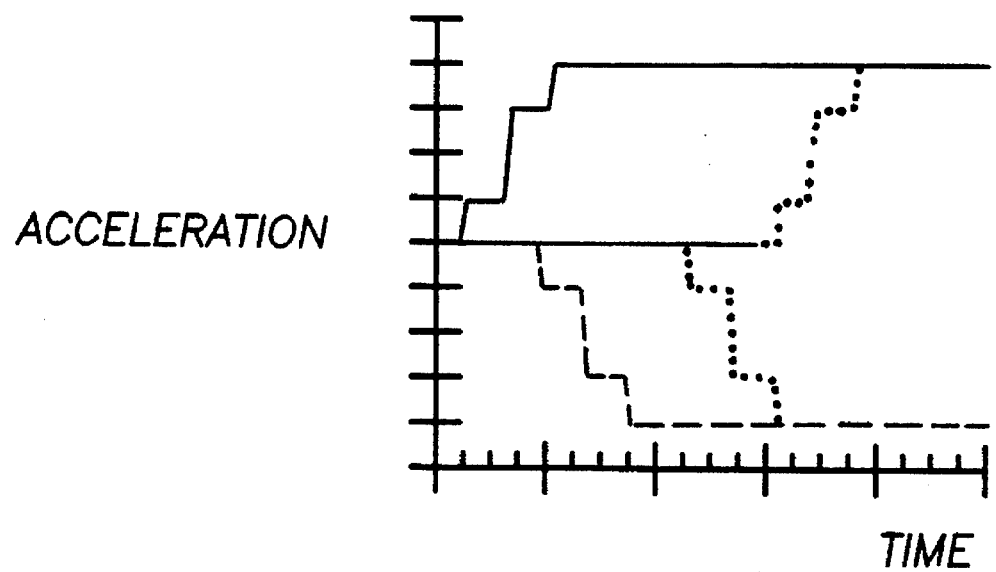
FIGS. 66a and 66b illustrate that the superposition of four shaped acceleration steps yields a shaped trapezoidal velocity profile.
Figure 66B:
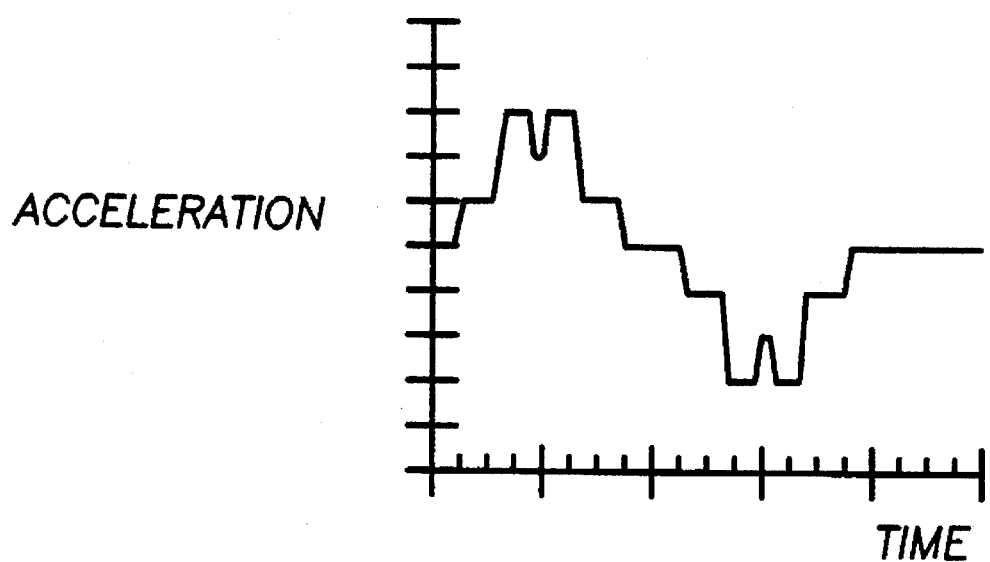

A trapezoidal profile can be described by four changes—ramp up to maximum positive acceleration, ramp down to zero acceleration, ramp down to maximum negative acceleration, and ramp up to zero acceleration. If the move distance is short, the profile will resemble a triangle, not a trapezoid, and the second and third changes in acceleration will occur at the same time. Each of these segments is a step in acceleration that is modified by the input shaping sequence. FIGS. 66a and 66b show how the superposition of four acceleration steps yields the desired trapezoidal trajectory. Each of the changes in acceleration is described by the jerk[] occurring at the shaping sequence time, time[], after the beginning of each segment of the profile:

```
int32          jerk[i] Acceleration Increment (count/216 sample step).
for (i=0 ; i<pulses ; i++)
jerk[i] = (amp[i]>>2)*(Aact>>2)/(sample_per_step<<8);
jerk[pulses] = 0;
time[pulses] = Tsteps;
• Initialize the variables used in implementing the shaped trapezoidal trajectory.
int32     acc        Current acceleration (count/216 sample step)
int32     vel        Current velocity (count/216 sample)
int32     pos        Current position (count/212)
int16     i          Step Counter
int32     a          Command Maximum Acceleration (count/216 sample2)
int16     stopflag   Flag for immediate stop.
/* The four indexes keep track of the four shaped acceleration steps */
int16     aindex = 0;
int16     bindex = 0;
int16     cindex = 0;
int16     dindex = 0;
acc = 0;
vel = 0;
pos = xo;
i = 0;
a = ((Aact<<4)/sample_per_step)<<1; /* Double what we need */
```

Implement the shaped trapezoidal trajectory at the step frequency, $f_{step}$.

At each time step, i, change the acceleration command, acc, increment vel, the desired velocity, and pos, the position command:

```
if(stopflag) {
    if(i < Asteps)
        Asteps = i;
    if(i < Bsteps)
        Bsteps = j;
}
if(i == time[aindex])
    acc += jerk[aindex++];
if(i == Asteps + time[bindex])
    acc -= jerk[bindex++];
if(i == Bsteps + time[cindex])
    acc -= jerk[cindex++];
if(i == Asteps + Bsteps + time[dindex])
    acc += jerk[dindex++];
vel += acc;
pos += (sample_per_step * vel)<<4;
i++;
```

Send the position and velocity commands, x and v, to the system.

| | | |
|---|---|---|
| int32 | v | Velocity command to LM628/629 (count/216 sample) |
| int32 | x | Position command to LM628/629 (count) | v = vel;
x = pos >> 12;

After Tsteps steps, the shaped trapezoidal profile is completed:

Shaping Look-up Table for Arbitrary Commands

Figure 67:
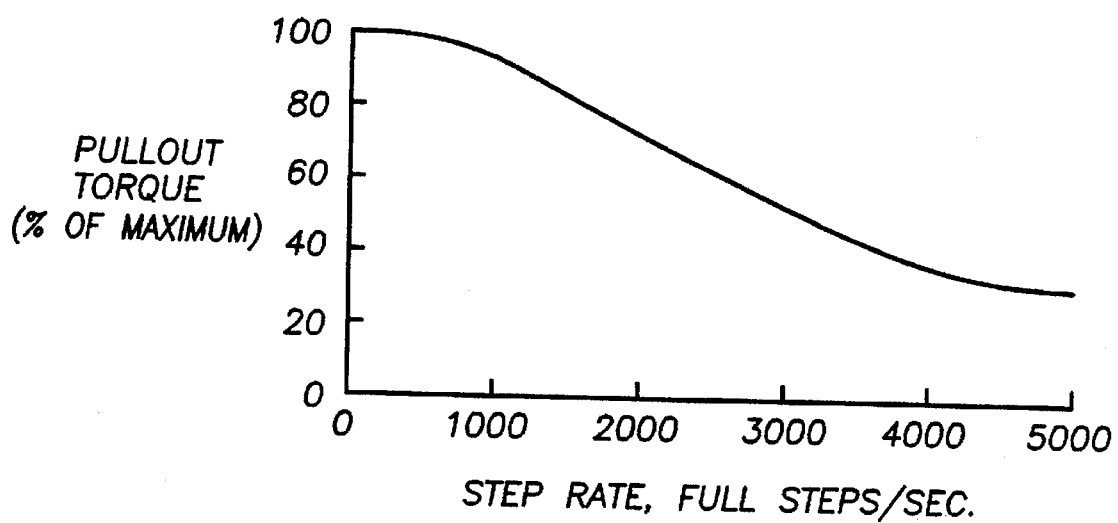
FIG. 67 graphs pullout torque versus step rate for a stepper motor.

FIG. 67 shows the pullout torque-speed curve for a stepper motor. A trapezoidal trajectory is not the time-optimal trajectory for this motor because the torque speed curve is not constant. If a time-optimal trajectory is generated by looking up the maximum torque command at each speed, a given trajectory is defined. This trajectory best utilizes the abilities of the motor without attempting to exceed its capabilities. The resulting "optimal" trajectory can be shaped in advance for the system. A similar lookup table algorithm to the one shown above can be used to generate the optimal shaped profile.

Shaping During Emergency Situations

During emergency stopping situations shaping can also be useful. For some machines it is preferable to just command the current position and allow the system to vibrate. For some systems it is preferred to stop quickly without vibration. If shaping is used the system will reach a final position which is beyond the current position. The user must decide if it is more important to stop without vibration or to stop at the last position with overshoot. Because there is no overshoot with shaping, the final shaped position and the peak overshoot location are the same if a non-robust shaping sequence is used.

Shaping Stepping Motor Systems

Stepping motors and servo motors are commanded differently. To command a velocity with a stepper motor, a step or pulse rate is sent to the system [Leenhouts, Albert, Step Motor System Design Handbook, Litchfield Engineering Co., 1991] This pulse rate can be shaped just as a velocity command in a servo motor. Additionally, some stepper motor drive systems use vector control, thereby essentially commanding a torque from the motor. The proper coil is energized to deliver a torque. This energizing sequence can be shaped by using a shaping sequence to alter the shape of the desired torque profile and using the vector lookup table to translate the torque into a vector sequence.

Shaping controller product

Current commercial controller boards consist of a processor, encoder reading circuitry, and digital to analog conversion technology. Based on the input shaping technology described previously, a new hardware software product is possible. The product consists of a controller board with sensor reading circuitry, and frequency identification software. An external sensor (or a user supplied sensor) is connected to the system. A control signal is generated by the controller board. The system response from the sensor is read. The resonances of the system are determined from the sensor data. These resonances are then used to set the shaping sequence.

Tuning Trapezoidal, S-Curve, and Parabolic Profiles for Vibration Reduction

Introduction

Several types of velocity profiles are used in the motion control industry to reduce vibration for point to tpoint moves and improve tracking. The profiles are not based on the vibrational frequencies of the system, so the amount of vibration reduction obtained with the profiles varies from system to system. Additionally, the vibration reduction will vary with move distance. By taking the low mode of vibration and the move distance into account, we can tune Trapezoidal, S-Curve, and Parabolic velocity profiles for improved and predictable vibration reduction. Jones and Petterson [J. F. Jones and B. J. Petterson, "Oscillation Damped Movement of Suspended Objects," Proceedings of the IEEE International Conference on Robotics and Automation. 1988. Philadephia, Pa.] showed that a double acceleration pulse can damp a suspended object if the spacing is accurately set to one period of vibration. This result is essentially the Posicast solution. Petterson [B. J. Petterson and R. D. Robinert, "Model Based Damping of Coupled Horizontal and Vertical Oscillations in a Flexible Rod," AIAA Guidance, Navigation and Controls Conference, 1989. Boston, Ma.] extended his earlier work by showing that the acceleration pulses of a trapezoidal trajectory can be accurately spaced or set to a specific duration to yield a vibration reducing trapezoidal acceleration.

Trapezoidal Velocity Profiles

Figure 68A:
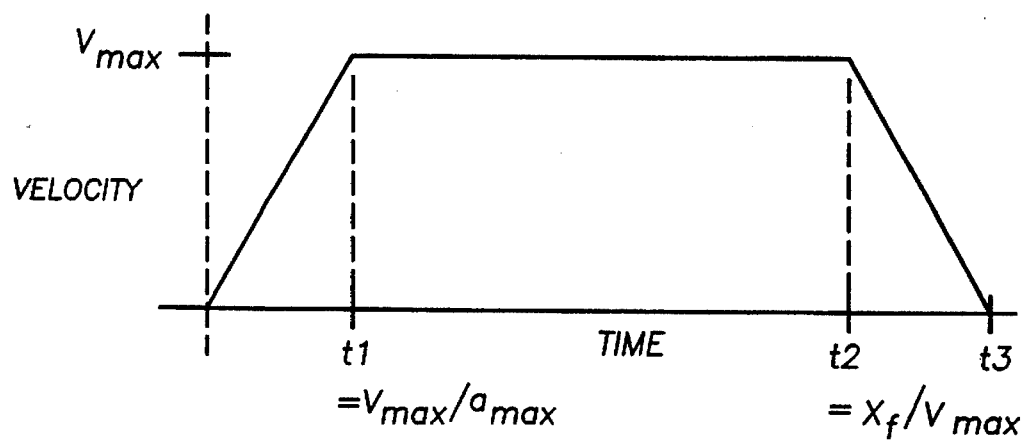
FIGS. 68a and 68b illustrate a trapezoidal velocity profile and its corresponding acceleration profile.
Figure 68B:
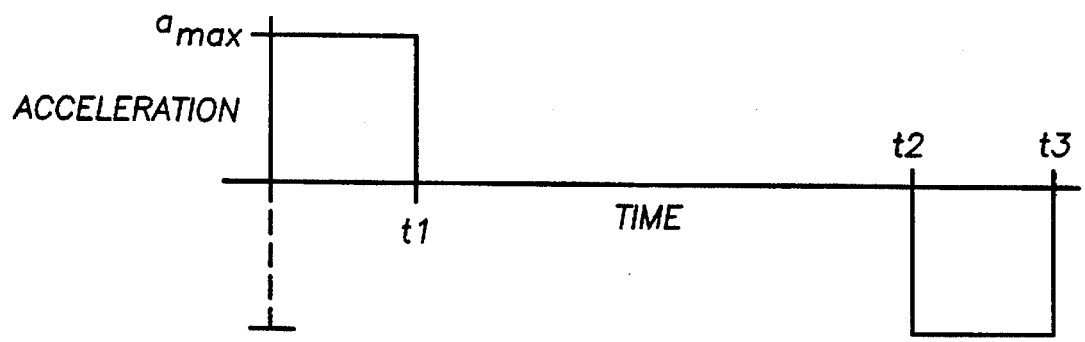

A trapezoidal velocity profile is a ramp up at max acceleration ($a_{max}$) to the maximum velocity ($v_{max}$), slewing at $v_{max}$ for a specified amount of time, and then decelerating at maximum negative acceleration ($-a_{max}$) to zero velocity. FIG. 68a shows a trapezoidal velocity profile and FIG. 68b shows its corresponding acceleration profile. Looking at the acceleration profile for the trapezoidal velocity profile, we see a pulse of acceleration of magnitude $a_{max}$ and length $t_1$. Then zero acceleration, provided the move is long enough. At time $t_2$, there is a pulse in acceleration of magnitude $-a_{max}$ and length $t_1$. The time required to reach maximum velocity (the time when $v_{max}$ is achieved) is:

$$t_1 = \frac{v_{max}}{a_{max}} \quad (1)$$

The time at which deceleration starts, $t_2$, is given by:

$$t_2 = \frac{x_f}{v_{max}} \quad (2)$$

where $x_f$ is the desired travel distance. The total move time, $t_3$, is given by:

$$t_3 = t_1 + t_2 \quad (3)$$

Figure 69A:
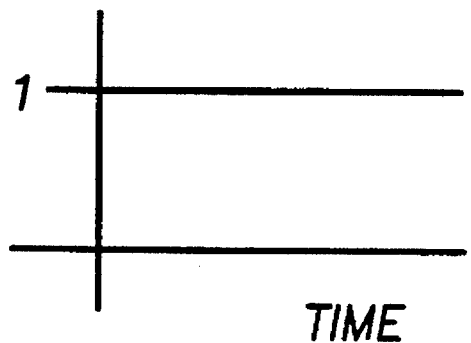
FIGS. 69a, 69b, 69c and 69d illustrate that the acceleration profile of FIG. 68b may be decomposed into the convolution of a step function with two sequences of two impulses each.
Figure 69B:
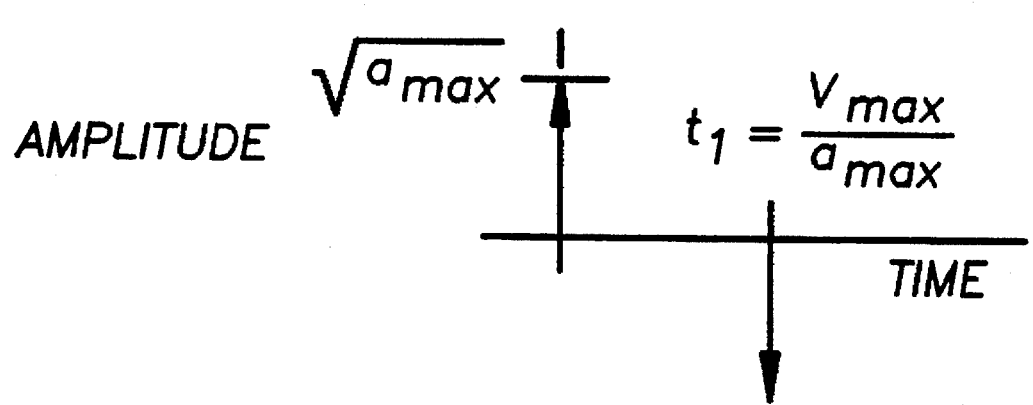
Figure 69C:
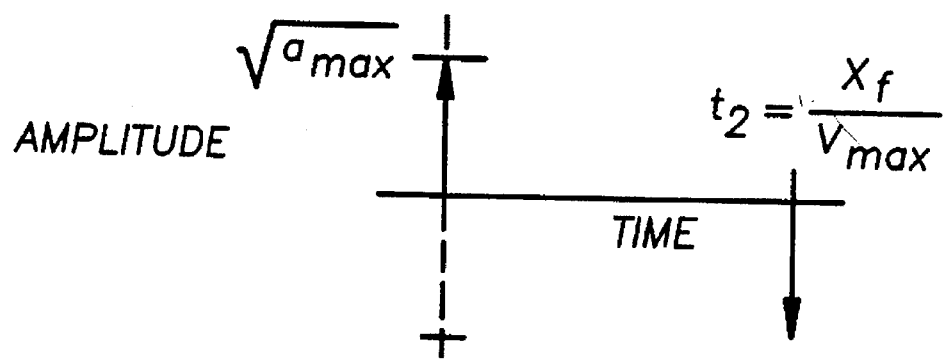
Figure 69D:
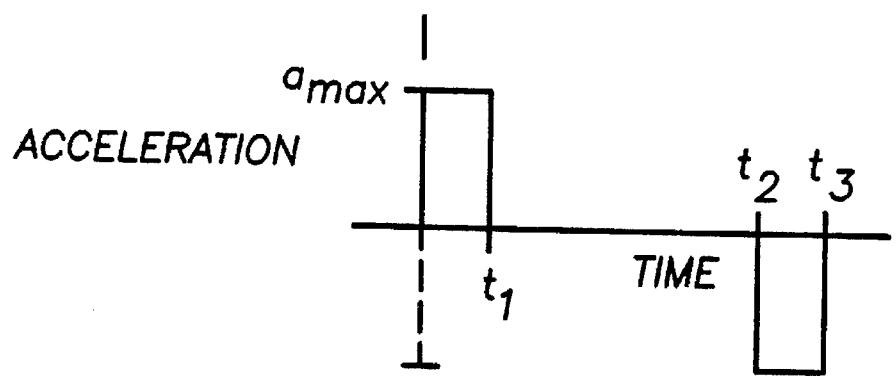

If we view trapezoidal profiles as step inputs in acceleration that have already been input shaped, we can deconvolve two two-impulse shapers out of the acceleration profile. That is, the acceleration profile of FIG. 69d is the convolution of the step function of FIG. 69a with the two two-impulse shapers shown in FIGS. 69b and 69c, and defined by $$\text{Shaper 1} = \begin{bmatrix} \text{time} \\ \text{amplitude} \end{bmatrix} = \begin{bmatrix} 0 & t_1 \\ \sqrt{a_{max}} & -\sqrt{a_{max}} \end{bmatrix} \quad (5)$$

$$\text{Shaper 2} = \begin{bmatrix} \text{time} \\ \text{amplitude} \end{bmatrix} = \begin{bmatrix} 0 & t_2 \\ \sqrt{a_{max}} & -\sqrt{a_{max}} \end{bmatrix} \quad (6)$$

If we know the vibrational frequency, f, of the system in Hertz, we can calculate trapezoidal velocity profile metrics that are helpful for predicting residual vibration amplitude. The metrics are:

$$m_1 = t_1 * f \quad (7)$$

$$m_2 = t_2 * f \quad (8)$$

One, or both of these metrics must be an integer value for the trapezoidal profile to result in zero residual vibration.

We can use this information to develop guidelines that predict the effectiveness of trapezoidal velocity profiles. These guidelines are as follows:

Good Trapezoidal Velocity Profile Moves:

1) $m_1 = t_1 f = \frac{V_{max}}{a_{max}} f \simeq$ integer value (9)

2) $m_2 = t_2 f = \frac{x_f}{V_{max}} f \simeq$ integer value (10)

Bad Trapezoidal Velocity Profile Moves:

1) $m_1 = t_1 f = \frac{V_{max}}{a_{max}} f \simeq$ integer value + 0.5 & $m_2 \neq$ integer value (11)

2) $m_2 = t_2 f = \frac{x_f}{V_{max}} f \simeq$ integer value + 0.5 & $m_1 \neq$ integer value (12)

Figure 70:
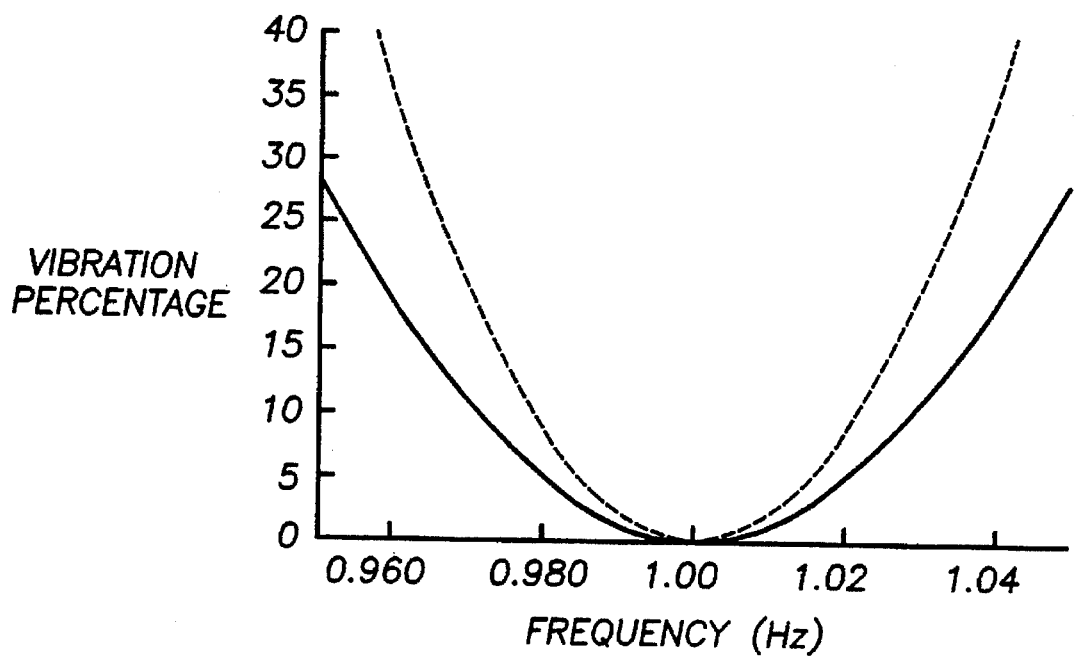
FIGS. 70 and 71 graph residual vibration versus frequency for different inputs.
Figure 71:
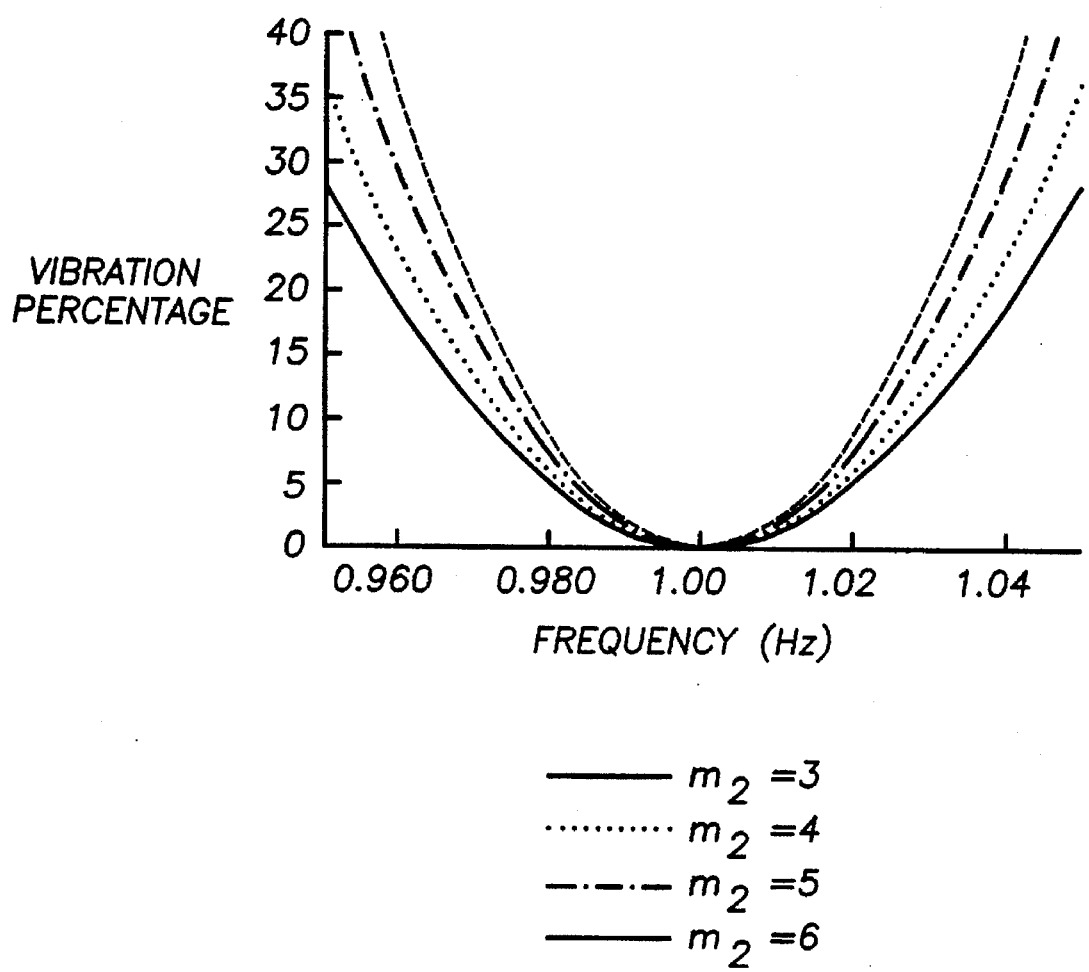

Physically, $m_1$ and $m_2$ are the number of cycles of vibration between the impulses in the two input shapers. If $m_1$ and $m_2$ are integers, the vibration at the system resonance will be canceled. If $m_1$ and $m_2$ are integers +0.5, the vibration at the system resonance is enhanced. As $m_1$ and $m_2$ become larger integers, more cycles of vibration occur before cancellation, and insensitivity to errors in the frequency estimate degrades. FIG. 70 shows this insensitivity loss by comparing the case of $a_{max}=2$ to the case for $a_{max}=1$, when $v_{max}=2$, $x_f=3$ and $f=1$. In terms of profile metrics, the first case has $m_1=1$ and $m_2=3$, while in the second case $m_1$ has been doubled to give $m_1=2$ and $m_2=3$. The loss of insensitivity to modeling errors also occurs when the move distance is lengthened ($m_2$ is increased). This is shown in FIG. 71, where m1 is held constant at 1 while m2 is increased from 3 to 6.

By examining the trapezoidal profile in this way, we gain a better understanding of its benefits and limitations. We can use the above metrics to evaluate moves in position, velocity, acceleration, or jerk, because zero vibration in any one of them necessarily means zero vibration in all the others. We can also use the metrics to set parameter values that will result in low vibration moves.

S-Curve Velocity Profiles

Figure 72A:
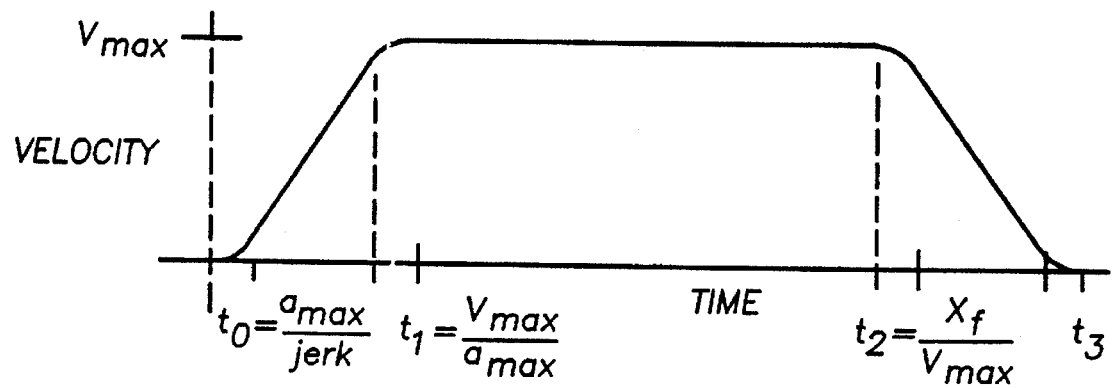
FIGS. 72a, 72b and 72c illustrate an s-curve velocity profile and its corresponding acceleration and jerk profiles.
Figure 72B:
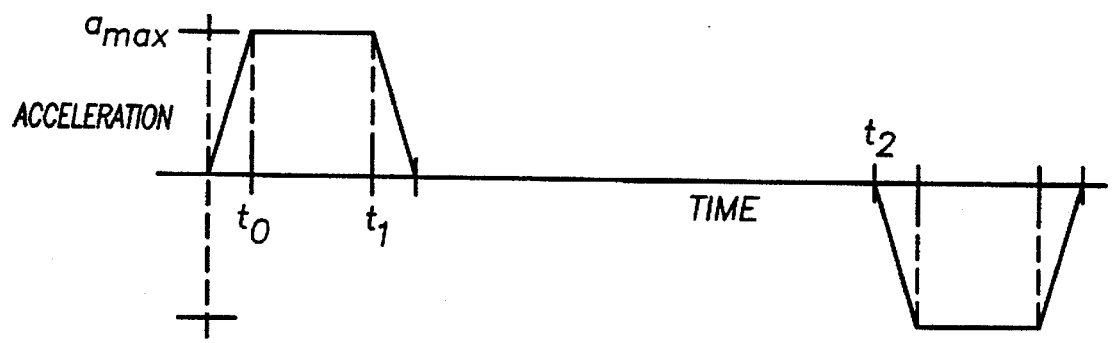
Figure 72C:
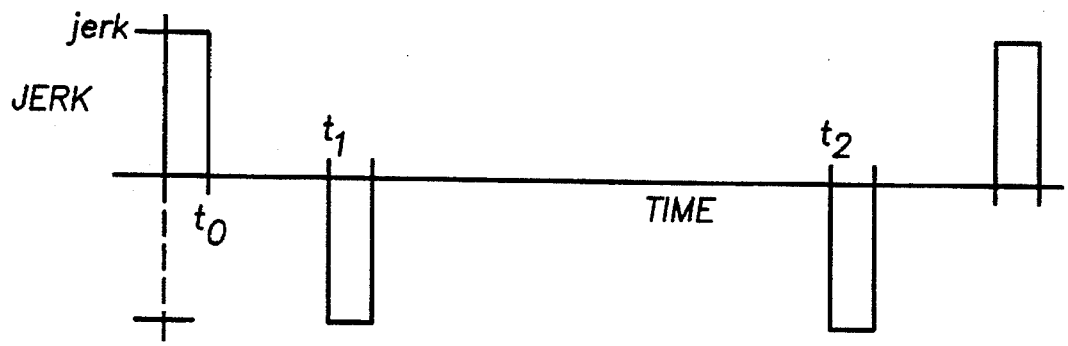

An S-Curve in velocity is a command of constant jerk (change in acceleration) up to the maximum acceleration, then constant acceleration is commanded, followed by a negative constant jerk to zero acceleration (trapezoidal in acceleration). This first component of the S-curve accelerates the system to a constant velocity, at which it slews for a specified amount of time. To decelerate, the system is given a negative constant jerk until the maximum negative acceleration is achieved, then constant maximum deceleration is commanded. Finally, a constant positive jerk is commanded to return the system to zero acceleration and zero velocity. The velocity, acceleration and jerk curves for an s-curve velocity profile are given in FIGS. 72a, 72b and 72c. The time required to reach maximum acceleration is given by:

$t_0 = \frac{a_{max}}{jerk}$ (13)

The time at which constant acceleration ends is:

$t_1 = \frac{V_{max}}{a_{max}}$ (14)

The time at which deceleration starts, $t_2$, is given by:

$t_2 = \frac{x_f}{V_{max}}$ (15)

The total move time is given by:

$t_3 = t_0 + t_1 + t_2$ (16)

Figure 73A:
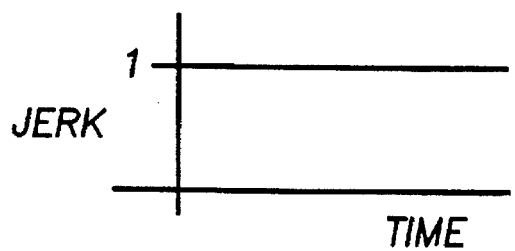
FIGS. 73a, 73b, 73c, 73d and 73e illustrate that the jerk profile of FIG. 72c may be decomposed into the convolution of a step function with three sequences of two impulses each.
Figure 73B:
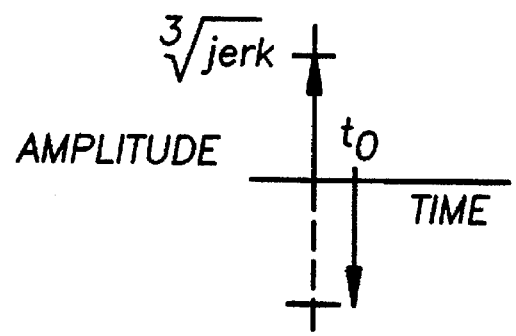
Figure 73C:
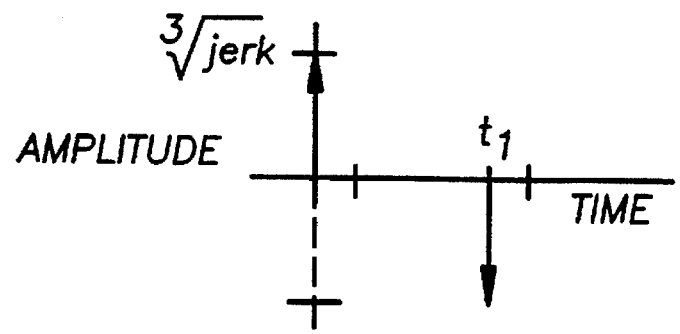
Figure 73E:
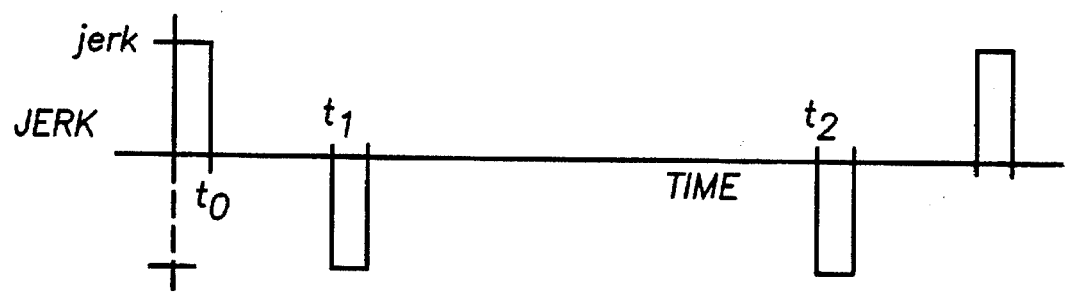
Figure 73D:
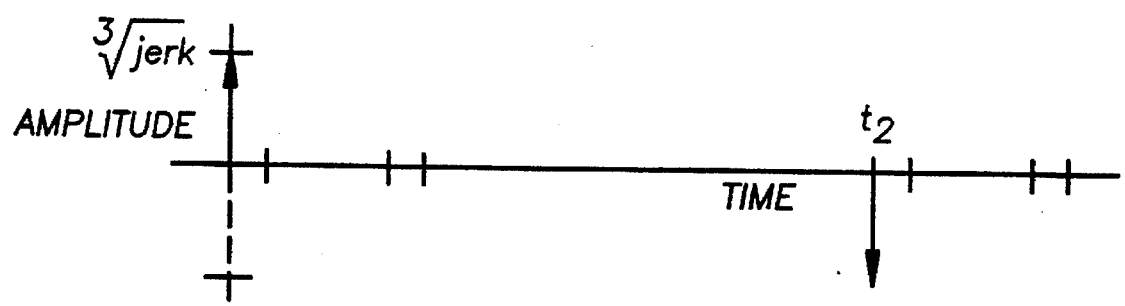

If we view the S-Curve profile of FIG. 73e as the step input in jerk of FIG. 73a, that has already been input shaped, then we can deconvolve the three two-impulse shapers shown in FIGS. 73b, 73c and 73d.

The three two-impulse shapers are:

$$\text{Shaper } 0 = \begin{bmatrix} \text{time} \\ \text{amplitude} \end{bmatrix} = \begin{bmatrix} 0 & t_0 \\ \sqrt[3]{jerk} & -\sqrt[3]{jerk} \end{bmatrix} \quad (17)$$

$$\text{Shaper } 1 = \begin{bmatrix} \text{time} \\ \text{amplitude} \end{bmatrix} = \begin{bmatrix} 0 & t_1 \\ \sqrt[3]{jerk} & -\sqrt[3]{jerk} \end{bmatrix} \quad (18)$$

$$\text{Shaper } 2 = \begin{bmatrix} \text{time} \\ \text{amplitude} \end{bmatrix} = \begin{bmatrix} 0 & t_2 \\ \sqrt[3]{jerk} & -\sqrt[3]{jerk} \end{bmatrix} \quad (19)$$

If we know the vibrational frequency, f, of the system in Hertz, we can calculate S-curve profile metrics that are helpful for predicting residual vibration amplitude:

$m_0 = t_0 * f$ (20)

$m_1 = t_1 * f$ (21)

$m_2 = t_2 * f$ (22)

As with trapezoidal profiles, if any of the above metrics are integers, the move will result in zero residual vibration. Additional insensitivity is achieved by making more than one metric an integer. Guidelines for predicting the effectiveness of S-Curves are:

Good S-Profile moves:

1) $m_0 = t_0 f = \frac{a_{max}}{jerk} f \simeq$ integer value (23)

2) $m_1 = t_1 f = \frac{V_{max}}{a_{max}} f \simeq$ integer value (24)

3) $m_2 = t_2 f = \frac{x_f}{V_{max}} f \simeq$ integer value (25)

Bad S-Profile Moves:

1) $m_0 =$ (26)

$t_0 f = \frac{a_{max}}{jerk} f \simeq$ integer value + 0.5 & $m_1, m_2 \neq$ integer value 2) $m_1 =$ (27)

$t_1 f = \frac{V_{max}}{a_{max}} f \simeq$ integer value + 0.5 & $m_0, m_2 \neq$ integer value 3) $m_2 =$ (28)

Figure 74:
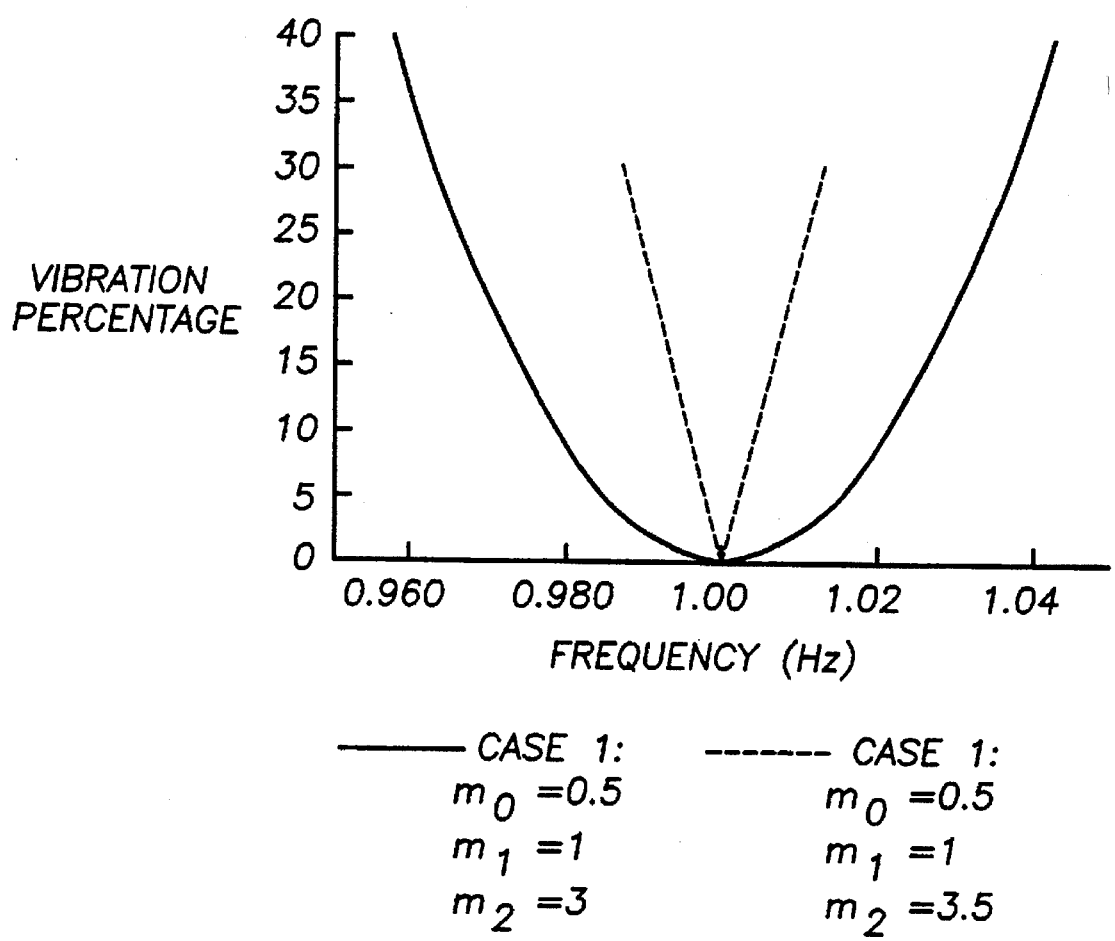
FIG. 74 graphs residual vibration versus frequency for different inputs.

$t_2 f = \frac{x_f}{V_{max}} f \simeq$ integer value + 0.5 & $m_0, m_1 \neq$ integer value To demonstrate the increase in insensitivity when more than one metric is an integer, FIG. 74 compares the case when $m_0=0.5$, $m_1=1$, and $m_2=3$ to the case when $m_0=0.5$, $m_1=1$, and $m_2=3.5$. Case 1, where two metrics are integers, is significantly more insensitive than case 2, where only one metric is an integer.

Parabolic Profiled Trajectories

Figure 75A:
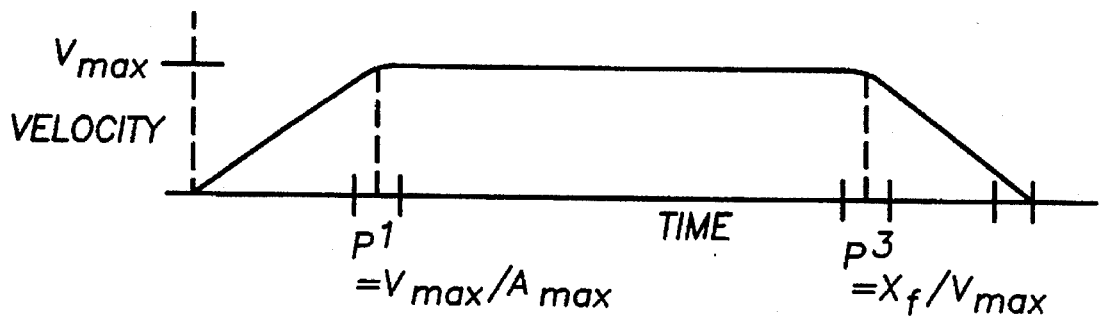
FIGS. 75a, 75b and 75c illustrate a parabolic velocity profile and its corresponding acceleration and jerk profiles.
Figure 75B:
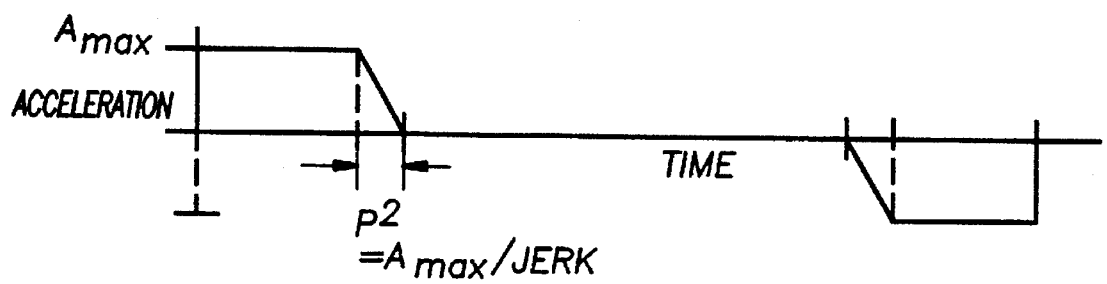
Figure 75C:
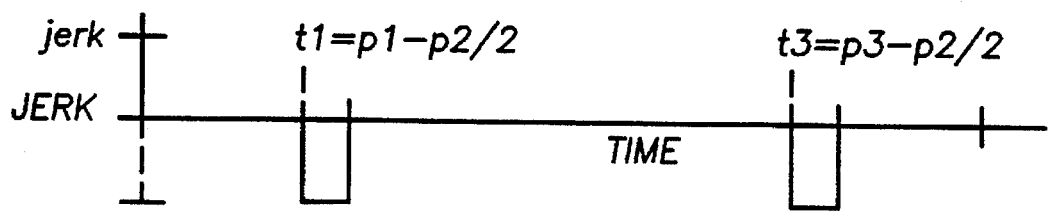

The velocity, acceleration and jerk profiles for a parabolic velocity profile are shown in FIGS. 75s, 75b and 75c. Parabolic velocity profiles are fundamentally different from Trapezoidal and S-Curve velocity profiles. Their frequency characteristics are from two four-impulse shapers that are added not convolved. This means that one metric from each shaper must be integers in order to have zero residual vibration.

To make the expressions for the parabolic velocity profile metrics compact, we introduce the following parameters:

$$p_1 = \frac{v_{max}}{a_{max}} \tag{29}$$

$$p_2 = \frac{a_{max}}{jerk} \tag{30}$$

$$p_3 = \frac{x_f}{v_{max}} \tag{31}$$

$$p_4 = \frac{(a_{max})^3}{12 v_{max} jerk^2}$$

The important times at which changes in the profile occur are:

$$t_1 = p_1 - p_2/2 \tag{32}$$

$$t_2 = p_1 + p_2/2 \tag{33}$$

$$t_3 = p_3 - p_2/2 \tag{34}$$

$$t_4 = p_3 + p_2/2 \tag{35}$$

$$t_5 = p_3 + p_1 \tag{36}$$

Vibration reduction metrics can now be written as:

$$m_1 = t_4 f = \left(p_3 + \frac{p_2}{2}\right) f = \left(\frac{x_f}{v_{max}} + \frac{a_{max}}{2 jerk}\right) f \tag{37}$$

$$m_2 = t_1 f = \left(p_1 - \frac{p_2}{2}\right) f = \left(\frac{v_{max}}{a_{max}} - \frac{a_{max}}{2 jerk}\right) f \tag{38}$$

$$n_1 = t_5 f = \tag{39}$$

$$(t_3 - t_1)f = (p_3 - p_1)f - 0.5 = \left(\frac{x_f}{v_{max}} - \frac{v_{max}}{a_{max}}\right)f - 0.5$$

$$n_2 = p_2 f = \frac{a_{max}}{jerk} f \tag{40}$$

Notice that 0.5 is subtracted from n1. This is because the impulses that occur at times t1 and t3 are both negative. With all other sets of two impulses, one was positive, the other negative. By subtracting 0.5 from this metric, we are insuring that the two negative impulses will cancel the vibration.

Guidelines for predicting the effectiveness of Parabolic velocity profiles are:

Good Parabolic Velocity Profiles:

1) $m_1 \simeq$ integer value & $\begin{cases} n_1 \simeq \text{integer value} \\ \text{or} \\ n_2 \simeq \text{integer value} \end{cases}$ (41)

2) $m_2 \simeq$ integer value & $\begin{cases} n_1 \simeq \text{integer value} \\ \text{or} \\ n_2 \simeq \text{integer value} \end{cases}$ (42)

Bad Parabolic Velocity Profiles:
1) $m_1 \simeq$ integer value + 0.5 & $m_2 \simeq$ integer value + 0.5 (43)
2) $n_1 \simeq$ integer value + 0.5 & $n_2 \simeq$ integer value + 0.5

Procedures for Selecting the Parameters $v_{max}$, $a_{max}$, jerk for Trapezoidal Velocity Profiles 1) Set $a_{max}$ to $v_{max}*f$
2) Set $a_{max}$ to an integer times $v_{max} f$
3) Set $v_{max}$ to $a_{max}/f$
4) Set $v_{max}$ to an integer times $a_{max}/f$
5) Set $v_{max}$ to $x_f*f$
6) Set $v_{max}$ to an integer times $x_f*f$
7) Use any combination of the above 1), 2), 3), 4), 5), or 6) and convolve it with a shaper designed for the system frequency, or a shaper designed for the system frequency and damping ratio.
8) If the move distance is such that the system's physical $v_{max}$ cannot be achieved, i.e. $v_{actual} = \text{sqrt}(a_{max} x_f) < v_{max}$, and $\text{sqrt}(x_f/a_{max})*f > 1$ then use the following procedure:

a) Define $n_y = \text{truncate}(\text{sqrt}(x_f/a_{max})*f)$
   b) Set $v1 = a_{max} n_y/f$ and $a_{max} = a_{max}$
   C) Use $v_{max} = v_1$, and $a_{max} = a_{max}$ Or, d) Define $n_x = \text{truncate}(x_f/v_{actual}*f)$
   e) Set $v1 = x_f/n_x*f$ and $a_{max} = a_{max}$
   f) Use $v_{max} = v1$ and $a_{max} = a_{max}$ The preferred embodiment would be the shortest move time of the two moves. The move time for the trapezoidal profile is calculated as Trapezoidal move time = $v_{max}/a_{max} + x_f/v_{max}$.

Procedures for Selecting the Parameters $v_{max}$, $a_{max}$, and jerk for S-Curve Velocity Profiles All of the following procedures assume that we are starting with a system that has a known maximum velocity ($v_{max}$), maximum acceleration ($a_{max}$), move distance ($x_f$) and frequency of vibration (f). Given the above, we can modify the initial parameters to get vibration reducing moves.

Define: $n = \text{truncate}(v_{max} f/a_{max})$

1) Set the jerk to be $a_{max}*f$.
2) Set the jerk to be an integer times $a_{max}*f$.
3) Set $a_{max}$ to $v_{max}*f$
4) Set $a_{max}$ to an integer times $v_{max}*$
5) Set $v_{max}$ to $a_{max}/f$
6) Set $v_{max}$ to an integer times $a_{max}/f$
7) Set $v_{max}$ to $x_f*f$
8) Set $v_{max}$ to an integer times $x_f*f$
9) If the move distance is nearly an integer times $v_{max}/f$, use 1) or 2) and keep the acceleration at $a_{max}$ and the velocity at $v_{max}$. This will result in a more robust move, and will be at the maximum acceleration of the system.
10) For additional insensitivity, use any combination of 1), 2), 3), 4), 5), 6), 7), 8), and 9)
11) Use 1) or 2) and if $v_{max}*f/a_{max}$ is less than $n(1+v_{max}/f/x_f)$ then set $v_{max} = a_{max} n/f$. If not, set $a_{max} = v_{max} f/(n+1)$.

To further explain the above, we want the move that will cause no vibration and have the shortest move time. For S-Curve velocity profile moves, the move time is:

$$t_3 = t_0 + t_1 + t_2$$

Or, $$t_3 = \frac{a_{max}}{jerk} + \frac{v_{max}}{a_{max}} + \frac{x_f}{v_{max}}$$

Using n defined above, we can calculate a new $v_{max}$ and a new $a_{max}$:

$v_{max}\text{new} = a_{max} n/f$
$a_{max}\text{new} = v_{max}*f/(n+1)$

Calculate the new move times by replacing the velocity or the acceleration:

movetimevmax = $a_{max}/jerk + v_{max}\text{new}/a_{max} + x_f/v_{max}\text{new}$
movetimeamax = $a_{max}\text{xnew}/jerk + v_{max}/a_{max}\text{new} + x_f/v_{max}$ Select the shorter of the two movetimes and use the corresponding parameters. This will result in an s-curve velocity profile that will be more insensitive to modeling errors, while still maintaining a short move time.

Procedures for Selecting the Parameters $v_{max}$, $a_{max}$, and jerk for Parabolic Velocity Profiles All of the following procedures assume that we are starting with a system that has a known maximum velocity ($v_{max}$), maximum acceleration ($a_{max}$), move distance ($x_f$) and frequency of vibration (f). Given the above, we can modify the initial parameters to get vibration reducing moves.

Figure 76:
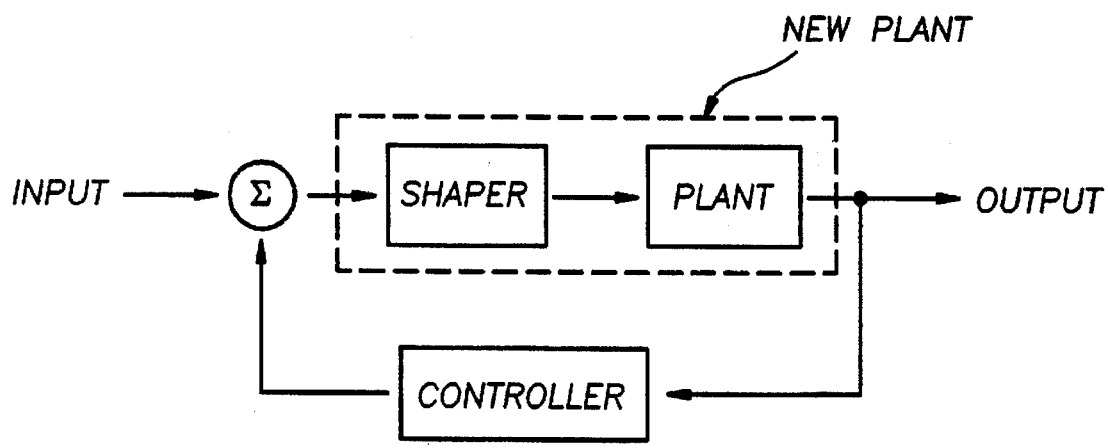
FIG. 76 is a block diagram of a closed loop system with an internal input shaper.

1) Set $m_1$=intger value and set $n_1$=integer value
2) Set $m_1$=intger value and set $n_2$=integer value
3) Set $m_2$=intger value and set $n_1$=integer value
4) Set $m_2$=intger value and set $n_2$=integer value Input Shapers™ in Closed Loop Systems For systems which are closed loops, an Input Shaper™ can be placed in the feed forward branch of the closed loop, as shown in FIG. 76, in order to modify or eliminate unwanted dynamics in the plant. Such a system is referred to as a shaper-in-the-loop (SIL) system and conventional control system design techniques can be applied to the SIL system if we consider the combination of the Input Shaper™ and the original (nominal) plant to constitute a new plant, as indicated by the dashed line in FIG. 76, and then design the controller with respect to the new plant. The new plant will have different magnitude and phase characteristics that may need to be considered when choosing SIL closed loop gains. Consider the following two cases.

Case 1: Shaped Frequency Greater than Closed Loop Bandwidth

If the shaped frequency is much greater than the nominal closed loop bandwidth, then there will be little effect on the nominal gain and phase margins. Little or no adjustment of the nominal gains will be required, and vibrations at the shaped frequency will be suppressed. This technique is particularly valuable for suppressing vibration frequencies that are in a frequency band greater than the closed loop bandwidth and less than the Nyquist rate.

The shaper is tuned to the open loop vibration frequency to be suppressed. As the loop gains are increased, the locations of the shaper zeros and the system poles at the vibration frequency remain coincident.

The robustness property of the shaper improves under closed loop conditions. Poles tend toward zeros as loop gains are increased, consequently any misalignment of the shaper zeros with the poles at the vibration frequency is mitigated. Misalignment may be caused by errors in vibration frequency estimation, or by poles that change location with system configuration, with time, with payload, etc.

If the shaper zeros and poles at the vibration frequency are perfectly aligned, then little additional robustness should occur as a result of feedback signals circulating through the shaper. That is, disturbance rejection at the shaped frequency should not improve since the design of the shaper prevents feedback signals from generating the control output at the shaped frequency necessary to cancel the disturbance at the shaped frequency.

Case 2: Shaped Frequency within Closed Loop Bandwidth

If the shaped frequency is within or near the nominal closed loop bandwidth, then there may be a significant effect on the nominal phase and gain margins, thus requiring adjustment of the nominal gains (or modification of the filtering approach) in order to obtain a stable system with good transient response. Vibration at the shaped frequency will be suppressed, however, depending on the approach taken, the closed loop bandwidth may be degraded relative to the nominal system bandwidth depending on the amount of phase lag introduced by the shaper.

Figure 77:
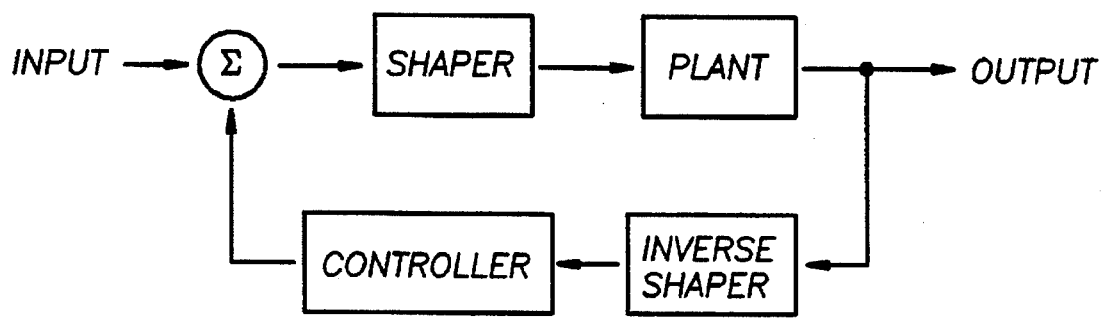
FIG. 77 is a block diagram of a closed loop system with an internal input shaper and a compensating filter.
Figure 78:
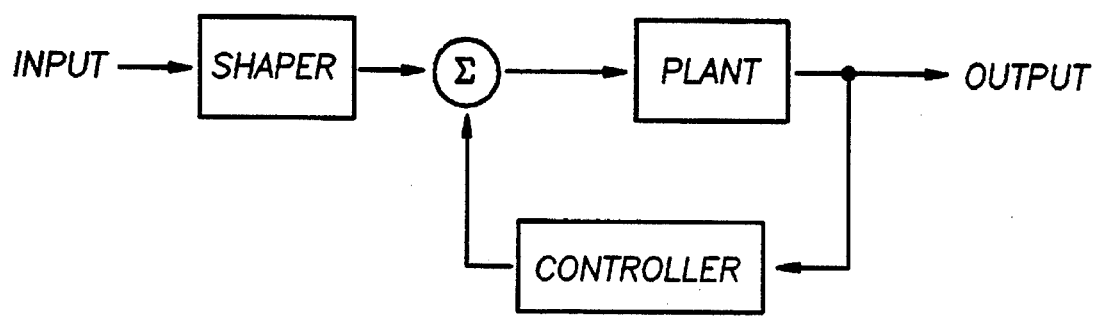
FIG. 78 is a block diagram of a closed loop system with an external input shaper.

Therefore, for every closed loop system in which the input is shaped external to the closed loop, there should be an equivalent SIL system in which the shaping occurs inside the closed loop. Continuing along these lines, it is possible to make a SIL system mathematically equivalent to a system with a preshaped input. Consider the SIL system of FIG. 77, in which a shaper of transfer function S is inserted in the feed-forward branch of the loop and the inverse shaper $S^{-1}$ is inserted in the feed-back branch. This system has the same overall system transfer function as the system of FIG. 78 in which the shaping occurs external to the closed loop. This is because the loop transfer function contains both S and $S^{-1}$, which cancel each other, resulting in the original loop dynamics for signals circulating in the loop; while reference inputs effectively pass through S only once. It is to be understood that S is used here as a matter of convenience and is not meant to imply a specific type of transfer function. For example, in the case of digital systems, S may be the ratio of two z-transform polynomials; while in the analog case, S may represent a Laplace transform. Note that in an actual application using a digital controller, the cancellation would be implemented in a control computer. Since the implemented filter and its inverse are known exactly, the degree of cancellation depends only on the numeric precision of the computer.

Insertion of the inverse filter in the feedback branch eliminates the phase and gain modifications caused by the shaper inserted in the feed forward branch, effectively converting the SIL system to a prefiltered system. Therefore, for this implementation, the SIL filter is tuned to the closed loop vibration frequency to be cancelled.

Other filters besides $S^{-1}$ may be inserted into the feedback path to partially (instead of totally) eliminate the phase and gain effects of the feed forward SIL filter. For example the filter $[(1-\alpha)+\alpha S^{-1}]$, where $0<\alpha<1$, can be inserted in the feedback branch. At $\alpha=1$, the phase and gain effects of the feed forward SIL filter are completely eliminated, and the system behaves as in FIG. 77, or equivalently FIG. 78. At $\alpha=0$, the system behaves as in FIG. 76 and the phase and gain effects of the feed forward SIL filter are unaltered. Thus, varying $\alpha$ from 0 to 1 effectively continuously varies the filter action from inside the loop to outside the loop.

Phase and gain effects due to a SIL filter inserted in the feed forward path can also be modified by modifying the SIL filter itself. Shorter length filters have decreased phase lag and gains that tend to increase with frequency. The shortest filters have negative going pulses that can approximate derivative action. Using a short length SIL filter may allow compensation of both the phase and gain curves resulting in increased bandwidth.

Least Squares Solutions to Constraint Equations

In some aspects of the invention, an optimization is required in order to determine the appropriate impulse sequence and an optimization routine such as GAMS may be used for this purpose. However, the difficulty in this approach is that the equations considered may have many locally optimal solutions and finding the globally optimal answer then requires human intervention and experience in selecting initial guesses. One approach that relieves this problem is to use a least-squares formulation in the optimization. For example, eqn 1 gives the percent residual vibration of a system as a function of the frequency $\omega$. For convenience, use $V_{act}(\omega)$ to denote the % vibration of eqn. 1. Ideally, this expression should be as low as possible over a band of frequencies around the expected system frequency. One way to achieve this goal is to select sample points which span a band of frequencies. For example, the nine points [0.80, 0.85, 0.90, 0.95, 1.00, 1.05, 1.10, 1.15, 1.20] could be used to span the frequency band from 0.8 to 1.2 Hz. $V_{act}(\omega)$ is then evaluated at each of the sample frequencies and an error measure $$\text{Err} = \Sigma [V_{des}(\omega_i) - V_{act}(\omega_i)]^2$$

is formulated, where $\omega_i$ are the sample frequencies and $V_{des}(\omega_i)$ is the desired frequency response. Err is then minimized by varying the values of $A_i$ and $t_i$ in the expressions for $V_{act}$. The minimization can be achieved efficiently because the partial derivatives of Err with respect to the unknowns $A_i$ and $t_i$ can be derived analytically and used in a standard numerical least-squares algorithm.

Furthermore, if the sequence is digitized at a time spacing dt, then the only unknowns will be the amplitudes $A_i$, which appear linearly in the expression for $V_{act}$. In this case, the problem is simplified and the solution may be obtained directly by setting all the partial derivatives equal to zero. This approach may result in negative values for the $A_i$. If positive $A_i$ are required, then the numerical approach described previously may be coupled with the non-negative constraint in order to find the desired solution.

The advantage of the least-squares approach is two-fold. First, the required numerical optimization is simpler and better behaved, thus requiring less human intervention and past experience in order to obtain a good solution. Second, the approach is better since the problem formulation directly, rather than indirectly, constrains the residual vibration at many frequencies, which is the goal of the invention.

Miscellaneous Shaping Applications

The invention has been discussed primarily in the context of controlling the motion of a mechanical system, in general, and of a robotic arm with one or two modes of vibration, in particular. However, it should be understood that the invention is not restricted to these cases. It is also applicable to other types of dynamic systems, including electrical and chemical systems and to systems with more than two modes of vibration.

For example, to control the altitude of weather balloons, ballast is released to gain altitude and gas is vented to lower altitude. When altitude changes are made in this manner, the balloon will usually oscillate about the new altitude with a predictable frequency. The altitude control effort can be shaped to greatly reduce oscillations in altitude. For example, a release of 10 lbs. of ballast shaped by a ZVD shaper would result in the dropping of 2.5 lbs. initially, then 5 lbs. after one half period of the vibration, and finally, the remaining 2.5 lbs. would be dropped after one period of vibration.

Finally, although the above examples have utilized impulse sequences, it should be understood that sequences of finite duration pulses may be used instead. The pulses or impulses can be constrained to begin and/or end at specified intervals, as is the case with impulses designed for use with systems which are discretized in time, and they may also be constrained to have specified amplitudes. In addition, pulses may be fixed in amplitude but variable in duration or fixed in duration but variable in amplitude.

Figure 79:
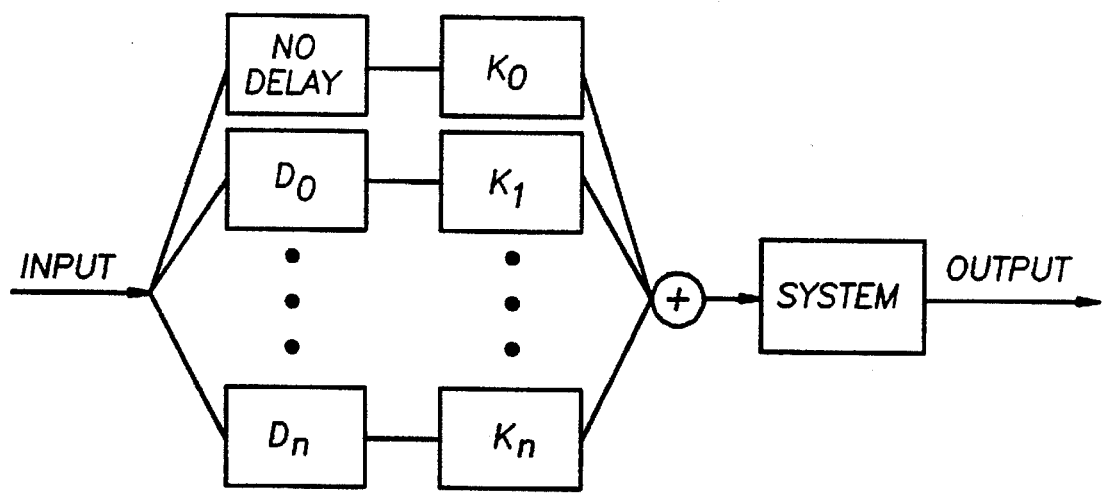
FIG. 79 is a schematic illustration of the invention disclosed herein.

The invention may be implemented in a variety of ways. One example has been illustrated in U.S. Pat. No. 4,916,635, incorporated herein by reference. As shown in FIG. 79, an input is shaped using one of the methods described previously and the shaped input is used to drive the dynamic system. Shaping the input comprises convolving the input with a series of impulse sequences, or equivalently, as shown in FIG. 79, delaying and scaling the input by various time delays and gain factors and then summing the delayed and scaled inputs to form the shaped input. Different impulses sequences may be used, as disclosed herein, to achieve different characteristics for the shaped input or for the response of the dynamic system.

What is claimed is:

1. A method for controlling a physical system by generating an input to the system to minimize unwanted dynamics in the system response comprising;

establishing expressions quantifying the unwanted dynamics;

establishing first constraints bounding an available input to the dynamic system;

establishing second constraints bounding the unwanted dynamics;

finding a solution which allows maximum variations in physical system characteristics and is used to generate the input while still satisfying the first and second constraints; and controlling the physical system based on the input to the physical system whereby unwanted dynamics are minimized.

2. The method of claim 1 wherein the solution is a sequence of impulses which satisfies the first and second constraints while allowing maximum variations in physical system characteristics.

3. The method of claim 1 wherein the solution is a sequence of pulses of finite duration which satisfies the first and second constraints while allowing maximum variations in physical system characteristics.

4. The method of claim 1 wherein the solution is a sequence of impulses or pulses that begin at specified time intervals.

5. The method of claim 1 wherein the solution is a sequence of impulses or pulses which have specified amplitudes.

6. The method of claim 1 wherein the solution is a sequence of pulses which are fixed in amplitude but variable in duration.

7. The method of claim 1 wherein the solution is a sequence of impulses or pulses which are variable in amplitude but fixed in duration.

8. The method of claim 1 wherein the physical system is an electrical system.

9. The method of claim 1 wherein the physical system is a mechanical system.

10. The method of claim 1 wherein the physical system is a chemical system.

11. The method of claim 1 wherein the dynamic system has a single vibrational mode characterized by an undamped natural frequency $\omega$ and non-zero damping ratio $\zeta$; and the second constraint comprises bounding residual vibrations in the physical system.

12. The method of claim 11 wherein the solution is a sequence of n impulses of amplitude $A_i$ and location $t_i$, for $i=1 \ldots n$, with $t_1=0$;

the expression quantifying the unwanted dynamics is $$R(\Omega) = \exp(-\zeta \Omega t_N)\{[\Sigma A_i \exp(\zeta \Omega_i) \cos(m\Omega t_i)]^2 + [\Sigma A_i \exp(\zeta \Omega_i) \sin(m\Omega t_i)]^2\}^{1/2}$$

where $m=(1-\zeta^2)^{1/2}$, $R(\Omega)$ is the ratio of the residual vibration produced by the sequence of impulses to the residual vibration produced by a single impulse of amplitude $\Sigma A_i$, if the physical system had an undamped natural frequency $\Omega$, and the summation is over i=1 ... n; and the second constraint further comprises selecting a maximum V bounding the residual vibration $R(\Omega)$.

13. The method of claim 12 wherein the impulses are based on a first set of equations $$\sum_{i=1}^{n} A_i = 1$$

$R(\omega)=0$ $R(\omega_{lo,k})=V$ and $R(\omega_{hi,k})=V$ for odd $k$ $R(\omega_{lo,k})=0$ and $R(\omega_{hi,k})=0$ for even $k$ $dR(\omega_{lo,k})/d\Omega=0$ and $dR(\omega_{hi,k})/d\omega=0$ for odd $k$ where k=1 ... Q, Q is the number of humps in $R(\Omega)$, and $\omega_{lo,Q}<\omega_{lo,Q-1}< ... <\omega_{lo,1}<\omega<\omega_{hi,1}< ... <\omega_{hi,Q-1}<\omega_{hi,Q}$, for even Q; or a first set of equations $$\sum_{i=1}^{n} A_i = 1$$

$R(\omega)=V$ $dR(\omega)/d\Omega=0$ $R(\omega_{lo,k})=0$ and $R(\omega_{hi,k})=0$ for odd $k$ $R(\omega_{lo,k})=V$ and $R(\omega_{hi,k})=V$ for even $k$ $dR(\omega_{lo,k})/d\Omega=0$ and $dR(\omega_{hi,k})/d\Omega=0$ for even $k$ where k=1 ... Q, Q is the number of humps in $R(\Omega)$, and $\omega_{lo,Q}<\omega_{lo,Q-1}< ... <\omega_{lo,1}<\omega<\omega_{hi,1}< ... <\omega_{hi,Q-1}<\omega_{hi,Q}$, for odd Q.

14. The method of claim 13 wherein the sequence of impulses is based on an approximate solution to the first set of equations.

15. The method of claim 14 wherein the number of impulses is three and the approximate solution is $A_1=0.2497+0.2496V+0.8001\zeta+1.233V\zeta+0.4960\zeta^2+3.173V\zeta^2$ $A_2=1-(A_1+A_3)$ $A_3=0.2515+0.2147V-0.8325\zeta+1.415V\zeta+0.8518\zeta^2-4.901V\zeta^2$ $t_1=0$ $t_2=(0.5000+0.4616V\zeta+4.262V\zeta^2+1.756V\zeta^3+8.578V^2\zeta-108.6V^2\zeta^2+337.0V^2\zeta^3)T_d$ $t_3=T_d$ where $$T_d = \frac{2\pi}{\omega\sqrt{1-\zeta^2}}$$

16. The method of claim 14 wherein the number of impulses is four, V=0.05 and the approximate solution is $A_1=0.1608+0.7475\zeta+1.948\zeta^2-0.4882\zeta^3$ $A_2=1-(A_1+A_3+A_4)$ $A_3=0.3394-0.5466\zeta-1.1354\zeta^2+2.6167\zeta^3$ $A_4=0.1589-0.5255\zeta+0.4152\zeta^2+1.0164\zeta^3$ $t_1=0$ $t_2=(0.5000+0.1426\zeta-0.6243\zeta^2+6.590\zeta^3)T_d$ $t_3=(1.0+0.17226\zeta-1.725\zeta^2+10.058\zeta^3)T_d$ $t_4=T_d$ where $$T_d = \frac{2\pi}{\omega\sqrt{1-\zeta^2}}$$

17. The method of claim 1 wherein the dynamic system has a single vibrational mode characterized by an undamped natural frequency $\omega$ and a damping ratio $\zeta=0$;

the solution is a sequence of four impulses of amplitude $A_i$ and location $t_i$;

the expression quantifying the unwanted dynamics is $R(\Omega)=\{[\Sigma A_i \cos(\Omega t_i)]^2+[\Sigma A_i \sin(\Omega t_i)]^2\}^{1/2}$ where $R(\Omega)$ is the ratio of the residual vibration produced by the sequence of impulses to the residual vibration produced by a single impulse of amplitude $\Sigma A_i$, if the physical system had a natural frequency $\Omega$;

the second constraint comprises selecting a maximum V bounding the residual vibration $R(\Omega)$; and the four impulses are defined by the equations $A_1=(3x^2+2x+3V^2)/(16x)$ $A_2=0.5-(3x^2+2x+3V^2)/(16x)$ $A_3=0.5-(3x^2+2x+3V^2)/(16x)$ $A_4=(3x^2+2x+3V^2)/(16x)$ $t_1=0$ $t_2=0.5T_d$ $t_3=T_d$ $t_4=1.5T_d$ where $$x = \{V^2(\sqrt{1-V^2}+1)\}^{\frac{1}{3}}$$

and $T_d=2\pi/\omega$

18. The method of claim 1 wherein the dynamic system has p vibrational modes characterized by undamped natural frequencies $\omega_i$ and damping ratios $\zeta_i$, i=1 ... p, establishing p sets of constraint equations with the equations representing the first and second series of constraints, and finding a solution which allows maximum variations in physical system characteristics while still satisfying the p sets of constraints.

19. A method for controlling a physical system by generating an input to the system to minimize unwanted dynamics in the system response comprising;

establishing expressions quantifying the unwanted dynamics;

establishing first constraints bounding an available input to the dynamic system;

establishing second constraints bounding the unwanted dynamics;

finding a minimum length solution which is used to generate the input while satisfying the first and second constraints; and controlling the physical system based on the input to the physical system whereby unwanted dynamics are minimized.

20. The method of claim 19 wherein the solution is a minimum length sequence of impulses which satisfies the first and second constraints.

21. The method of claim 19 wherein the solution is a minimum length sequence of pulses of finite duration which satisfies the first and second constraints.

22. The method of claim 19 wherein the solution is a sequence of impulses or pulses that begin at specified time intervals.

23. The method of claim 19 wherein the solution is a sequence of impulses or pulses which have specified amplitudes.

24. The method of claim 19 wherein the solution is a sequence of pulses which are fixed in amplitude but variable in duration.

25. The method of claim 19 wherein the solution is a sequence of impulses or pulses which are variable in amplitude but fixed in duration.

26. The method of claim 19 wherein the physical system is an electrical system.

27. The method of claim 19 wherein the physical system is a mechanical system.

28. The method of claim 19 wherein the physical system is an chemical system.

29. The method of claim 19 wherein the dynamic system is characterized by an undamped natural frequency $\omega$ and damping ratio $\zeta$, and the second constraint comprises bounding residual vibrations in the physical system.

30. The method of claim 29 wherein the solution is a sequence of an odd number n impulses of amplitude $A_i$ and location $t_i$, for $i=1 \ldots n$, with $t_1=0$;

the expression quantifying the unwanted dynamics is $$R(\Omega) = \exp(-\zeta\Omega t_N)\{[\Sigma A_i \exp(\zeta\Omega t_i) \cos(m\Omega t_i)]^2 + [\Sigma A_i \exp(\zeta\Omega t_i) \sin(m\Omega t_i)]^2\}^{1/2}$$

where $m=(1-\zeta^2)^{1/2}$, $R(\Omega)$ is the ratio of the residual vibration produced by the sequence of impulses to the residual vibration produced by a single impulse of amplitude $\Sigma A_i$, if the physical system had an undamped natural frequency $\Omega$, and the summation is over $i=1 \ldots n$;

the second constraint further comprises selecting a maximum V bounding the residual vibration $R(\Omega)$; and the impulse sequence is based on a first set of equations $$A_1 = P$$

$$A_i = 2P(-1)^{i-1} \text{ for } i=2 \ldots n-1$$

$$A_n = P+1$$

where P is a pre-selected peak partial sum bounding the input; and on a second set of equations $$R(\omega) = 0$$

$R(\omega_{lo,k})=V$ and $R(\omega_{hi,k})=V$ for odd $k$ $R(\omega_{lo,k})=0$ and $R(\omega_{hi,k})=0$ for even $k$ $dR(\omega_{lo,k})/d\Omega=0$ and $dR(\omega_{hi,k})/d\Omega=0$ for odd $k$ where $k=1 \ldots Q$, Q is the number of humps in $R(\Omega)$, and $\omega_{lo,Q} < \omega_{lo,Q-1} < \ldots < \omega_{lo,1} < \omega < \omega_{hi,1} < \ldots < \omega_{hi,Q-1} < \omega_{hi,Q}$, for even Q; or a second set of equations $$R(\omega) = V$$

$$dR(\omega)/d\Omega = 0$$

$R(\omega_{lo,k})=0$ and $R(\omega_{hi,k})=0$ for odd $k$ $R(\omega_{lo,k})=V$ and $R(\omega_{hi,k})=V$ for even $k$ $dR(\omega_{lo,k})/d\Omega=0$ and $dR(\omega_{hi,k})/d\Omega=0$ for even $k$ where $k=1 \ldots Q$, Q is the number of humps in $R(\Omega)$, and $\omega_{lo,Q} < \omega_{lo,Q-1} < \ldots < \omega_{lo,1} < \omega < \omega_{hi,1} < \ldots < \omega_{hi,Q-1} < \omega_{hi,Q}$, for odd Q.

31. The method of claim 30 wherein the locations $t_i$ of the impulses are based on an approximate solution to the second set of equations.

32. The method of claim 31 wherein V=0.05, P=1 and the approximate solution is:

$$t_1 = 0$$

$$t_2 = (0.15687 + 0.24004\zeta + 0.20367\zeta^2)T_d$$

$$t_3 = (0.28151 + 0.10650\zeta + 0.09280\zeta^2)T_d$$

$$t_4 = (0.63431 + 0.33886\zeta - 0.12776\zeta^2)T_d$$

$$t_5 = (0.68414 + 0.18236\zeta + 0.00839\zeta^2)T_d$$

where $$T_d = \frac{2\pi}{\omega\sqrt{1-\zeta^2}}.$$

33. The method of claim 31 wherein V=0.05, P=2 and the approximate solution is:

$$t_1 = 0$$

$$t_2 = (0.11955 + 0.16127\zeta + 0.05206\zeta^2)T_d$$

$$t_3 = (0.26356 + 0.12551\zeta - 0.03963\zeta^2)T_d$$

$$T_4 = (0.49804 + 0.15508\zeta - 0.24101\zeta^2)T_d$$

$$t_5 = (0.56866 + 0.04558\zeta - 0.18732\zeta^2)T_d$$

where $$T_d = \frac{2\pi}{\omega\sqrt{1-\zeta^2}}.$$

34. The method of claim 31 wherein V=0.05, P=3 and the approximate solution is:

$$t_1 = 0$$

$$t_2 = (0.10219 + 0.12192\zeta + 0.01197\zeta^2)T_d$$

$$t_3 = (0.24639 + 0.11404\zeta - 0.07655\zeta^2)T_d$$

$$t_4 = (0.44526 + 0.11468\zeta - 0.22230\zeta^2)T_d$$

$$t_5 = (0.51719 + 0.02439\zeta - 0.19225\zeta^2)T_d$$

where $$T_d = \frac{2\pi}{\omega\sqrt{1-\zeta^2}}.$$

35. The method of claim 31 wherein V=0.10, P=1 and the approximate solution is:

$$t_1=0$$
$$t_2=(0.16136+0.24772\zeta+0.31367\zeta^2)T_d$$
$$t_3=(0.28547+0.11044\zeta+0.19967\zeta^2)T_d$$
$$t_4=(0.63719+0.33687\zeta-0.14612\zeta^2)T_d$$
$$t_5=(0.68919+0.17941\zeta-0.01215\zeta^2)T_d$$

where $$T_d = \frac{2\pi}{\omega\sqrt{1-\zeta^2}}.$$

36. The method of claim 31 wherein V=0.10, P=2 and the approximate solution is:

$$t_1=0$$
$$t_2=(0.12207+0.16808\zeta+0.07038\zeta^2)T_d$$
$$t_3=(0.26661+0.13190\zeta-0.01971\zeta^2)T_d$$
$$t_4=(0.50210+0.15873\zeta-0.22743\zeta^2)T_d$$
$$t_5=(0.57439+0.04813\zeta-0.17499\zeta^2)T_d$$

where $$T_d = \frac{2\pi}{\omega\sqrt{1-\zeta^2}}.$$

37. The method of claim 31 wherein V=0.10, P=3 and the approximate solution is:

$$t_1=0$$
$$t_2=(0.10412+0.12667\zeta+0.02201\zeta^2)T_d$$
$$t_3=(0.24916+0.11908\zeta-0.06480\zeta^2)T_d$$
$$t_4=(0.44925+0.11835\zeta-0.21300\zeta^2)T_d$$
$$t_5=(0.52261+0.02720\zeta-0.18377\zeta^2)T_d$$

where $$T_d = \frac{2\pi}{\omega\sqrt{1-\zeta^2}}.$$

38. The method of claim 29 wherein establishing the second constraint comprises constraining the unwanted dynamics at frequencies different from the natural frequency $\omega$.

39. The method of claim 29 further comprising using a low-pass filter to control unwanted dynamics at frequencies different from the natural frequency $\omega$.

40. The method of claim 19 wherein establishing the first constraint comprises selecting a peak partial sum for the inputs and the partial sums of the inputs are constrained to stay at or below this peak partial sum.

41. The method of claim 40 wherein the peak partial sum of the inputs is chosen based on the peak physical input to the physical system.

42. The method of claim 19 wherein establishing the first constraint comprises selecting a peak duty cycle for the inputs and the duty cycles of the inputs are constrained to stay at or below this peak duty cycle.

43. The method of claim 42 wherein the peak duty cycle for the inputs is chosen based on the peak duty cycle of the physical input to the physical system.

44. The method of claim 19 wherein the dynamic system has p vibrational modes characterized by undamped natural frequencies $\omega_i$ and damping ratios $\zeta_i$, i=1 ... p, establishing p sets of constraint equations with the equations representing the first and second series of constraints, and finding a minimum length solution while still satisfying the p sets of constraints.

45. The method of claim 19 wherein the solution is a sequence of an odd number, n, of impulses, which amplitude are given by $$A_i=1 \text{ if } i=1 \text{ or } n$$
$$A_i=2(-1)^{i-1}$$

otherwise.

46. The method of claim 19 wherein the solution is a sequence of an even number of impulses, which amplitude are given by $$A_i=(-1)^{i-1}.$$

47. The method of claim 45 wherein the dynamic system is modelled as M masses, $m_1, m_2, \ldots m_M$, connected by springs, and has p vibrational modes each characterized by an undamped natural frequency $\omega_i$ and damping ratio $\zeta_i$, i=1 ... p; and the locations of the impulses are defined by the equation $$x_d = \iint \frac{u(t)}{\Sigma m} dt$$

where $\Sigma m$ is the sum of the M masses and $x_d$ is a preselected distance to be moved, and the equations $$V = e^{-\zeta\omega t_n}\{(\Sigma A_i e^{\zeta\omega t_i}\sin(\omega\sqrt{1-\zeta^2}\ t_i))^2 +$$
$$(\Sigma A_i e^{\zeta\omega t_i}\cos(\omega\sqrt{1-\zeta^2}\ t_i))^2\}^{1/2}$$

$$0 = e^{-\zeta\omega_{hi} t_n}\{(\Sigma A_i e^{\zeta\omega_{hi} t_i}\sin(\omega_{hi}\sqrt{1-\zeta^2}\ t_i))^2 +$$
$$(\Sigma A_i e^{\zeta\omega_{hi} t_i}\cos(\omega_{hi}\sqrt{1-\zeta^2}\ t_i))^2\}^{1/2}$$

$$0 = e^{-\zeta\omega_{low} t_n}\{(\Sigma A_i e^{\zeta\omega_{low} t_i}\sin(\omega_{low}\sqrt{1-\zeta^2}\ t_i))^2 +$$
$$(\Sigma A_i e^{\zeta\omega_{low} t_i}\cos(\omega_{low}\sqrt{1-\zeta^2}\ t_i))^2\}^{1/2}$$

$$0 = \frac{d}{d\omega}(e^{-\zeta\omega t_n}\{(\Sigma A_i e^{\zeta\omega t_i}\sin(\omega\sqrt{1-\zeta^2}\ t_i))^2 +$$
$$(\Sigma A_i e^{\zeta\omega t_i}\cos(\omega\sqrt{1-\zeta^2}\ t_i))^2\}^{1/2})$$

for each of the p modes, where $\omega$ and $\zeta$ are the undamped natural frequency and damping constant for the mode, $t_i$ is the location of the ith impulse, $t_1$ has been arbitrarily set to 0, V is the bound on the residual vibrations of the physical system, and $\omega_{hi}$ and $\omega_{low}$ are a frequency above and below the natural frequency $\omega$ for which the residual vibration is reduced to zero.

48. The method of claim 47 wherein M=2, p=1, and n=7.

49. The method of claim 19 further comprising:
establishing third constraints bounding variations in physical system characteristics;
finding a minimum length solution which is used to generate the input while satisfying the first, second and third constraints; and
controlling the physical system based on the input to the physical system whereby unwanted dynamics are minimized.

50. The method of claim 49 wherein the solution is a minimum length sequence of impulses which satisfies the first, second and third constraints; and finding the minimum length solution comprises first determining the number of impulses required, and then determining the amplitudes and locations of each impulse.

51. The method of claim 50 wherein determining the number of impulses required comprises the use of a decision tree.

52. The method of claim 51 wherein the dynamic system is characterized by an undamped natural frequency $\omega$ and damping ratio $\zeta$; the second constraint comprises selecting a bound, V=0.05, on the residual vibrations of the physical system; the third constraint comprises selecting an insensitivity, I, bounding the variation of $\omega$; and the number of impulses is determined by using the following decision tree:

if $I<0.06363+0.01044\zeta+0.07064\zeta^2+0.40815\zeta^3$, then the number of impulses=2;

if $I<0.3991+0.6313\zeta+0.3559\zeta^2+2.3052\zeta^3$ and $I>0.06363+0.01044\zeta+0.07064\zeta^2+0.40815\zeta^3$, then the number of impulses=3;

if $I>0.3991+0.6313\zeta+0.3559\zeta^2+2.3052\zeta^3$ then the number of impulses=4.

53. The method of claim 49 wherein the dynamic system has a single vibrational mode characterized by an undamped natural frequency $\omega$ and damping ratio $\zeta$; the second constraint comprises bounding the residual vibrations in the physical system; and the third constraint comprises bounding the variation on $\omega$.

54. The method of claim 49 wherein the dynamic system has a single vibrational mode characterized by an undamped natural frequency $\omega$ and damping ratio $\zeta$; the second constraint comprises bounding the residual vibrations in the physical system; and the third constraint comprises bounding the variation on $\zeta$.

55. A method for controlling a physical system by generating an input to the system to minimize unwanted dynamics in the system response comprising;
establishing expressions quantifying the unwanted dynamics;
establishing first constraints bounding an available input to the dynamic system;
establishing second constraints on variation in system response with variations in the physical system characteristics;
finding a minimum length solution which is used to generate the input while satisfying the first and second constraints; and
controlling the physical system based on the input to the physical system whereby unwanted dynamics are minimized.

56. The method of claim 55 wherein the solution is a minimum length sequence of impulses which satisfies the first and second constraints.

57. The method of claim 55 wherein the solution is a minimum length sequence of pulses of finite duration which satisfies the first and second constraints.

58. The method of claim 55 wherein the solution is a sequence of impulses or pulses that begin at specified time intervals.

59. The method of claim 55 wherein the solution is a sequence of impulses or pulses which have specified amplitudes.

60. The method of claim 55 wherein the solution is a sequence of pulses which are fixed in amplitude but variable in duration.

61. The method of claim 55 wherein the solution is a sequence of impulses or pulses which are viable in amplitude but fixed in duration.

62. The method of claim 55 wherein the physical system is an electrical system.

63. The method of claim 55 wherein the physical system is a mechanical system.

64. The method of claim 55 wherein the physical system is an chemical system.

65. The method of claim 55 wherein the dynamic system has a single vibrational mode characterized by an undamped natural frequency $\omega$ and damping ratio $\zeta$; and the solution is a sequence of impulses or pulses of finite duration.

66. The method of claim 65 wherein the sequence contains an odd number, n, of impulses with amplitudes given by the following equations:

$$A_1=P$$

$$A_i=2P(-1)^{i-1} \text{ for } 1<i<n$$

$$A_n=P+1$$

where P is a pre-selected peak partial sum for the inputs.

67. The method of claim 66 wherein n=3, the damping ratio $\zeta=0$ and the locations of the three impulses are defined by the equations $$t_1=0$$

$$t_2 = \frac{T}{2\pi} \cos^{-1}\left( \frac{4P^2-2P-1}{4P^2} \right)$$

$$t_3 = \frac{T}{2\pi} \cos^{-1}\left( \frac{2P^2-2P-1}{2P(P+1)} \right)$$

where $T=2\pi/\omega$.

68. The method of claim 66 wherein n=3, P=1, and the locations of the three impulses are approximated by the following equations $$t_1=0$$

$$t_2=(0.20963+0.22433\zeta)T_d$$

$$t_3=(0.29027+0.08865\zeta+0.02646\zeta^2)T_d$$

where $$T_d = \frac{2\pi}{\omega\sqrt{1-\zeta^2}}.$$

69. The method of claim 66 wherein n=3, P=2, and the locations of the three impulses are approximated by the following equations $t_1=0$ $t_2=(0.12929+0.09393\zeta-0.06204\zeta^2)T_d$ $t_3=(0.20975+0.02418\zeta-0.07474\zeta^2)T_d$ where $$T_d = \frac{2\pi}{\omega\sqrt{1-\zeta^2}}.$$

70. The method of claim 66 wherein n=3, P=3, and the locations of the three impulses are approximated by the following equations $t_1=0$ $t_2=(0.10089+0.05976\zeta-0.05376\zeta^2)T_d$ $t_3=(0.17420+0.01145\zeta-0.07317\zeta^2)T_d$ where $$T_d = \frac{2\pi}{\omega\sqrt{1-\zeta^2}}.$$

71. The method of claim 66 wherein n=3, and the location of the third impulse is approximated by the equation $$t_3 = \frac{\sqrt{1-\zeta^2}}{4\pi\zeta} \ln\left\{\frac{P^2}{(P+1)^2}[1+4e^{2\zeta\omega t_2}-4e^{\zeta\omega t_2}\cos(\omega dt_2)]\right\} T_d$$

72. The method of claim 66 wherein n=5, P=1, and the locations of the five impulses are approximated by the following equations:

$t_1=0$ $t_2=(0.15236+0.23230\zeta+0.09745\zeta^2)T_d$ $t_3=(0.27750+0.10237\zeta-0.00612\zeta^2)T_d$ $t_4=(0.63139+0.33716\zeta-0.07724\zeta^2)T_d$ $t_5=(0.67903+0.18179\zeta-0.06008\zeta^2)T_d$ where $$T_d = \frac{2\pi}{\omega\sqrt{1-\zeta^2}}.$$

73. The method of claim 66 wherein n=5, P=2, and the locations of the five impulses are approximated by the following equations:

$t_1=0$ $t_2=(0.11700+0.15424\zeta+0.03449\zeta^2)T_d$ $t_3=(0.26041+0.11899\zeta-0.05910\zeta^2)T_d$ $t_4=(0.49378+0.15092\zeta-0.25380\zeta^2)T_d$ $t_5=(0.56273+0.04255\zeta-0.19898\zeta^2)T_d$ where $$T_d = \frac{2\pi}{\omega\sqrt{1-\zeta^2}}.$$

74. The method of claim 66 wherein n=5, P=3, and the locations of the five impulses are approximated by the following equations:

$t_1=0$ $t_2=(0.10022+0.11695\zeta+0.00246\zeta^2)T_d$ $t_3=(0.24352+0.10877\zeta-0.08790\zeta^2)T_d$ $t_4=(0.44109+0.11059\zeta-0.23127\zeta^2)T_d$ $t_5=(0.51155+0.02121\zeta-0.20054\zeta^2)T_d$ where $$T_d = \frac{2\pi}{\omega\sqrt{1-\zeta^2}}.$$

75. A method for controlling a physical system by generating an input to a dynamic system with p vibrational modes characterized by undamped natural frequencies $\omega$ and damping ratios $\zeta_i$, i=1 . . . p, to minimize unwanted dynamics in the physical system response comprising:

defining a sequence of n=2p+1 impulses by the equations $$\sum_{i=1}^{n} A_i e^{\zeta\omega t_i}\sin(t_i\omega\sqrt{1-\zeta^2})=0$$

$$\sum_{i=1}^{n} A_i e^{\zeta\omega t_i}\cos(t_i\omega\sqrt{1-\zeta^2})=0$$

$$\sum_{i=1}^{n} A_i t_i e^{\zeta\omega t_i}\sin(t_i\omega\sqrt{1-\zeta^2})=0$$

$$\sum_{i=1}^{n} A_i t_i e^{\zeta\omega t_i}\cos(t_i\omega\sqrt{1-\zeta^2})=0$$

for each of the p vibrational modes, $$\sum_{i=1}^{n} A_i = 1$$

$t_1=0$ $A_i \geq 0$ where $A_i$ are the amplitudes of the impulses and $t_i$ are the locations of the impulses; approximating the solution to the defining equations; and controlling the physical system based on the generated input to the physical system whereby unwanted dynamics are minimized.

76. The method of claim 75 wherein p=2 and the solutions to the equation are approximated by the following equations $A_1=0.1033-0.0899r+0.0459r^2+0.2465\zeta+0.2411r\zeta+0.0155r^2\zeta$ $A_2=0.0446+0.2903r-0.1005r^2+1.5768\zeta-0.9519r\zeta+0.2216r^2\zeta$ $A_3=0.7030-0.3964r+0.1076r^2-1.4736\zeta+1.5214r\zeta-0.4604r^2\zeta$ $A_4=0.0451+0.2846r-0.0982r^2+0.3336\zeta-1.4657r\zeta+0.4953r^2\zeta$ $A_5=0.1037-0.0884r+0.0452r^2-0.6813\zeta+0.6529r\zeta-0.2714r^2\zeta$ $t_1 = 0$ $t_2 = (0.753 - 0.306r + 0.047r^2 + 2.017\zeta - 2.694r\zeta + 0.889r^2\zeta - 12.796\zeta^2 + 16.342r\zeta^2 - 4.860r^2\zeta^2)t_d$ $t_3 = (1.453 - 0.551r + 0.0788r^2 - 0.143\zeta + 0.232r\zeta - 0.0599r^2\zeta + 3.687\zeta^2 - 4.543r\zeta^2 + 1.519r^2\zeta^2)t_d$ $t_4 = (2.208 - 0.858r + 0.127r^2 + 2.052\zeta - 2.662r\zeta + 0.857r^2\zeta - 9.054\zeta^2 + 12.045r\zeta^2 - 3.561r\zeta^2)t_d$ $t_5 = (2.908 - 1.102r + 0.158r^2 + 0.757\zeta - 0.821r\zeta + 0.205r^2\zeta + 5.150\zeta^2 - 6.010r\zeta^2 + 2.001r^2\zeta^2)t_d$ where $$r = \frac{max(\omega_1, \omega_2)}{min(\omega_1, \omega_2)}, \zeta = \frac{\zeta_1 + \zeta_2}{2}, t_d = \frac{2\pi}{min(\omega_1, \omega_2)}.$$

77. A method for controlling a physical system by generating an input to the system to minimize unwanted dynamics in the system response comprising;
  establishing first constraints on a sequence of impulses which minimize the unwanted dynamics;
  determining a first sequence of impulses which satisfies the first constraints;
  determining a second sequence of impulses, which is discretized in locations and is used to generate the input, by determining the number of impulses and the locations of the impulses of the second sequence based on the first sequence;
  determining the amplitudes of the second sequence to satisfy second constraints based on the first constraints; and
  controlling the physical system based on the input to the physical system whereby unwanted dynamics are minimized.

78. The method of claim 77 wherein the first sequence is a sequence of n impulses and the second sequence is a sequences of 2n−1 impulses.

79. The method of claim 78 wherein
  the dynamic system has a single vibrational mode characterized by an undamped natural frequency $\omega$ and non-zero damping ratio $\zeta$;
  the constraints are given by the equations $$\sum_{i=1}^{n} A_i e^{-\zeta\omega(t-t_i)} \sin(t_i\omega\sqrt{1-\zeta^2}) = 0$$

$$\sum_{i=1}^{n} A_i e^{-\zeta\omega(t-t_i)} \cos(t_i\omega\sqrt{1-\zeta^2}) = 0$$

$$\sum_{i=1}^{n} A_i t_i e^{-\zeta\omega(t-t_i)} \sin(t_i\omega\sqrt{1-\zeta^2}) = 0$$

$$\sum_{i=1}^{n} A_i t_i e^{-\zeta\omega(t-t_i)} \cos(t_i\omega\sqrt{1-\zeta^2}) = 0$$

$$t_1 = 0$$

$$\sum_{i=1}^{n} A_i = 1$$

$$A_i \geq 0$$

where $A_i$ and $t_i$ are the amplitudes and locations of the impulses;
  the first sequence is a three-impulse sequence which satisfies the constraints; and
  the second sequence is a five-impulse sequence which satisfies the constraints, the locations of the impulses being given by $t_1 = 0.0$ $t_2 = dt * floor(t/dt)$ $t_3 = t_2 + dt$ $t_4 = dt * floor(2*t/dt)$ $t_5 = t_4 + dt$ where t is the time between impulses for the three-impulse sequence and dt is the time increment for the discretized times, and the amplitudes being given by $$A = M^{-1} V$$

where $$A = \begin{bmatrix} A_0 \\ A_1 \\ A_2 \\ A_3 \\ A_4 \end{bmatrix},$$

$$M = \begin{bmatrix} 1 & 1 & 1 & 1 & 1 \\ B_0 S_0 & B_1 S_1 & B_2 S_2 & B_3 S_3 & B_4 S_4 \\ B_0 C_0 & B_1 C_1 & B_2 C_2 & B_3 C_3 & B_4 C_4 \\ t_0 B_0 S_0 & t_1 B_1 S_1 & t_2 B_2 S_2 & t_3 B_3 S_3 & t_4 B_4 S_4 \\ t_0 B_0 C_0 & t_1 B_1 C_1 & t_2 B_2 C_2 & t_3 B_3 C_3 & t_4 B_4 C_4 \end{bmatrix},$$

$$V = \begin{bmatrix} 1 \\ 0 \\ 0 \\ 0 \\ 0 \end{bmatrix},$$

$B_i = e^{-\zeta\omega t_i}$, $S_i = \sin(t_i\omega\sqrt{1-\zeta^2})$, and $C_i = \cos(t_i\omega\sqrt{1-\zeta^2})$.

80. A method for controlling a physical system by generating an input to a dynamic physical system to reduce the deviation between the shape of a trajectory traversed by a point in the physical system and a pre-selected shape comprising:
  establishing constraints on the available inputs to the dynamic system to define a group of possible inputs;
  determining an impulse sequence which eliminates unwanted dynamics in the physical system;
  convolving the impulse sequence with each input in the group of possible inputs to determine a group of shaped inputs;
  determining the shaped input which minimizes the deviation between the shape of the actual trajectory and the pre-selected shape; and
  controlling the physical system based on the shaped input which minimizes the deviation between the shape of the actual trajectory and the pre-selected shape, whereby the deviation is minimized.

81. The method of claim 80 wherein the pre-selected shape is a circle or part of an arc.

82. The method of claim 81 wherein the group of possible inputs comprises inputs which produce circular trajectories with diameters greater than that of the pre-selected shape.

83. The method of claim 80 wherein the pre-selected shape is a polygon.

84. The method of claim 83 wherein the polygon is a rectangle.

85. The method of claim 83 wherein the group of possible inputs comprises inputs which result in delays at one or more vertices of the polygonal trajectory.

86. The method of claim 80 wherein the physical system comprises two or more different modes and the unwanted dynamics of the physical system are minimized by minimizing the unwanted dynamics of each mode individually.

87. The method of claim 80 wherein the physical system comprises two or more different modes and the unwanted dynamics of the physical system are minimized by minimizing the unwanted dynamics of all modes simultaneously.

88. The method of claim 80 wherein the physical system performs an operation while traversing the trajectory of pre-selected shape.

89. The method of claim 88 wherein a beginning of the operation is delayed with respect to a beginning of the trajectory.

90. The method of claim 88 wherein the operation is a machining operation.

91. The method of claim 88 wherein the operation is a welding operation.

92. The method of claim 88 wherein the operation is a measuring operation.

93. The method of claim 80 further comprising initiating the trajectory in a direction parallel to a direction of a lowest natural frequency of the physical system.

94. The method of claim 80 wherein the group of possible inputs comprises inputs which produce trajectories of a pre-selected shape but differing initial directions.

95. A method for controlling a physical system by generating an input to a dynamic system to minimize unwanted dynamics in the physical system response comprising:
establishing expressions quantifying the unwanted dynamics;
establishing first constraints on the available inputs to the dynamic system to define a group of possible inputs;
expressing each input in the group of possible inputs as a combination of one or more primitive input trains;
determining the combination which minimizes the unwanted dynamics;
controlling the physical system based on the input in the group of possible inputs which corresponds to the combination which minimizes the unwanted dynamics, whereby unwanted dynamics are minimized.

96. The method of claim 95 wherein the primitive input trains are sequences of impulses or sequences of finite duration pulses.

97. The method of claim 95 wherein the first constraint comprises limiting the group of possible inputs to inputs which generate trapezoidal velocity profiles.

98. The method of claim 97 wherein the physical system is characterized by a vibrational frequency, f; each trapezoidal velocity profile is characterized by a time required to reach maximum velocity, $t_1$, and a time at which deceleration begins, $t_2$; the primitive input trains are sequences of impulses; and determining the combination which minimizes the unwanted dynamic comprises determining the distance from $m_1=t_1*f$ or $m_2=t_2*f$ to the closest integer.

99. The method of claim 98 wherein determining the combination which minimizes the unwanted dynamic further comprises requiring either $m_1$ or $m_2$ to be an integer or approximately an integer.

100. The method of claim 98 wherein determining the combination which minimizes the unwanted dynamic further comprises requiring both $m_1$ and $m_2$ to be an integer or approximately an integer.

101. The method of claim 95 wherein the first constraint comprises limiting the group of possible inputs to inputs which generate s-curve velocity profiles.

102. The method of claim 101 wherein the physical system is characterized by a vibrational frequency, f; each s-curve velocity profile is characterized by a time required to reach maximum acceleration, $t_0$, a time at which constant acceleration ends, $t_1$, and a time at which deceleration begins, $t_2$; the primitive input trains are sequence of impulses; and determining the combination which minimizes the unwanted dynamic comprises determining the distance from $m_0=t_0*f$, $m_1=t_1*f$ or $m_2=t_2*f$ to the closest integer.

103. The method of claim 102 wherein determining the combination which minimizes the unwanted dynamic further comprises requiring either $m_0$, $m_1$ or $m_2$ to be an integer or approximately an integer.

104. The method of claim 102 wherein determining the combination which minimizes the unwanted dynamic further comprises requiring two of the three values $m_0$, $m_1$ and $m_2$ to be an integer or approximately an integer.

105. The method of claim 102 wherein determining the combination which minimizes the unwanted dynamic further comprises requiring $m_0$, $m_1$ and $m_2$ to be an integer or approximately an integer.

106. The method of claim 95 wherein the first constraint comprises limiting the group of possible inputs to inputs which generate parabolic velocity profiles.

107. The method of claim 106 wherein the physical system is characterized by a vibrational frequency, f; each parabolic velocity profile is characterized by a distance moved $x_f$, a velocity $v_{max}$, all acceleration $a_{max}$ and a jerk jerk; the primitive input trains are sequence of impulses; and determining the combination which minimizes the unwanted dynamic comprises determining the distance from $m_1$ or $m_2$ to the closest integer, and determining the distance from $n_1$ or $n_2$ to the closest integer, where $$m_1=[x_f/v_m+a_{max}/(2\text{jerk})]f$$

$$m_2=[v_{max}/a_{max}-a_{max}/(2\text{jerk})]f$$

$$n_1=[x_f/v_{max}-v_{max}/a_{max}]f-0.5$$

$$n_2=[a_{max}/\text{jerk}]f.$$

108. The method of claim 107 wherein determining the combination which minimizes the unwanted dynamic further comprises requiring either $m_1$ or $m_2$, and either $n_1$ or $n_2$ to be an integer or approximately an integer.

109. The method of claim 107 wherein determining the combination which minimizes the unwanted dynamic further comprises requiring $m_1$, $m_2$, $n_1$ and $n_2$ to be an integer or approximately an integer.

110. A method for shaping an arbitrary command input to a dynamic physical system to reduce unwanted dynamics in the physical system comprising:
determining a first parameterization for the arbitrary command input;
determining an impulse sequence which eliminates unwanted dynamics in the physical system;
determining a second parameterization to express the convolution of the impulse sequence with the arbitrary command input; and controlling the input to the physical system based on the second parameterization, whereby unwanted dynamics in the physical system are minimized.

111. The method of claim 110 wherein the first parameterization is piece-wise flat.

112. The method of claim 110 wherein the first parameterization is piece-wise linear.

113. The method of claim 110 wherein the second parameterization is piece-wise linear.

114. The method of claim 110 wherein the second parameterization is piece-wise polynomial.

115. The method of claim 110 wherein the controlling of the input to physical system comprises the use of a lookup table.

116. An apparatus for controlling a physical system by reducing the deviation between the shape of a trajectory traversed by a point in a dynamic physical system and a pre-selected shape comprising:

computing apparatus for determining an impulse sequence which eliminates unwanted dynamics in the physical system;

apparatus for selecting an input from a group of possible inputs which, when convolved with the impulse sequence, minimizes the deviation between the shape of the actual trajectory and the pre-selected shape; and apparatus for controlling the physical system based on the convolution of the impulse sequence with the selected input whereby the deviation between the shape of the actual trajectory and the pre-selected shape is minimized.

117. An apparatus for controlling a physical system by shaping an arbitrary command input to a physical system in order to minimize unwanted dynamics in a physical system response comprising:

a sensor for measuring the unwanted dynamics;

computing apparatus for determining natural frequencies of the unwanted dynamics based on the measurement of the unwanted dynamics;

apparatus for determining a sequence of impulses, a sequence of pulses, or a trajectory which minimizes the unwanted dynamics at the natural frequencies;

apparatus for convolving the sequence of impulses with the arbitrary command input to produce a shaped command input; and apparatus for controlling the physical system based on the shaped command input whereby the unwanted dynamics are minimized.

118. An apparatus for minimizing unwanted dynamics in a physical system response comprising:

computing apparatus for expressing each input in a group of possible inputs as a combination of impulse sequences and a step function;

apparatus for determining which of the combinations of impulse sequences minimizes the unwanted dynamics;

apparatus for controlling the physical system based on the input which corresponds to the combination of impulse sequences which minimizes unwanted dynamics.

119. Apparatus for controlling a physical system by shaping an input to a dynamic physical system to reduce unwanted dynamics in the physical system comprising:

apparatus for determining a command which eliminates unwanted dynamics in the physical system;

computing apparatus for splitting the command into an impulse sequence and an input such that the command is obtained if the input and the impulse sequence are convolved together;

apparatus for convolving the sequence of impulses with an arbitrary command input to produce a shaped output; and apparatus for controlling the physical system based on the shaped input whereby unwanted dynamics are minimized.

120. An apparatus for reducing unwanted dynamics in a physical system response of a closed loop dynamic system comprising:

a first filter which is based on an impulse sequence which eliminates unwanted dynamics in the physical system response and which is located in a feed-forward branch of the closed loop system; and a second filter which is based on an inverse of the first filter and which is located in the feed-back branch of the closed loop system, whereby unwanted dynamics are minimized.

121. The apparatus of claim 120 wherein the filters are analog filters.

122. The apparatus of claim 120 wherein the filters are digital filters.

123. The apparatus of claim 120 wherein the second filter is variable.

124. The apparatus of claim 123 wherein varying the second filter is mathematically equivalent to varying the closed loop system from a system with no second filter and the first filter in the feed-forward branch of the closed loop to a system with no second filter and the first filter outside the closed loop.

125. A method for reducing unwanted dynamics in a physical system response of a closed loop dynamic system comprising:

determining an impulse sequence which eliminates unwanted dynamics in the physical system response;

inserting a first filter based on the impulse sequence in a feed-forward branch of the closed loop system; and inserting a second filter based on an inverse of the first filter in the feed-back branch of the closed loop system whereby unwanted dynamics are minimized.

126. A method for controlling a physical system by generating an input to a dynamic system to minimize unwanted dynamics in a physical system response comprising:

establishing expressions quantifying the unwanted dynamics;

establishing first constraints bounding an available input to the dynamic system;

establishing desired values for the unwanted dynamics at pre-selected values of a physical system characteristic;

establishing an error measure based on the differences between the desired values for the unwanted dynamics and the expressions quantifying the unwanted dynamics when evaluated at the pre-selected values of the physical system characteristic;

finding a solution which minimizes the error measure and is used to generate the input while still satisfying the first constraints; and controlling the physical system based on the input to the physical system whereby unwanted dynamics are minimized.

127. The method of claim 126 wherein the solution is a sequence of impulses.

128. The method of claim 126 wherein the solution is a sequence of pulses of finite duration.

129. The method of claim 126 wherein the solution is a sequence of impulses or pulses which begin at specified time intervals.

130. The method of claim 126 wherein the dynamic system is characterized by an undamped natural frequency $\omega$ and damping ratio $\zeta$, the solution is a sequence of n impulses of amplitude $A_i$ and location $t_i$, for i=1 ... n, with $t_1=0$;

the expression quantifying the unwanted dynamics is $$R(\Omega) = \exp(-\zeta\Omega t_N)\{[\Sigma A_i \exp(\zeta\Omega t_i) \cos(m\Omega t_i)]^2 + [\Sigma A_i \exp(\zeta\Omega t_i) \sin(m\Omega t_i)]^2\}^{1/2}$$

where $m=(1-\zeta^2)^{1/2}$, $R(\Omega)$ is the ratio of the residual vibration produced by the sequence of impulses to the residual vibration produced by a single impulse of amplitude $\Sigma A_i$, if the physical system had an undamped natural frequency $\Omega$, and the summation is over i=1 ... n, the pre-selected values of the physical system characteristic are the undamped natural frequencies $\omega_j$, j=1 ... N, the desired values for the unwanted dynamics are $D_j$, j=1 ... N, the error measure is $$E = \Sigma[D_j - R(\omega_j)]^2$$

where the summation is over j=1 ... N, and finding a solution is accomplished using a method of least squares.

* * * * *